US012726224B2

(12) United States Patent
Va et al.

(10) Patent No.: US 12,726,224 B2
(45) Date of Patent: Sep. 1, 2026

(54) METHOD AND APPARATUS FOR OPERATING RADAR FOR RADIO FREQUENCY EXPOSURE MANAGEMENT

(71) Applicant: Samsung Electronics Co., Ltd., Suwon-si (KR)

(72) Inventors: Vutha Va, Plano, TX (US); Anum Ali, Plano, TX (US); Jianhua Mo, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 656 days.

(21) Appl. No.: 17/815,544

(22) Filed: Jul. 27, 2022

(65) Prior Publication Data

US 2023/0246663 A1 Aug. 3, 2023

Related U.S. Application Data

(60) Provisional application No. 63/304,334, filed on Jan. 28, 2022.

(51) Int. Cl.
*H04B 1/3827* (2015.01)
*G01S 7/00* (2006.01)
(Continued)

(52) U.S. Cl.
CPC ............ *H04B 1/3838* (2013.01); *G01S 7/006* (2013.01); *G01S 13/04* (2013.01); *H04W 52/30* (2013.01)

(58) Field of Classification Search
CPC ....... H04B 1/3838; G01S 7/006; G01S 13/04; G01S 13/88; H04W 52/30; H04W 52/283; H04W 52/367
See application file for complete search history.

(56) References Cited

U.S. PATENT DOCUMENTS 10,001,549 B2 6/2018 Hesse
10,812,125 B1 * 10/2020 Badic ................ H04W 72/0446
(Continued)

FOREIGN PATENT DOCUMENTS

KR 10-2009-0087219 A 8/2009
WO 2020262859 A1 12/2020
WO 2021008710 A1 1/2021

OTHER PUBLICATIONS

International Search Report and Written Opinion issued May 1, 2023 regarding International Application No. PCT/KR2023/001102, 7 pages.

(Continued)

*Primary Examiner* — William Kelleher
*Assistant Examiner* — Ismaaeel A. Siddiquee

(57) ABSTRACT

A method for radio frequency (RF) exposure management includes determining whether to use radar for RF exposure level management due to RF transmission from the electronic device. In response to determining to use radar for the RF exposure level management, the method includes transmitting the radar signals for object detection. The method also includes identifying available power for the communication signals based on an identified RF exposure level of an object detected by the radar signals. The method further includes transmitting the communication signals for wireless communication at a power level that: (i) does not exceed the available power when using radar for the RF exposure management or (ii) is based on a predefined scenario corresponding to a body part being within a proximity to the electronic device in response to a determination to not use radar for the RF exposure level management.

20 Claims, 32 Drawing Sheets

(51) Int. Cl.
*G01S 13/04* (2006.01)
*H04W 52/30* (2009.01)

(56) References Cited

U.S. PATENT DOCUMENTS

| | | | | |
|---|---|---|---|---|
| 11,428,780 | B2 | 8/2022 | Zhang et al. | |
| 11,594,807 | B2 | 2/2023 | Ng et al. | |
| 11,670,970 | B2 | 6/2023 | Leabman | |
| 2012/0142291 | A1 | 6/2012 | Rath et al. | |
| 2018/0287651 | A1 | 10/2018 | Fernando et al. | |
| 2019/0302250 | A1 | 10/2019 | Sahin et al. | |
| 2019/0353750 | A1 | 11/2019 | Rimini et al. | |
| 2020/0112927 | A1 | 4/2020 | Han et al. | |
| 2020/0229102 | A1* | 7/2020 | Gubeskys | H04W 52/146 |
| 2020/0267662 | A1* | 8/2020 | Godala | H04W 52/367 |
| 2020/0297236 | A1 | 9/2020 | Rimini et al. | |
| 2020/0300996 | A1 | 9/2020 | Cetinoneri et al. | |
| 2020/0411960 | A1* | 12/2020 | Ng | H01Q 1/245 |
| 2021/0103028 | A1 | 4/2021 | Zhang et al. | |
| 2021/0126719 | A1 | 4/2021 | Rimini | |
| 2021/0211152 | A1 | 7/2021 | Kenney et al. | |
| 2022/0256473 | A1 | 8/2022 | Kiilerich Pratas et al. | |
| 2023/0016288 | A1* | 1/2023 | Chauvin | H04W 28/0278 |
| 2023/0090516 | A1* | 3/2023 | Zhang | G01S 13/56 370/328 |

OTHER PUBLICATIONS

Extended European Search Report issued Feb. 11, 2025 regarding Application No. 23747292.3, 10 pages.

Communication pursuant to Article 94(3) EPC dated Nov. 26, 2025, in connection with European Application No. 23747292.3, 9 pages.

* cited by examiner

200

210
TRANSCEIVER(S)
RADAR TRANSCEIVER 270
225
RX PROCESSING CIRCUITRY
230
SPEAKER(S)
220
MICROPHONE
215
TX PROCESSING CIRCUITRY
240
PROCESSOR(S)
250
INPUT
DISPLAY
255
I/O IF
245
SENSOR(S)
265
260
MEMORY
OPERATING SYSTEM (OS) 261
APPLICATIONS 262

METHOD AND APPARATUS FOR OPERATING RADAR FOR RADIO FREQUENCY EXPOSURE MANAGEMENT

CROSS-REFERENCE TO RELATED APPLICATION AND CLAIM OF PRIORITY

This application claims priority under 35 U.S.C. § 119(e) to U.S. Provisional Patent Application No. 63/304,334 filed on Jan. 28, 2022. The above-identified provisional patent application is hereby incorporated by reference in its entirety.

TECHNICAL FIELD

This disclosure relates generally to electronic devices. More specifically, this disclosure relates to operating radar for radio frequency exposure management.

BACKGROUND

The use of mobile computing technology such as a portable electronic device has greatly expanded largely due to usability, convenience, computing power, and the like. One result of the recent technological development is that electronic devices are becoming more compact, while the number of functions and features that a given device can perform is increasing. For example, certain electronic devices not only provide voice call services or internet browsing using a mobile communication network but can also offer radar capabilities.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. With the increase of mobile communication, care must be taken to minimize radio frequency exposure to the user of the electronic device.

SUMMARY

This disclosure provides methods and an apparatus for operating radar for radio frequency exposure management.

In one embodiment, electronic device is provided. The electronic device includes transceiver and a processor. The processor is operably connected to the transceiver. The transceiver is configured to transmit and receive radar signals and communication signals. The processor is configured to determine, based at least in part on a set of information, whether to use radar for radio frequency (RF) exposure level management due to RF transmission from the electronic device. In response to a determination to use radar for the RF exposure level management, the processor is configured to transmit, via the transceiver, the radar signals for object detection. The processor is also configured to identify available power for the communication signals based on an identified RF exposure level of an object detected by the radar signals. The processor is further configured to transmit the communication signals for wireless communication at a power level that: (i) does not exceed the available power when using radar for the RF exposure management or (ii) is based on a predefined scenario corresponding to a body part being within a proximity to the electronic device in response to a determination to not use radar for the RF exposure level management.

In another embodiment, a method for RF exposure management is provided. The method includes determining, based at least in part on a set of information, whether to use radar for RF exposure level management due to RF transmission from the electronic device. In response to determining to use radar for the RF exposure level management, the method includes transmitting the radar signals for object detection. The method also includes identifying available power for the communication signals based on an identified RF exposure level of an object detected by the radar signals. The method further includes transmitting the communication signals for wireless communication at a power level that: (i) does not exceed the available power when using radar for the RF exposure management or (ii) is based on a predefined scenario corresponding to a body part being within a proximity to the electronic device in response to a determination to not use radar for the RF exposure level management.

In yet another embodiment a non-transitory computer readable medium embodying a computer program, the computer program comprising computer readable program code that, when executed by a processor of an electronic device, causes the processor to: determine, based at least in part on a set of information, whether to use radar for RF exposure level management due to RF transmission from the electronic device; in response to a determination to use radar for the RF exposure level management, transmit the radar signals for object detection; identify available power for the communication signals based on an identified RF exposure level of an object detected by the radar signals; and transmit the communication signals for wireless communication at a power level that: (i) does not exceed the available power when using radar for the RF exposure management or (ii) is based on a predefined scenario corresponding to a body part being within a proximity to the electronic device in response to a determination to not use radar for the RF exposure level management.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
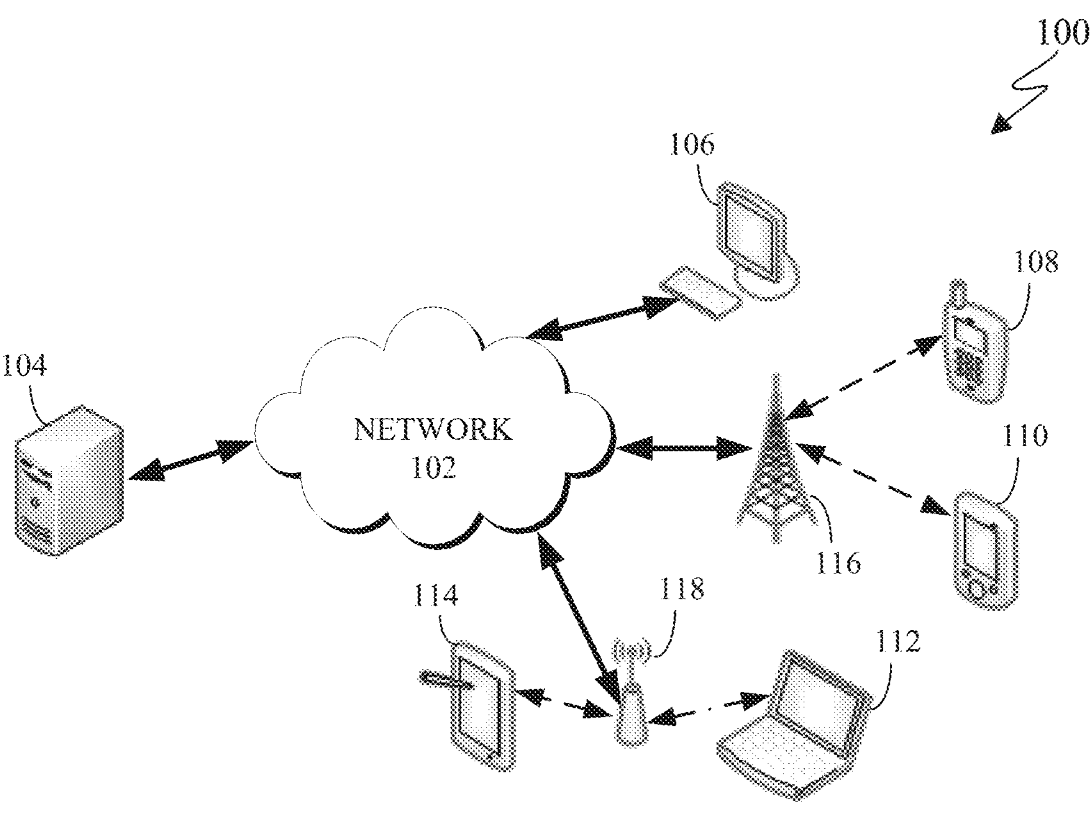
FIG. 1 illustrates an example communication system according to embodiments of this disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

To meet the demand for wireless data traffic having increased since deployment of the fourth generation (4G) communication systems, efforts have been made to develop and deploy an improved 5th generation (5G) or pre-5G or new radio (NR) communication system. Therefore, the 5G or pre-5G communication system is also called a "beyond 4G network" or a "post long term evolution (LTE) system."

The 5G communication system is considered to be implemented in higher frequency (such as millimeter wave (mmWave)) bands, e.g., 28 GHz or 39 GHz or 60 GHz bands, so as to accomplish higher data rates or in lower frequency bands, such as below 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

An electronic device, according to embodiments of the present disclosure can include a user equipment (UE) such as a 5G terminal. The electronic device can also refer to any component such as mobile station, subscriber station, remote terminal, wireless terminal, receive point, vehicle, or user device. The electronic device could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. Additionally, the electronic device can include a personal computer (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), a portable multimedia player (PMP), an MP3 player, a mobile medical device, a virtual reality headset, a portable game console, a camera, and a wearable device, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices and can include new electronic devices depending on the development of technology. It is noted that as used herein, the term "user" may denote a human or another device (such as an artificial intelligent electronic device) using the electronic device.

Figure 3A:
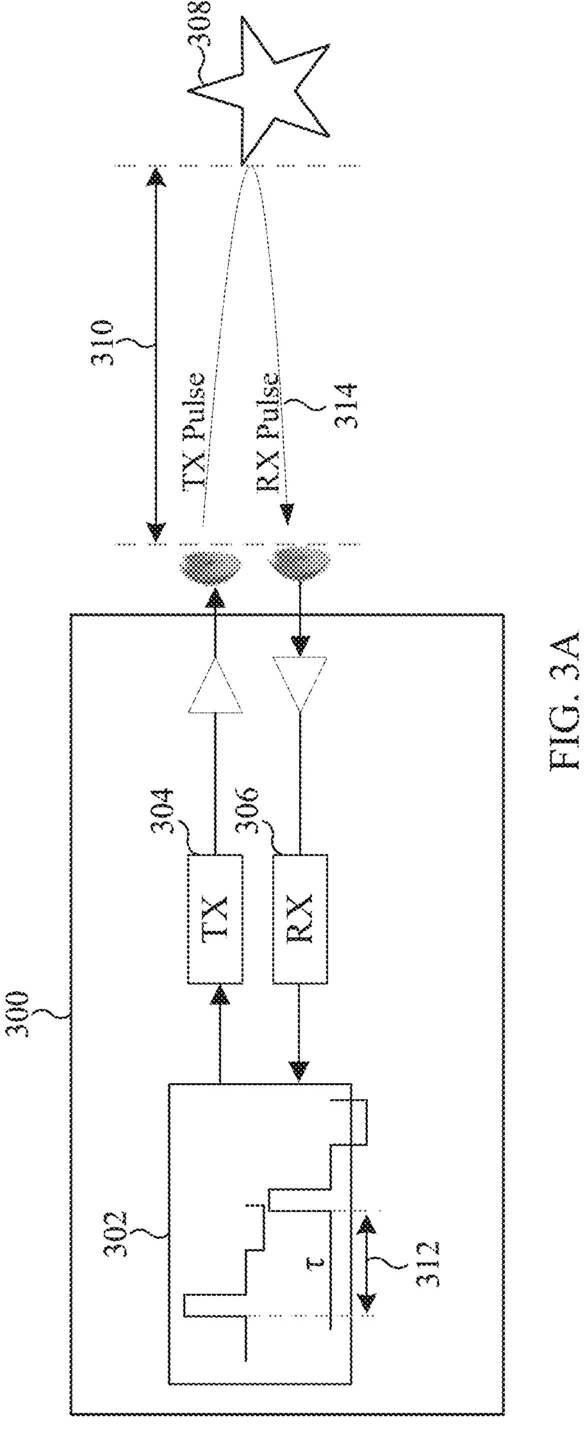
FIG. 3A illustrates an example architecture of a monostatic radar signal according to embodiments of this disclosure.
Figure 3B:
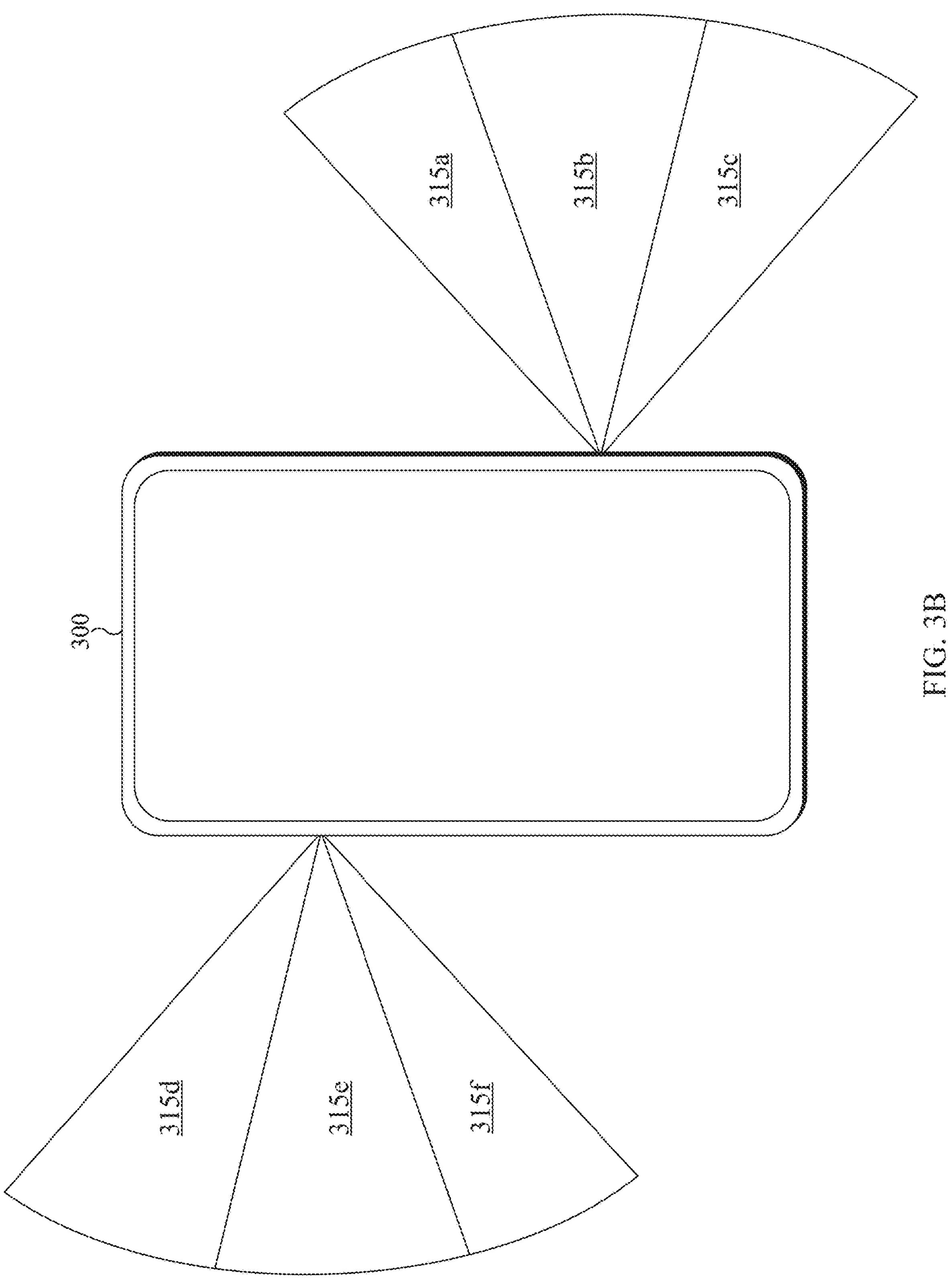
FIG. 3B illustrates a diagram of an electronic device with multiple field of view regions corresponding to beams according to embodiments of this disclosure.

Beamforming is an important factor when an electronic device (such as a UE) tries to establish a connection with a base station (BS). To compensate for the increasing path loss at high frequencies as well as narrow analog beamwidth in mmWave, analog beam sweeping can be employed to support narrow beams that enable wider signal reception or transmission coverage for the UE. A beam codebook comprises a set of codewords, where a codeword is a set of analog phase shift values, or a set of amplitude plus phase shift values, applied to the antenna elements, in order to form an analog beam. FIG. 3B, described below, illustrates a UE equipped with two mmWave antenna modules or panels located on the left and the right edges of the UE. A beam management procedure is implemented at the UE to maintain the best antenna module as well as the corresponding best beam of the antenna module for signal reception and transmission by the UE. The UE may also use multiple antenna modules simultaneously, in which case the beam management procedure can determine the best beam of each antenna module for signal reception and transmission by the UE.

Embodiments of the present disclosure take into consideration that beamforming is a used for reliable mmWave communications but at the same time beamforming also can cause a concern for radio frequency exposure on human body, beyond various governmental regulations. Beamforming is typically used at both the infrastructure or network side (such as at the base station or the access point) and the UE side. The process of beamforming is to adjust the antenna weights such that the transmission energy is concentrated in some direction. This focus of energy can help provide strong link signal for communications, but at the same time this means more radiation power in that direction and could raise concern on the exposure to body of the user. Due to such health concern, regulatory bodies (such as the Federal Communications Commission (FCC) in the United States of America) have sets of regulations and guidance governing such exposure. Exposure includes both exposure at low frequency (<6 GHz) and exposure at high frequency (>6 GHz). Specific Absorption Rate (SAR) is used for low frequency, and Power density (PD) is used as the exposure metric at high frequency.

Exposure limit poses a challenge regarding 5G millimeter wave uplink (UL). As discussed above, narrow beams (formed by beamforming techniques) are used for 5G millimeter wave operation, however, beamforming increases the PD and, consequently, the exposure. Certain mmWave communications take a very conservative measure to meet the exposure regulations. For example, one such approach is to use low enough Equivalent Isotropically Radiated Power (EIRP) by adjusting the duty cycle and either (i) lowering the transmit (TX) power, (ii) lowering the antenna gain, or (iii) both lower the TX power and the antenna gain.

Embodiments of the present disclosure take into consideration that while such a conservative measure can ensure regulatory compliance, it forces the communication module to operate at suboptimal link quality and thus the electronic device cannot reap the potential for very high data rate services. For example, some solutions (non-sensing solutions) assume worst case exposure at all times. Embodiments of the present disclosure take into consideration that low power beams, wide beams, or a combination thereof can be used to guard against exceeding the limit. Using low power or wide beams can limit UL quality in both coverage and throughput.

Accordingly, embodiments of the present disclosure relate to using radar to assess a situation by sensing the surroundings of the electronic device. By assessing the situation, the electronic device can avoid a pessimistic TX power control. For example, a smart exposure control solution can maintain exposure compliance while minimizing the opportunity loss for communication beamforming operations. For instance, radar sensing can provide information on the distance to a target (such as a body part of a human). This information can be useful to estimate the exposure level and to appropriately select the TX power for mmWave communications that is compliant while still higher than the assumed worst exposure of existing solutions without sensing capability. Embodiments of the present disclosure describe using radar to estimate RF exposure levels on a human body for determining whether there is an exposure risk. Upon detecting a body part, the electronic device can manage the beams for communication to maintain regulatory RF exposure compliance.

Radar sensing can be used for ranging, angle estimation or both. For example, when radar is used for ranging only, the electronic device can determine whether a human body part is present and adjust the TX power accordingly. For another example, when radar is used for ranging and angle estimation, the electronic device can determine whether a human body part is present and its approximate location and adjust the TX power, for beamforming, based on the location of the human body part. For instance, the electronic device can reduce the TX power at or near the location of the human body part and increase the TX power at locations where the human body part is absent. For yet another example, when radar is used for ranging and angle estimation, the electronic device can determine whether a human body part is present and its approximate location and modify one or more beams for beamforming based on the location of the human body part. In this example, the angle information can be used to identify if the body part is within the main beam direction of certain beams.

For example, the electronic device can determine whether a body part of a human is within a field of view (FoV) of a communication interface. In certain embodiments, the communication interface has a radar FoV that is the same or similar to a FoV of wireless communication.

Embodiments of the present disclosure take into consideration that the regulatory bodies limit exposure due to such health concern with respect to a human body and not inanimate objects. Accordingly, embodiments of the present disclosure describing estimating RF exposure level can be based on radar detection results and a selected communication transmission configuration (TX power, selected beam, and the like). Such information of the estimate of the exposure could be used to select communication TX configuration that is strong to support high data rate link, while not exceeding any exposure limit.

Embodiments of the present disclosure also take into consideration that resources of the electronic device are utilized for using radar for sensing objects in order to manage RF exposure. For example, operating costs for transmitting radar signals for exposure management include power for transmission of radar signals, power dissipated in switching radar between on and off states, radar signal processing, and the like. Additionally, there can be operational constraints on the UE for transmitting radar signals for exposure management, such as frequently adjusting the transmit power. Accordingly, embodiments of the present disclosure describe using radar for RF exposure management based on detecting various scenarios. When for a period of time either (i) no object is detected or (ii) the object is detected but is far away from the electronic device, a stable high TX power could be allowed with exposure management using radar sensing. However, if the scenario changes such as when the object is detected at close ranges for a period of time, then there can be too much uncertainty in estimating the exposure and over or undershoot the operational exposure goal (while still maintaining the averaging exposure to be in compliant with the regulations) resulting in large TX power fluctuations which could be hard to use in practice. Embodiments of the present disclosure describe situations for when to operate MPE management using radar sensing so that at least the following advantages are achieved: (1) maximize gain in transmit power provided by radar-enabled exposure management; (2) most of the gains from radar-enabled exposure management while minimizing the cost of operating radar (in terms of the power consumption as well as the use of the wireless medium).

Embodiments of the present disclosure describe determining when to operate radar for exposure management. While radar sensing can help identify low exposure situations (e.g., when a target is located at some distance greater than a threshold distance) and allow communication modules to use high TX power, it is not always necessary and in some cases the situation might not permit high TX power (e.g., when body part is at close range most of the times). In those cases, running radar is wasteful. Embodiments of the present disclosure leverage various sources of information available on the UE to make the determination (of whether to use radar for exposure management). The sources of information may come from higher layer (e.g., the application layer), the communication module (e.g., the wireless link quality), and the radar detection results.

Embodiments of the present disclosure also describe selecting a radar mode to operate when the hardware has multiple radar modes. The radar modes include the narrowband (NB) radar and wideband (WB) radar. It is noted that NB and WB have different range resolution and also cost of operation. For example, NB radar has lower operational cost (e.g., due to smaller spectrum utilization) but has worse range resolution compared to WB radar. Appropriately select the radar mode can reduce the cost of operating radar for MPE management while maintaining most of the achievable gain.

Embodiments of the present disclosure further describe methods for determining whether it is beneficial to use radar for exposure management using radar detection results.

Additionally, embodiments of the present disclosure describe methods for determining whether it is beneficial to use radar for MPE management using non-radar information sources (e.g., including the higher layer information, the device state, information from communication module, and the like).

While the descriptions of the embodiments of the present disclosure describe a radar based system for object detection and motion detection, the embodiments can be applied to any other radar based and non-radar based recognition systems. That is, the embodiments of the present disclosure are not restricted to radar and can be applied to other types of sensors (such as an ultra-sonic sensor) that can provide both range, angle, speed measurements, or any combination thereof. It is noted that when applying the embodiments of the present disclosure using a different type of sensor (a sensor other than a radar transceiver), various components may need to be tuned accordingly.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone (such as a UE), a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100, such as wearable devices. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a measuring (or radar) transceiver.

In this example, some client devices 108-114 communicate indirectly with the network 102. For example, the mobile device 108 and PDA 110 communicate via one or more base stations 102, such as cellular base stations or eNodeBs (eNBs) or gNodeBs (gNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
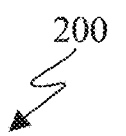
FIG. 2 illustrates an example electronic device according to embodiments of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a UE, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array including numerous antennas. For example, the transceiver(s) 210 can be equipped with multiple antenna elements. There can also be one or more antenna modules fitted on the terminal where each module can have one or more antenna elements. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. For example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user to interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, the radar transceiver 270, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

In this embodiment, one of the one or more transceivers in the transceiver 210 is a radar transceiver 270 that is configured to transmit and receive signals for detecting and ranging purposes. The radar transceiver 270 can transmit and receive signals for measuring range and speed of an object that is external to the electronic device 200. The radar transceiver 270 can also transmit and receive signals for measuring the angle of a detected object relative to the electronic device 200. For example, the radar transceiver 270 can transmit one or more signals that when reflected off of an object (whether moving or stationary) and received by the radar transceiver 270 can be used for determining the range (distance between the object and the electronic device 200), the speed of the object, the angle (angle of the object relative to the electronic device 200), or any combination thereof.

The radar transceiver 270 may be any type of transceiver including, but not limited to a radar transceiver. The radar transceiver 270 can include a radar sensor. The radar transceiver 270 can receive the signals, which were originally transmitted from the radar transceiver 270, after the signals have bounced or reflected off of target objects in the surrounding environment of the electronic device 200. In certain embodiments, the radar transceiver 270 is a monostatic radar as the transmitter of the radar signal and the receiver, for the delayed echo, are positioned at the same or similar location. For example, the transmitter and the receiver can use the same antenna or nearly-co-located while using separate, but adjacent antennas. Monostatic radars are assumed coherent, such as when the transmitter and receiver are synchronized via a common time reference. FIG. 3A, below, illustrates an example monostatic radar.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

Figure 3C:
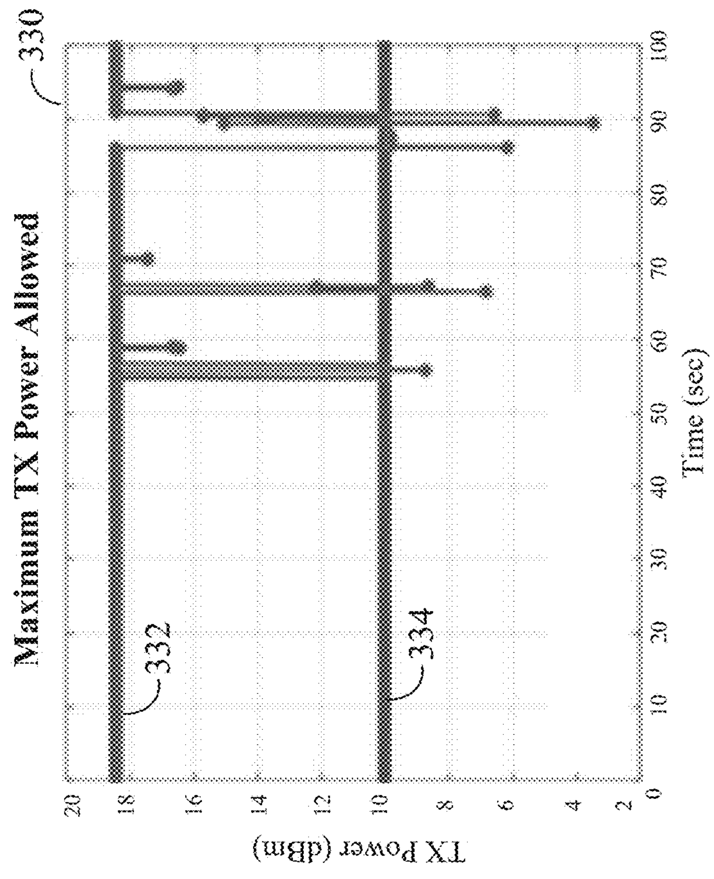
FIGS. 3C and 3D illustrate example graphs comparing transmission power to distance a detected object is from the electronic device according to embodiments of this disclosure.
Figure 3C:
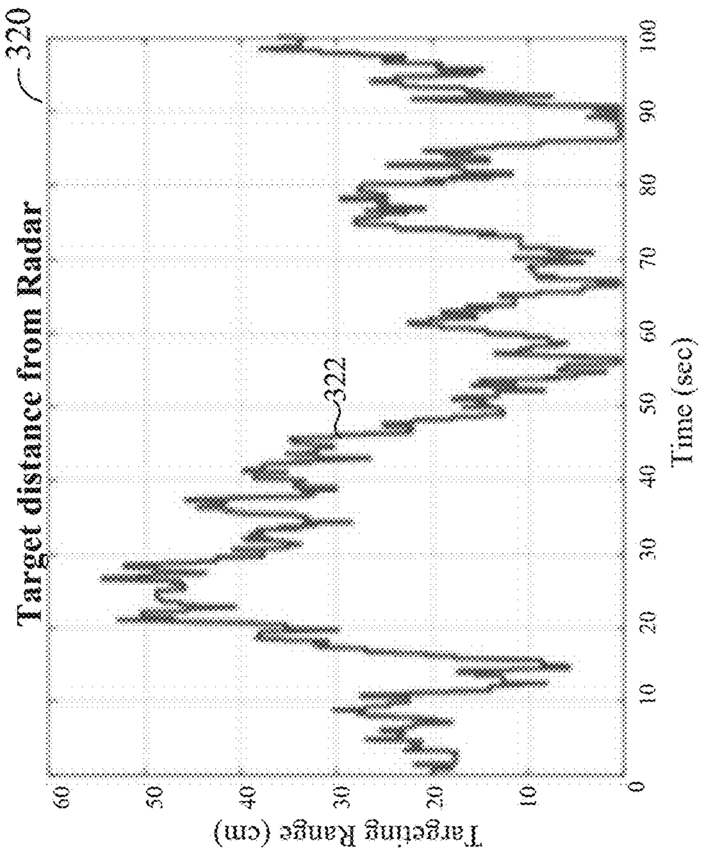
Figure 3D:
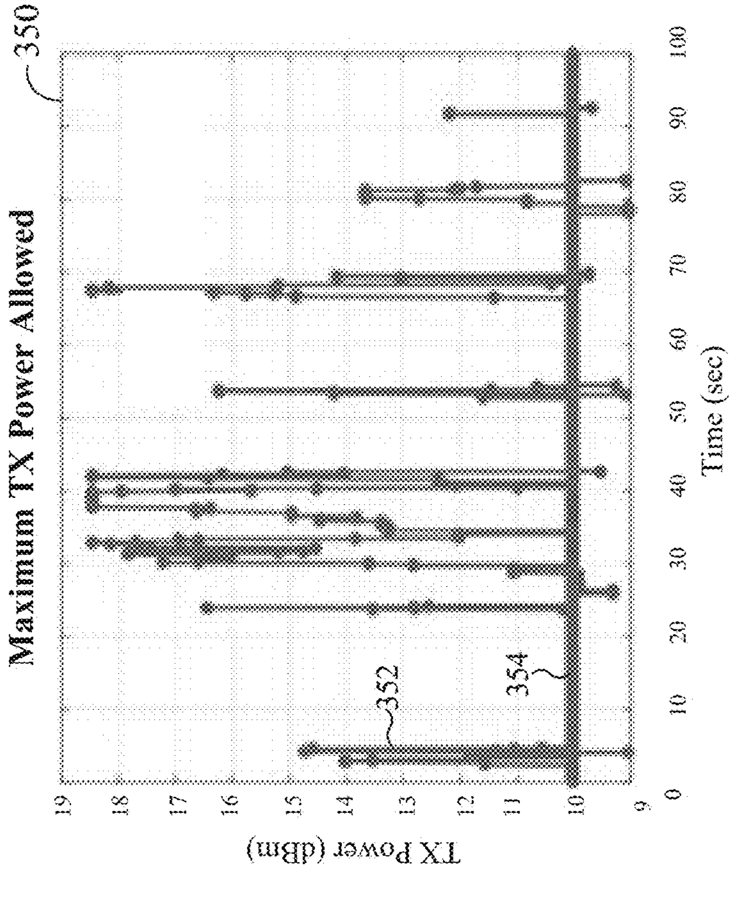
Figure 3D:
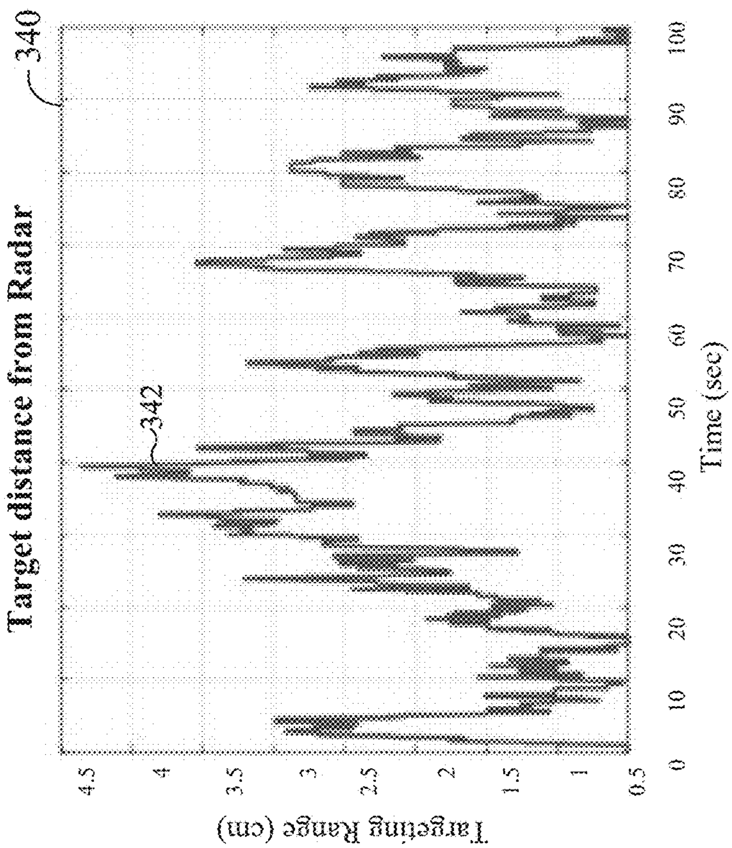

FIG. 3A illustrates an example architecture of a monostatic radar in accordance with an embodiment of this disclosure. FIG. 3B illustrates a diagram of an electronic device with multiple FoV regions corresponding to beams according to embodiments of this disclosure. FIGS. 3C and 3D illustrate example graphs comparing transmission power to distance a detected object is from the electronic device according to embodiments of this disclosure. The embodiments of FIGS. 3A-3D are for illustration only and other embodiments can be used without departing from the scope of the present disclosure.

FIGS. 3A and 3B illustrate an electronic device 300. The electronic device 300, as illustrated in FIG. 3A includes a processor 302, at least one receiver 306. The electronic device 300 can be similar to any of the client devices 106-114 of FIG. 1, the server 104 of FIG. 1, or the electronic device 200 of FIG. 2. The processor 302 is similar to the processor 240 of FIG. 2. Additionally, the transmitter 304 and the receiver 306 can be included within the radar transceiver 270 of FIG. 2.

The transmitter 304 of the electronic device 300 transmits a signal 314 to the target object 308. The target object 308 is located a distance 310 from the electronic device 300. For example, the transmitter 304 transmits a signal 314 via an antenna. In certain embodiments, the target object 308 corresponds to a human body part. The signal 314 is reflected off of the target object 308 and received by the receiver 306, via an antenna. The signal 314 represents one or many signals that can be transmitted from the transmitter 304 and reflected off of the target object 308. The processor 302 can identify the information associated with the target object 308, such as the speed the target object 308 is moving and the distance the target object 308 is from the electronic device 300, based on the receiver 306 receiving the multiple reflections of the signals, over a period of time.

Leakage (not shown) represents radar signals that are transmitted from the antenna associated with transmitter 304 and are directly received by the antenna associated with the receiver 306 without being reflected off of the target object 308.

In order to track the target object 308, the processor 302 analyzes a time difference 312 from when the signal 314 is transmitted by the transmitter 304 and received by the receiver 306. It is noted that the time difference 312 is also referred to as a delay, as it indicates a delay between the transmitter 304 transmitting the signal 314 and the receiver 306 receiving the signal after the signal is reflected or bounced off of the target object 308. Based on the time difference 312, the processor 302 derives the distance 310 between the electronic device 300, and the target object 308. Additionally, based on multiple time differences 312 and changes in the distance 310, the processor 302 derives the speed that the target object 308 is moving.

Monostatic radar is characterized for its delayed echo as the transmitter 304 of the radar signal and the receiver 306 of the radar signal essentially are at the same location. In certain embodiments, the transmitter 304 and the receiver 306 are co-located either by using a common antenna or nearly co-located but use separate but adjacent antennas. Monostatic radars are assumed coherent such that the transmitter 304 and the receiver 306 are synchronized via a common time reference.

A radar pulse is generated as a realization of a desired radar waveform, modulated onto a radio carrier frequency, and transmitted through a power amplifier and antenna, such as a parabolic antenna. In certain embodiments, the pulse radar is omnidirectional. In other embodiments, the pulse radar is focused into a particular direction. When the target object 308 is within the field of view of the transmitted signal and within a distance 310 from the radar location, then the target object 308 will be illuminated by RF power density ($W/m^2$), $p_t$, for the duration of the transmission. Equation (1) describes the first order of the power density, $p_t$.

$$p_t = \frac{P_T}{4\pi R^2} G_T = \frac{P_T}{4\pi R^2} \frac{A_T}{(\lambda^2/4\pi)} = P_T \frac{A_T}{\lambda^2 R^2} \tag{1}$$

Referring to Equation (1), $P_T$ is the transmit power (W). $G_T$ describes the transmit antenna gain (dBi) and $A_T$ is an effective aperture area ($m^2$). $\lambda$ corresponds to the wavelength of the radar signal (m), and R corresponds to the distance 310 between the antenna and the target object 308. In certain embodiments, effects of atmospheric attenuation, multi-path propagation, antenna loss and the like are negligible, and therefore not addressed in Equation (1).

The transmit power density impinging onto the target object 308 surface can cause reflections depending on the material, composition, surface shape and dielectric behavior at the frequency of the radar signal. In certain embodiments, only direct reflections contribute to a detectable receive signal since off-direction scattered signals can be too weak to be received by at the radar receiver. The illuminated areas of the target with normal vectors pointing back at the receiver can act as transmit antenna apertures with directives (gains) in accordance with their effective aperture areas. Equation (2), below, describes the reflective back power.

$$P_{refl} = p_t A_t G_t \sim p_t A_t r_t \frac{A_t}{\lambda^2/4\pi} = p_t RSC \tag{2}$$

In Equation (2), $P_{refl}$ describes the effective isotropic target-reflected power (W). The term, $A_t$, describes the effective target area normal to the radar direction ($m^2$). The term $r_t$ describes the reflectivity of the material and shape, which can range from [0, . . . , 1]. The term $G_t$ describes the corresponding aperture gain (dBi). RCS is the radar cross section ($m^2$) and is an equivalent area that scales proportional to the actual reflecting area-squared inversely proportional with the wavelength-squared and is reduced by various shape factors and the reflectivity of the material itself. Due to the material and shape dependency, it is difficult to deduce the actual physical area of a target from the reflected power, even if the distance 310 to the target object 308 is known.

The target reflected power at the receiver location results from the reflected power density at the reverse distance 310 collected over the receiver antenna aperture area. Equation (3), below, describes the received target reflected power. It is noted that $P_R$ is the received target reflected power (W) and $A_R$ is the receiver antenna effective aperture area ($m^2$). In certain embodiments, $A_R$ is the same as $A_T$.

$$P_R = \frac{P_{refl}}{4\pi R^2} A_R = P_T \cdot RSC \frac{A_T A_R}{4\pi\lambda^2 R^4} \tag{3}$$

A radar system can be used as long as the receiver signal exhibits sufficient signal-to-noise ratio (SNR). The value of SNR depends on the waveform and detection method. Equation (4), below, describes the SNR. It is noted that kT is the Boltzmann constant multiplied by the current temperature. B is the radar signal bandwidth (Hz). F is the receiver noise factor which is a degradation of the receive signal SNR due to noise contributions of the receiver circuit itself.

$$SNR = \frac{P_R}{kT \cdot B \cdot F} \tag{4}$$

When the radar signal is a short pulse of duration or width, $T_p$, the delay or time difference 312 between the transmission and reception of the corresponding echo is described in Equation (5). $\tau$ corresponds to the delay between the transmission and reception of the corresponding echo and equal to Equation (5). c is the speed of light propagation in the air.

When there are multiple targets at different distances, individual echoes can be distinguished only if the delays differ by at least one pulse width. As such, the range resolution of the radar is described in Equation (6). A rectangular pulse of a duration $T_P$ exhibits a power spectral density as described in Equation (7) and includes a first null at its bandwidth as shown in Equation (8). The range resolution of a radar signal is connected with the bandwidth of the radar waveform is expressed in Equation (9).

$$\tau = 2R/c \tag{5}$$

$$\Delta R = c\Delta\tau/2 = cT_P/2 \tag{6}$$

$$P(f) \sim \left(\sin(\pi f T_p)/(\pi f T_p)\right)^2 \tag{7}$$

$$B = 1/T_P \tag{8}$$

$$\Delta R = c/2B \tag{9}$$

Depending on the radar type, various forms of radar signal measurements exist. One example is a Channel Impulse Response (CIR). CIR measures the reflected signals (echoes) from potential targets as a function of distance at the receive antenna module, such as the radar transceiver 270 of FIG. 2. In certain embodiments, CIR measurements are collected from transmitter and receiver antenna configurations which when combined can produce a multidimensional image of the surrounding environment. The different dimensions can include the azimuth, elevation, range, and Doppler.

FIG. 3B illustrates the electronic device 300. The electronic device 300 can be similar to any of the client devices 106-114 of FIG. 1, the server 104 of FIG. 1, or the electronic device 200 of FIG. 2.

The electronic device 300 can be equipped with multiple antenna elements for communications. This enables the electronic device 300 to communicate according to a wireless communication protocol that is different from radar.

For example, the electronic device 300 can include one or more mmWave antenna modules or panels. As illustrated, the electronic device 300 includes two mmWave antenna modules or panels, one located on the right side (corresponding to regions 315*a*, 315*b*, and 315*c*) while the other is located on the left side (corresponding to regions 315*d*, 315*e*, and 315*f*). Other electronic devices can include less or more mmWave antenna modules or panels, such as a single mmWave antenna module or panel. The electronic device 300 can transmit multiple beams corresponding to various regions such as the regions 315*a*, 315*b*, 315*c*, 315*d*, 315*e*, and 315*f* (collectively regions 315). Each beam has a width and a direction.

FIG. 3C illustrates a graph 320 and a graph 330. Similarly, the FIG. 3D illustrates the graph 340 and 350. The graphs 320 and 340 describe a targets distance from a radar source, such as the electronic device 200 of FIG. 2 or the electronic device 300 of FIGS. 3A and 3B. Line 322 (of graph 320 of FIG. 3C) and line 342 (of graph 340 of FIG. 3D), are the distance a detected object (such as a human body part) is from the electronic device over a period of time. For example, the line 322 (of graph 320 of FIG. 3C) indicates that the detected object is far from the electronic device as compared to the line 342 (of graph 340 of FIG. 3D). The distance the detected object is from the device can be identified based on radar signals. The graphs 330 and 350 illustrates a maximum TX power allowed based on corresponding distance.

Line 332 (of graph 330 of FIG. 3C) and line 352 (of graph 350 of FIG. 3D), is the maximum TX power based on a distance a human body part is from the device. For example, line 332 (of graph 330 of FIG. 3C) and line 352 (of graph 350 of FIG. 3D), are the maximum TX power based on a distance a human body part is from the device. For example, the line 332 of graph 330 of FIG. 3C indicates the maximum allotted TX power at each time instance based on the distance an object (accordingly to the line 322 of the graph 320 of FIG. 3C) is from the device at a corresponding time instance. Similarly, the line 352 of graph 350 of FIG. 3D indicates the maximum allotted TX power at each time instance based on the distance an object (accordingly to the line 342 of the graph 340 of FIG. 3D) is from the device at a corresponding time instance.

Lines 334 (of graph 330 of FIG. 3C) and line 354 (of graph 350 of FIG. 3D), is the maximum TX power allowed when radar is not used. This can be denoted as baseline or conservative measurement that satisfies any exposure regulations. That is, if radar is not used to detect objects within proximity of the electronic device (as indicated by line 334), then the MPE manager (such as the MPE engine 426 of FIG. 4B) assumes a worst-case scenario, such as when a human object is always close to the electronic device.

In certain embodiments, radar and communication modules are collocated. A random movement of an object and/or the electronic device, is assumed in the graph 320 of FIG. 3C and the graph 340 of FIG. 3D. The random movements cause slight changes to the distance between the object and the electronic device. As illustrated in the graph 320 of FIG. 3C, the target is more than 10 cm away from the radar source most of the time and it is very close only for a small fraction of the simulation time. It is assumed that the communication beam is fixed during the whole simulation and the UE always uses the maximum TX power allowed. This simulation shows that there is a substantial gain of about 8 dB for a majority of the time as shown on the graph 330.

It is noted that the gain mentioned above is when the target of exposure is beyond some threshold distance, and the gain depends on the scenarios. For example, if there is a target at a very close distance (e.g., in the worst-case exposure condition) the whole time or most of the time, then the gain will diminish and the maximum TX level allowable fluctuates substantially. This is described in FIG. 3D.

It is noted that the simulation assumptions of FIG. 3C are the same as the assumptions of FIG. 3D with one notable exception. One of the main differences between FIGS. 3C and 3D is based on the location of the target. For example, the distance between the detected object and the electronic device as illustrated in the graph 320 of FIG. 3C is between 0 and 60 cm while the distance between the detected object and the electronic device as illustrated in the graph 340 of FIG. 3D is between 0 and 4.5 cm. As such, the detected object is generally closer to the electronic device as indicated in the graph 340 of FIG. 3D and generally farther away from the electronic device as indicated in the graph 320 of FIG. 3C.

As illustrated in FIG. 3D the target is at very close distances (e.g., 2 cm) from the radar for a majority of the time. Because the target is close most of the time (as illustrated in FIG. 3D), the MPE management with radar tends to pick TX power allowed to be the same as the baseline solution (depicted by line 354), which corresponds to the worst-case exposure. Comparing graphs of FIG. 3D to FIG. 3C, it is observed that the gain is much less (in FIG. 3D as compared to the gain of FIG. 3C) over the baseline simply because the scenario does not provide opportunities to transmit at higher power (else it would cause over-exposure to the target).

Additionally, it can be observed from the FIGS. 3C and 3D that the maximum TX power allowed fluctuates more in the graph 350 of FIG. 3D (corresponding to an example when the object is generally close from the electronic device) compared to the graph 330 of FIG. 3C (corresponding to an example when the object is generally far from the electronic device). This kind of fluctuation might prevent a practical solution for reaping the benefit of this limited gain due to the limitation in how transmit power of a practical UE could be adjusted. Therefore the cost of operating radar (e.g., in terms of: (1) extra transmission resources for radar (such as spectrum utilization and the transmit power); (2) power dissipated in switching radar module between on and off states; and/or (3) the practical operational constraints on the UE to frequently adjust its transmit power; (4) etc.) could counter the gain, and it could be better to turn off the radar instead for such a scenario and operate using the baseline solution without sensing instead. Another benefit for running the baseline for such a scenario is the enhanced safety. This is because in this scenario the worst-case exposure can be expected to occur for most of the time and so it is more susceptible to any radar detection error that could cause over exposure.

As described above, the benefit from operation MPE management with radar depends on the scenarios. When the scenario has no target or when target is at a far distance from the electronic device most of the time, a stable high TX power could be allowed with MPE management using radar sensing. But if the scenario has target at close ranges most of the time, then there is too much uncertainty in estimating the exposure and over or undershoot the operational exposure goal (still maintaining the averaging exposure to be in compliant with the regulations) resulting in large TX power fluctuations which could be hard to use in practice.

Accordingly, embodiments of the present disclosure describe methods to determine when to operate MPE management using radar sensing so that at least the following advantages are achieved: (1) maximize gain in transmit power provided by radar-enabled MPE management; (2) most of the gains from radar-enabled MPE management while minimizing the cost of operating radar (in terms of the power consumption as well as the use of the wireless medium).

Although FIGS. 3A-3D illustrate electronic device 300 and radar signals, various changes can be made to FIGS. 3A-3D. For example, different antenna configurations can be activated, different frame timing structures can be used or the like. FIGS. 3A-3D do not limit this disclosure to any particular radar system or apparatus.

Figure 4A:
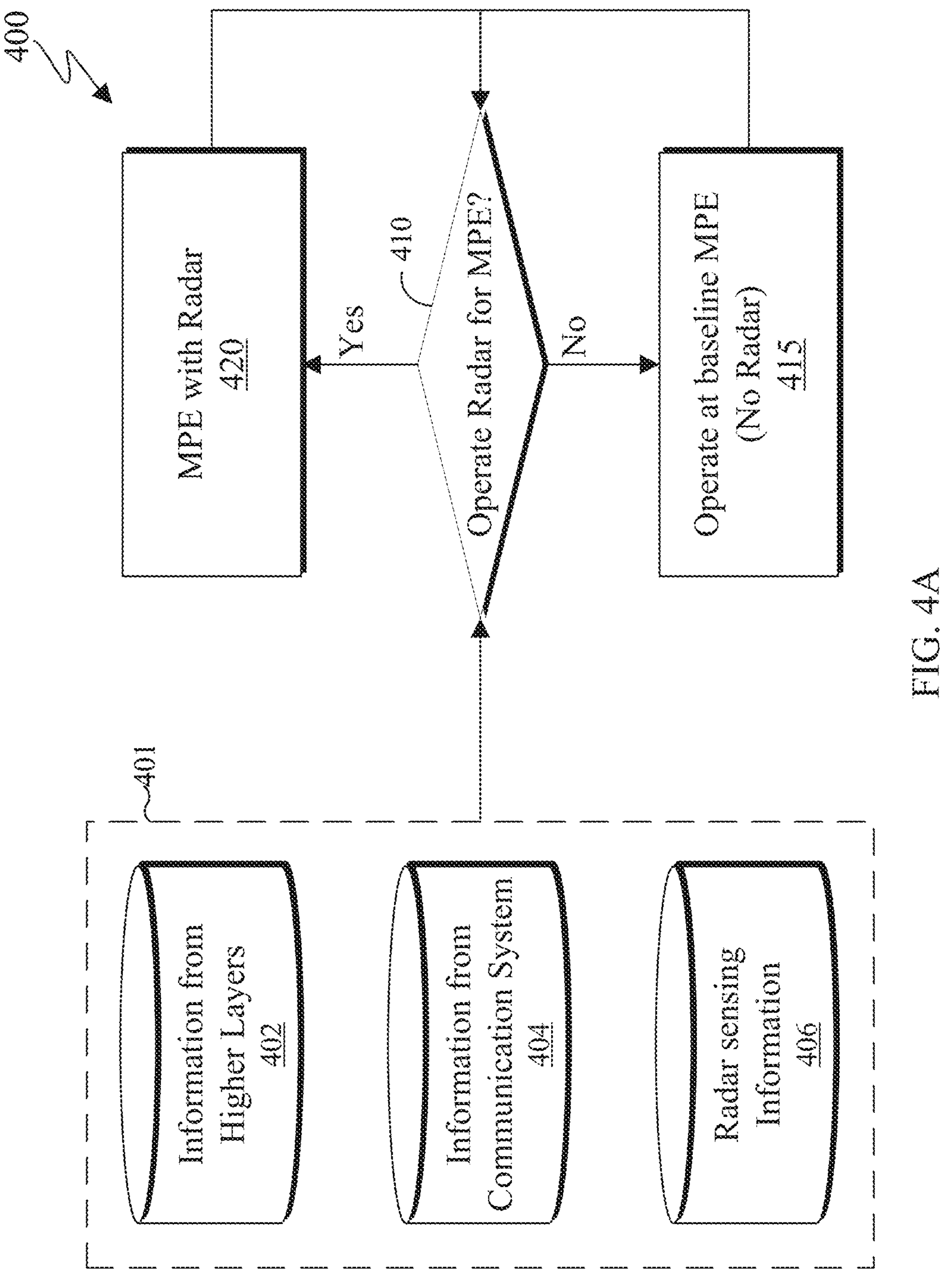
FIG. 4A illustrates an example signal processing diagram for using information from various sources to determine whether to use radar detection for managing radio frequency (RF) exposure according to embodiments of this disclosure.
Figure 4B:
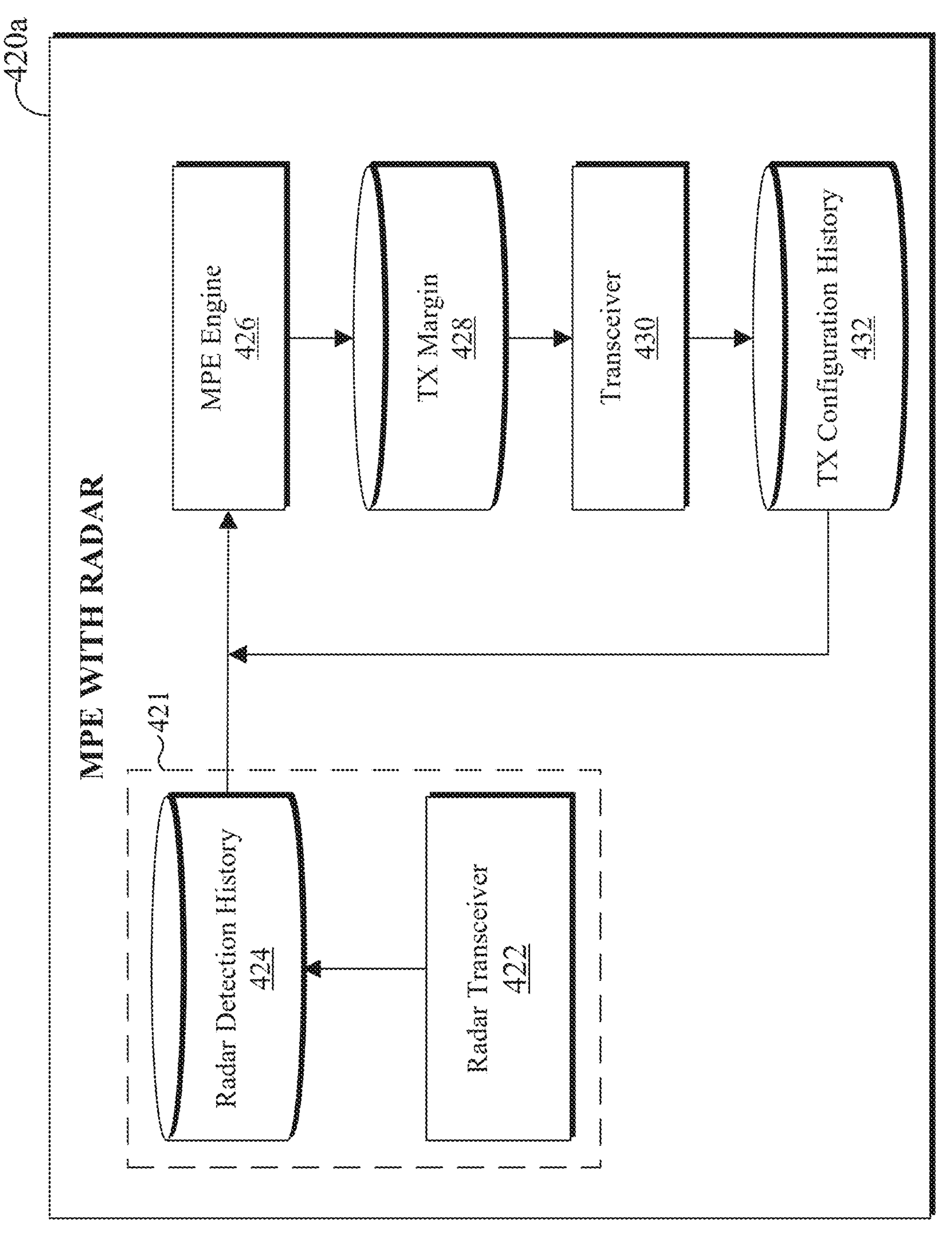
FIG. 4B illustrates a signal processing diagram for MPE management using radar according to embodiments of this disclosure.
Figures 4C, 4D:
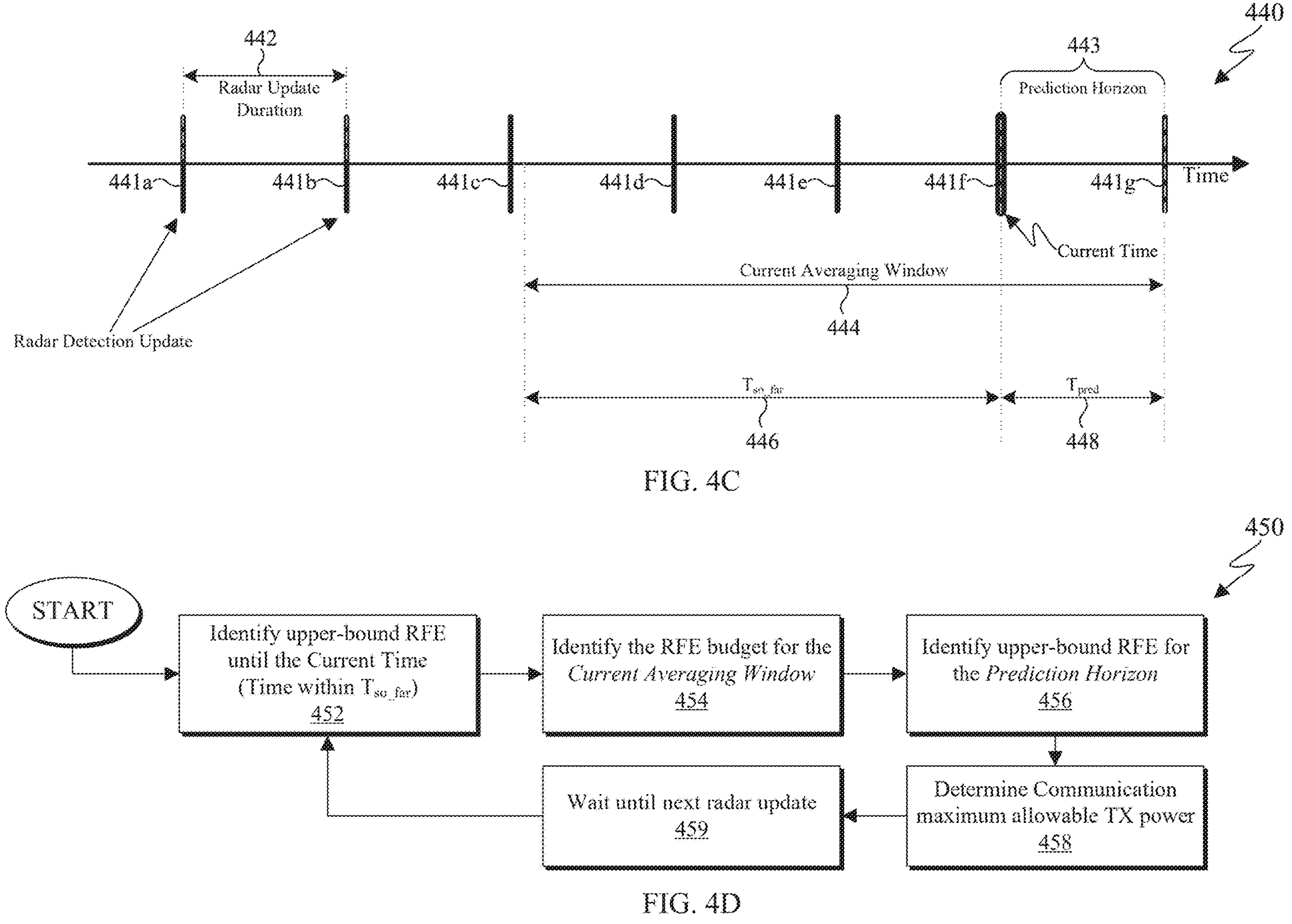
FIG. 4C illustrates an example timing diagram of radar updates according to embodiments of this disclosure.
FIG. 4D illustrates an example method for identifying RF exposure according to embodiments of this disclosure.

FIG. 4A illustrates an example signal processing diagram 400 for using information from various sources to determine whether to use radar detection for managing RF exposure according to embodiments of this disclosure. FIG. 4B illustrates a signal processing diagram **420*a* for MPE management using radar according to embodiments of this disclosure. FIG. 4C illustrates an example timing diagram 440 of radar updates according to embodiments of this disclosure. FIG. 4D illustrates an example method 450 for identifying RF exposure according to embodiments of this disclosure. The embodiments of the signal processing diagram 400, the signal processing diagram 420*a*, the timing diagram 440, and the method 450** are for illustration only. Other embodiments can be used without departing from the scope of the present disclosure.

The signal processing diagram 400, as illustrated in FIG. 4A, uses information 401 from one or more sources (e.g., from the higher layers such as the application layer, from the communication module, and from the radar) for MPE management for controlling RF exposure. The sources of information 401 can represent information repositories that are similar to or included within the memory 260 of FIG. 2. For example, the signal processing diagram 400 describes using one or more sources of information 401 to determine if it is beneficial to operate radar for MPE management purpose. That is, an electronic device (such as the any of the client devices 106-114 of FIG. 4, the electronic device 200 of FIG. 2, the electronic device 300 of FIGS. 3A and 3B, or the like) in step 410 determines whether to perform step 415 or step 420 for MPE management based on the information 401. The determination of which mode is selected provides a balance between using radar or not using radar for maintaining exposure compliance. For example, step 420 is performed when the electronic device determines (step 410) that it is beneficial to use radar for MPE management (step 420 is also denoted as the first mode) based on the information 401, while step 415 is performed when the electronic device determines (step 410) that it is beneficial to not use radar for MPE management (step 415 is also denoted as the second mode).

The first mode (MPE with radar, step 420) of the signal processing diagram 400 uses radar signals to assess the exposure level and opportunistically allow the transceiver to transmit wireless communication signals at high power when the exposure level is low (e.g., when detecting that there is no human body part at close range to the device). The process of using radar to access a situation is described in greater detail in FIG. 4B.

The second mode (MPE without radar, step 415) of the signal processing diagram 400, performs MPE management based on worst case exposure at all times since this mode lacks sensing capabilities to assess the current exposure level (e.g., due to lack of range information). Because of this, the MPE management without radar would tend to select more conservative transmit power (e.g., the baseline transmit power as indicated by lines 334 and 354 of FIGS. 3C and 3D, respectively). In certain embodiments, the operation of non-radar assisted MPE management can be for a set duration of time.

It is noted that while MPE management with radar could allow high TX power, the benefit depends on the scenarios (e.g., when there is a body part at close range most of the times, the gain could be expected to be small as described above in FIG. 3D), and there is also the cost of operating radar. As such the signal processing diagram determines (step 410) whether to perform step 420 (operate the first mode-MPE with radar) or perform step 415 (the second mode-MPE without radar), based on the information 401.

The sources of information 401 includes information 402 from higher layers, information 404 from the communication system, and radar sensing information 406. Information 402 from higher layers includes information from an application layer, such as a desired communication throughput. In certain embodiments, higher layers correspond to the open system interconnection (OSI) model above the physical layer. Information 404 from the communication system include information form the wireless communication system such as link quality, and the like. The radar sensing information 406 includes information from the radar transceiver, such as the radar transceiver 270 of FIG. 2. For example, the radar sensing information 406 can include information such as the bandwidth that radar signals were transmitted. For another example, the radar sensing information 406 can include information such as whether an object was detected and the distance a detected object is from the electronic device itself.

In certain embodiments, the determination of step 410 can use all three sources of information 401. In other embodiments, the determination of step 410 can use one or more of the sources of information 401. For example, FIGS. 7A-8B describe examples of using the radar sensing information 406 to determine, in step 410, which MPE mode is selected. For another example, FIGS. 9A, 9B, 9C, and 9D describe examples of using the information 402 from higher layers to determine, in step 410, which MPE mode is selected. For another example, FIGS. 10A-10D describe examples of using the information 404 from communication systems to determine, in step 410, which MPE mode is selected. For yet another example, FIG. 11 describes an example of using the information 401 from all of the information repositories (such as information 402 from higher layers, information 404 from the communication system, and radar sensing information 406) to determine, in step 410, which MPE mode is selected.

The signal processing diagram 400 describes the process of determining (step 410) whether it is beneficial to perform step 420 or step 415 based on past and present radar detection results, from the radar sensing information 406. Step 420 is performed when the electronic device determines (step 410) that it is beneficial to use radar for MPE based on past and present radar detection results, from the radar sensing information 406. Step 415 is performed when the electronic device determines (step 410) that it is beneficial to not use radar for MPE, based on past and present radar detection results, from the radar sensing information 406.

In certain embodiments, an electronic device can determine a first set of metrics based on a current radar-sensing result and one or more previous radar-sensing results. The electronic device can compare the first set of metrics against one or more first thresholds. The electronic device can also determine whether to use baseline, non-radar-assisted MPE management (the second mode—MPE without radar, step 415) or radar-assisted MPE management (first mode—MPE with radar), step 420 based on the result(s) of the comparison. For a first set of comparison results, the electronic device can use baseline, non-radar-assisted MPE management (the second mode—MPE without radar), step 415, for the communication module for a set duration of time. For a second set of comparison results, or after a predefined duration of time has expired, the electronic device can use radar-assisted MPE management (first mode—MPE with radar), step 420, for the communication module.

In addition to using the radar sensing information 406, the determination of using non-radar-assisted MPE management (the second mode—MPE without radar, step 415) or radar-assisted MPE management (first mode—MPE with radar, step 420) can be based on non-radar information such as the information 402 from higher layers and/or the information 404 from the communication system. To use the additional sources of information, the electronic device can determine a second set of metrics based on information from higher layers (one or more layers that are above the physical layer), communication metrics provided by the communication module, and/or information about a state of the electronic device. When one or more conditions are met for the second set of metrics, the electronic device can compare the first set of metrics against the one or more first thresholds and comparing the second set of metrics against one or more second thresholds. The electronic device, based on the results of the comparisons, can then determine whether to use the second mode (MPE without radar of step 415) or first mode (MPE with radar of step 420) for MPE management.

When using radar for MPE (step 420), the electronic device can appropriately select a radar mode, such as which radar band to use. Selecting one radar band can be based on the first set of metrics. Additionally, switching between the radar bands can be based on whether a target is detected by wideband radar within a time window.

Embodiments of the present disclosure describe two classes of radar. The classes of radar can include a first bandwidth and a second bandwidth. It is noted that more or less radar classes can be used. The first radar class can be a NB radar while the second radar class can be WB radar. In certain embodiments, when operating MPE with radar (step 420), the radar signals can be (i) WB radar, (ii) NB radar, or (iii) both WB radar and NB radar.

NB radar is a radar with a relatively small transmission bandwidth, e.g., a bandwidth of 100 MHz or less. Due to the limited bandwidth, NB radars have limited range resolution. For example, with a bandwidth of 100 MHz, the range resolution of the radar can be approximately 1.5 m. An example of a NB radar could be a radar operating the cellular signal waveform such as the 5G waveform (or any other waveform adopted in the corresponding communication system). This could be a radar that leverages the 5G uplink transmission to perform radar measurements. That is, in this case there is no dedicated radar transmission; it only needs the radar receiver to be on during the 5G uplink transmission. The 5G waveform could use only the reference signal or the data part could also be used. In many communications systems like 5G, the bandwidth is often limited, and this is especially true when using only the reference signal. Thus, such a radar tends to be narrowband with limited range resolution.

A WB radar refers to a radar with large transmission bandwidth, e.g., on the order of GHz. For example, a WB radar with 5 GHz transmission bandwidth has a range resolution of 3 cm. An example of a wideband radar may be a radar running in some unlicensed bands such as the 60 GHz radar, where multi GHz of spectrum is available.

FIG. 4B illustrates the signal processing diagram 420*a*. The signal processing diagram 420*a*, describes an example process for controlling RF exposure, when MPE with radar, step 420, of FIG. 4A is selected.

The signal processing diagram 420*a* includes several information repositories, including a radar detection history 424, a transmission margin 428, and transmission configuration history 432. These information repositories can be similar to or included within the memory 260 of FIG. 2. The signal processing diagram 420*a* also includes a radar transceiver 422, which can be similar to the radar transceiver 270 of FIG. 2. The signal processing diagram 420*a* further includes transceiver 430 which can be similar to the transceiver 210 of FIG. 2.

The radar transceiver 422 transmits and receives radar signals. The received radar signals are used to detect objects which are stored in the radar detection history 424. The electronic device logs any detected results in the radar detection history 424. The portion 421, which includes the radar transceiver 422 and corresponding radar detection history 424 are described in greater detail below in FIGS. 5-6F.

The transceiver 430 logs its adopted transmission configuration such as the transmit power, the beam index used, the duty cycle and the like to the TX configuration history 432. Based on (i) whether an object is detected (as indicated in the radar detection history 424) and (ii) previous RF exposure levels (as indicated in the TX configuration history 432) the MPE engine 426 estimate the worst-case RF exposure (also denoted as upper-bound exposure) and derive the transmission margin 428. The transmission margin 428 is a level of RF transmission that would not lead to RF exposure violation, which occurs when a user is exposed to RF above the margin.

It is noted that the update rate of the TX configuration and the radar detection may not be the same. For example, the update rate of the TX configuration could be almost instantaneous (or can practically assume so), while radar detection could be done sporadically due to the constraint on the radar transmission and/or the computational cost for running the radar detection procedure.

Radar detection is conducted at discrete time instances, such as described in the example timing diagram 440 of FIG. 4C. RF exposure (RFE) is defined in regulations and guidelines from regulatory bodies. RFE is exposure values averaged over a certain duration of time. The averaging window length and the amount of RFE is defined by regulatory bodies (such as the FCC), where specific numbers could depend on the regulatory agency). For example, the current regulation for RF exposure per the FCC is based on an averaging window of 4 seconds for frequency greater than 6 GHz.

Radar detection is updated after some radar transmission duration, and there are a certain number of radar detection updates within an averaging window for RFE estimation. For example, the timing diagram 440 of FIG. 4C includes multiple time instances such as time 441*a*, 441*b*, 441*c*, 441*d*, 441*e*, 441*f*, and 441*g*. It is noted that at time 441*a*, 441*b*, 441*c*, 441*d*, and 441*e* correspond to previous time instances. The time 441*f* is the current time. The time 441*g* is a future time instance.

At each time instance radar detection is updated. The radar update duration 442 is the time between two time instances that the radar detection is updated. The time interval between the current time (at time 441*f*) and the future time (at time 441*g*) is referred to as the prediction horizon 443. As illustrated in timing diagram 440 there are four radar detection updates within the averaging window 444 including the update at the 'current time' and the prediction horizon 443. More or less radar detection updates can be selected for an averaging window in other embodiments.

In certain embodiments, the upper-bound RFE is estimated for two parts: one for what already happened so far in the averaging window up to the current time (i.e., the RFE for the duration $T_{sofar}$ 446), and the other for the not-yet-known future in the prediction horizon until the next radar detection update (i.e., the RFE for the duration $T_{pred}$ 448). As illustrated in the timing diagram 440, the $T_{sofar}$ 446 corresponds to the time interval from 441*c* through 441*f* and the $T_{pred}$ 448 corresponds to the prediction horizon 443 (time interval between 441*f* and 441*g*).

Based on the three radar detection updates and the adopted TX configuration, within $T_{sofar}$ 446, the RFE estimator could estimate the exposure level so far to determine what RFE budget is left before reaching the RFE regulation limit. Denote $RFE_{lim}$ the MPE defined by the regulation, $RFE_{up}(T_{sofar})$ the upper-bound RFE estimate for the duration $T_{sofar}$, the RFE budget for the prediction horizon is described in Equation (10), below. Then, the upper-bound RFE during the prediction horizon $RFE_{pred}(T_{pred}, P_{ref})$ is estimated assuming some communication TX power reference $P_{ref}$. The maximum allowable TX power can then be derived as described in Equation (11), below.

$$RFE_{budget} = RFE_{lim} - RFE_{up}(T_{sofar}) \tag{10}$$

$$P_{max} = P_{ref} + 10\log_{10}\frac{RFE_{budget}}{RFE_{pred}(T_{pred}, P_{ref})} \tag{11}$$

It is noted that Equation (11) assumes that the upper-bound estimates for $RFE_{up}(T_{sofar})$ and $RFE_{pred}(T_{pred}, P_{ref})$ are always upper-bound, otherwise $RFE_{lim}$ could be exceeded. To account for such potential errors in the estimates, more sophisticated methods could be used to determine Pmax. This formula is provided for a complete description and the disclosed embodiments do not depend on this choice of solution for computing Pmax. These high-level steps are described in FIG. 4D.

In certain embodiments, the radar detection so far up to the present time may or may not be used for estimating the RFE for the prediction horizon. This consideration may depend on the expected variability of the target and the length of the prediction horizon. For example, if the prediction horizon is relatively long, then the target locations cannot be predicted reliably and thus it might be safer to assume worst case exposure (e.g., the exposure level when the body part is on the device surface) for the prediction horizon.

The method 450, as illustrated in FIG. 4D describes an example procedure for estimating the upper-bound RFE of the current averaging window (such as the current averaging window 444 of FIG. 4C). Estimating the upper-bound RFE of the current averaging window can include (i) a duration within the averaging window up to the present time (already happened within $T_{sofar}$ 446) and the other for the prediction horizon 443 ($T_{pred}$ 448), which has not yet happened.

In step 452, the electronic device (such as the electronic device 200 of FIG. 2) identifies an upper-bound RFE. This is the time within the averaging window up to the present time (already happened within $T_{sofar}$ 446).

In step 454, the electronic device identifies the RFE budget for the current averaging window. This can be an amount of RFE allotted for a given averaging window (such as the current averaging window 444) as described in Equation (10), above.

In step 456, the electronic device identifies an upper bound RFE for the prediction horizon. In certain embodiments, to identify the upper bound RFE for the prediction horizon, the electronic device can use the radar detection history of step 452.

In step 458, the electronic device determines a maximum allowable transmission power for communication signals. In certain embodiments, to determine a maximum allowable transmission power for communication signals, the electronic device can use Equation (11), as described above.

In step 459, the electronic device waits until the next radar detection update. The averaging window 444 shifts to accommodate the new radar detection update and the process repeats.

Although FIGS. 4A-4D illustrates the signal processing diagrams 400 and 420*a*, the timing diagram 440, and the method 450, various changes can be made to FIG. 4A-4D. For example, while the method 450 includes a series of steps, various steps in FIG. 4D could overlap, occur in parallel, or occur any number of times.

Figure 5:
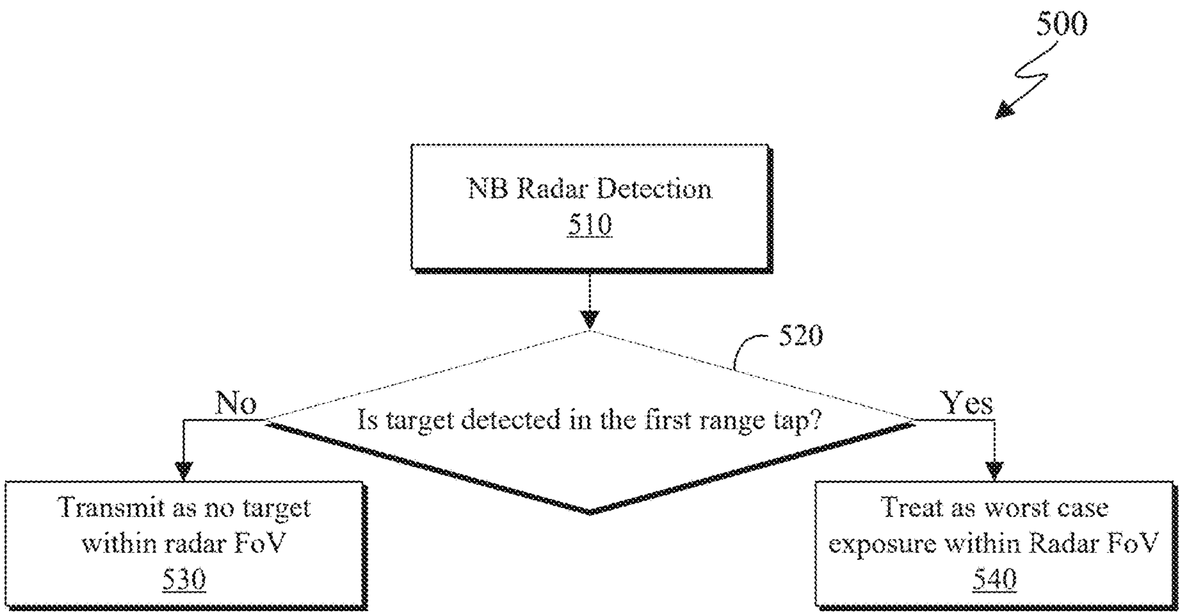
FIG. 5 illustrates an example method for MPE management using narrowband (NB) radar according to embodiments of this disclosure.
Figure 6A:
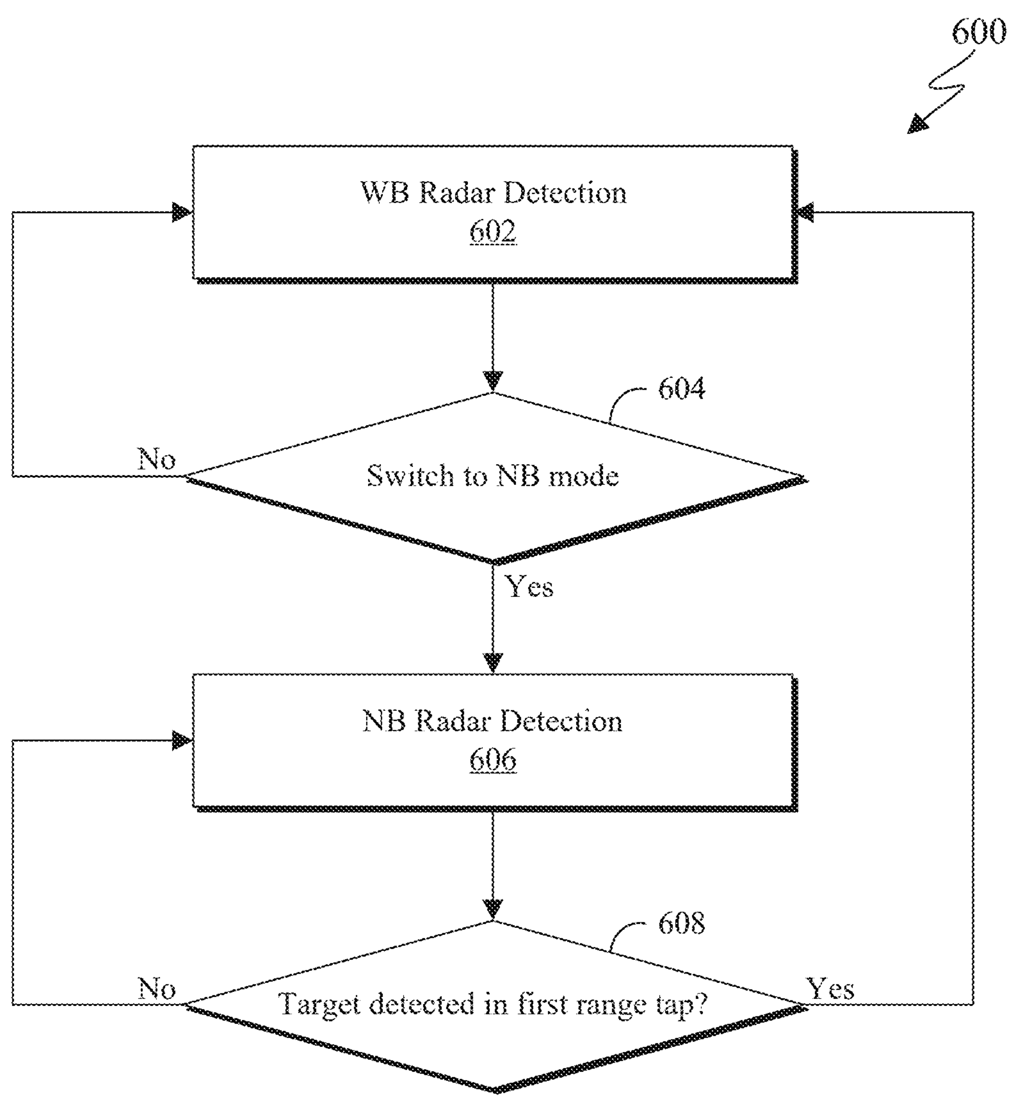
FIGS. 6A-6D illustrate example methods for MPE management using NB and wideband (WB) radar according to embodiments of this disclosure.
Figure 6B:
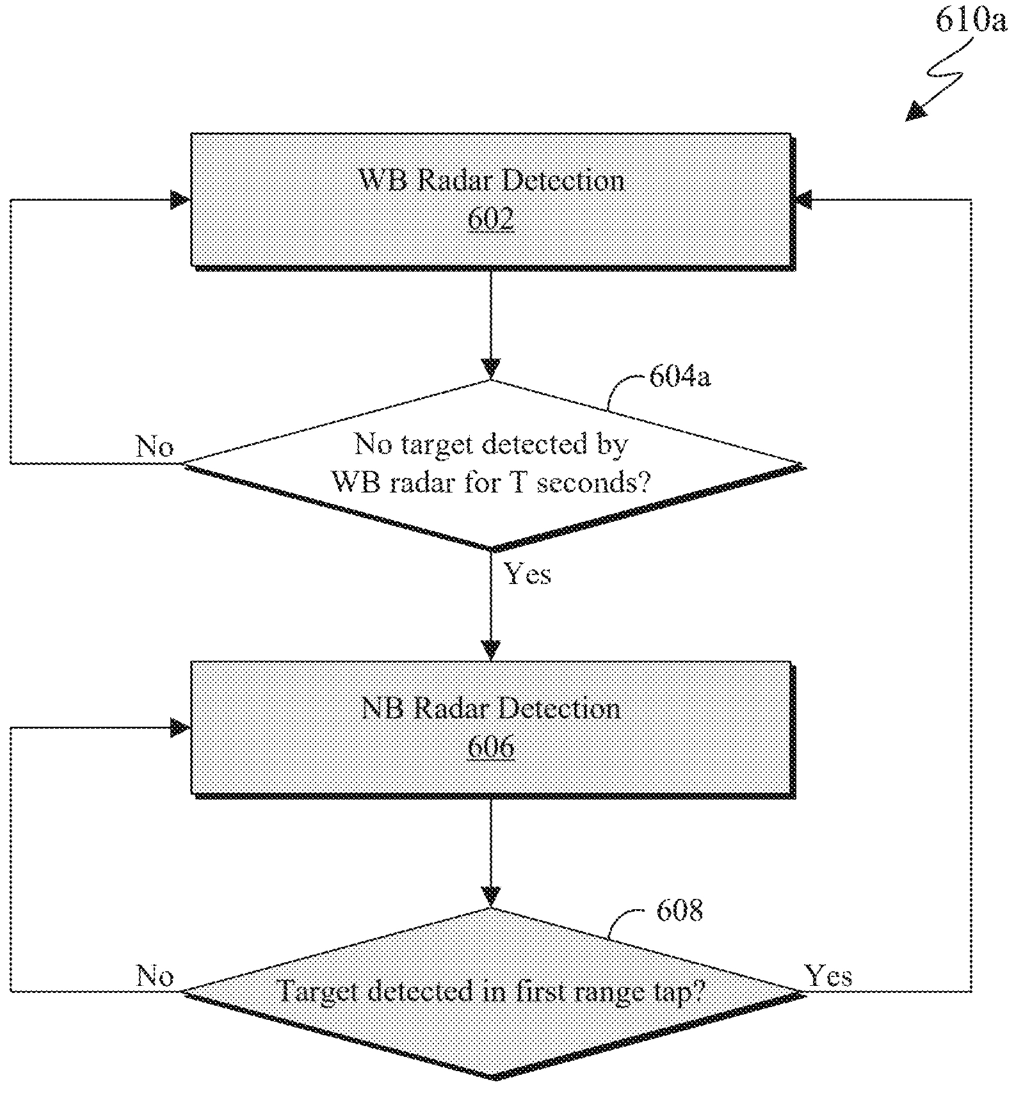
Figure 6C:
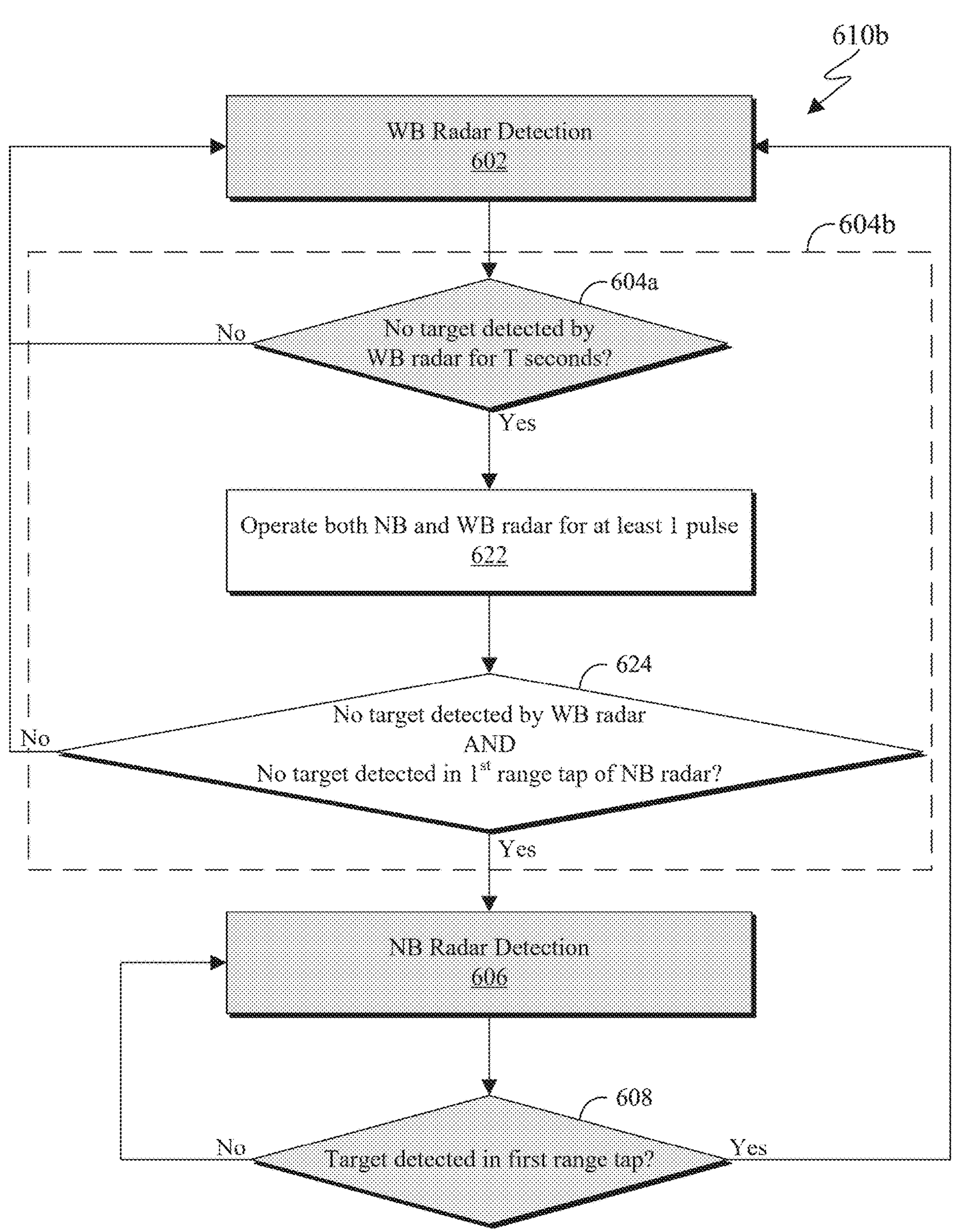

FIG. 5 illustrates an example method 500 for MPE management using NB radar according to embodiments of this disclosure. FIGS. 6A-6D and 6F illustrate example methods 600, 610*a*, 610*b*, 610*c*, and 610*d*, respectively, for MPE management using NB and WB radar according to embodiments of this disclosure. FIG. 6E illustrates an example diagram 660 when NB radar range resolution is larger than the maximum range of the WB radar according to embodiments of this disclosure. The embodiments of the method 500 of FIG. 5, the method 600 of FIG. 6A, the method 610*a* of FIG. 6B, the method 610*b* of FIG. 6C, the method 610*c* of FIG. 6D, the method 610*d* of FIG. 6F, and the diagram 660 of FIG. 6E are for illustration only. Other embodiments can be used without departing from the scope of the present disclosure.

The methods 500, 600, 610*a*, 610*b*, 610*c*, are 610*d* are described as implemented by any one of the client devices 106-114 of FIG. 1, the server 104 of FIG. 1, the electronic device 300 of FIGS. 3A and 3B and can include internal components similar to that of electronic device 200 of FIG. 2. For ease of explanation, method 500 600, 610*a*, 610*b*, 610*c*, are 610*d* are described as being performed by the electronic device 200 of FIG. 2.

As described above, when operating MPE with radar, step 420 of FIG. 4A, the radar signals can be (i) WB radar, (ii) NB radar, or (iii) both WB radar and NB radar. One of the main differences between WB and NB radar is their bandwidth. The implication is that WB radar can provide very fine range resolution (e.g., several cm), while NB radar may have a range resolution of meter level. Another notable aspect of these two types of radars in our context is that NB radar could be operated in a passive manner by leveraging the existing 5G uplink transmission opportunities of the communication system. In this case, the operation of the NB radar only uses radar receiver operation and does not consume extra transmission resources (i.e., spectrum utilization, and the transmit power). As such, NB radar and can be expected to be less expensive to operate compared to a WB radar.

Figure 6D:
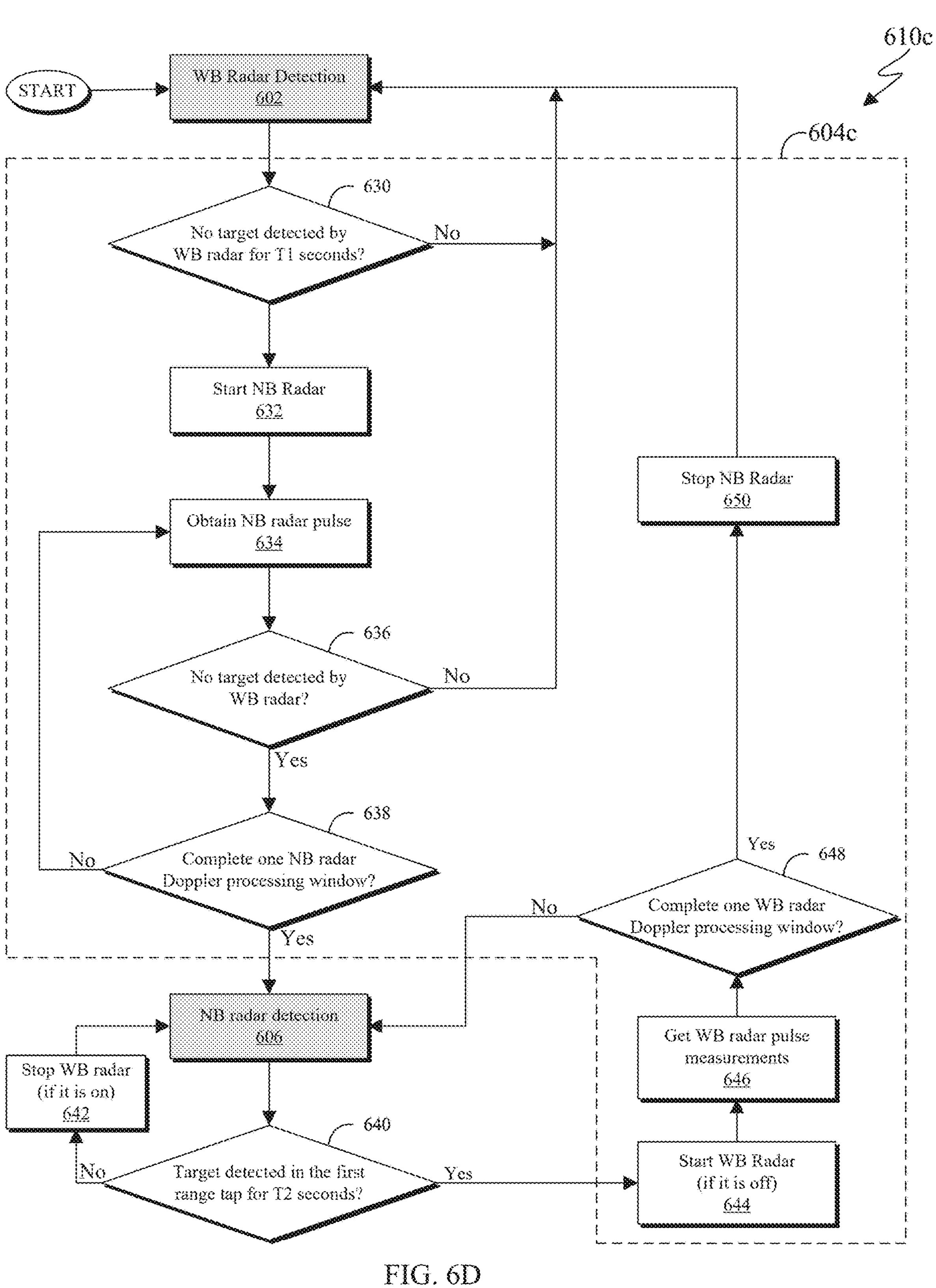
Figure 6E:
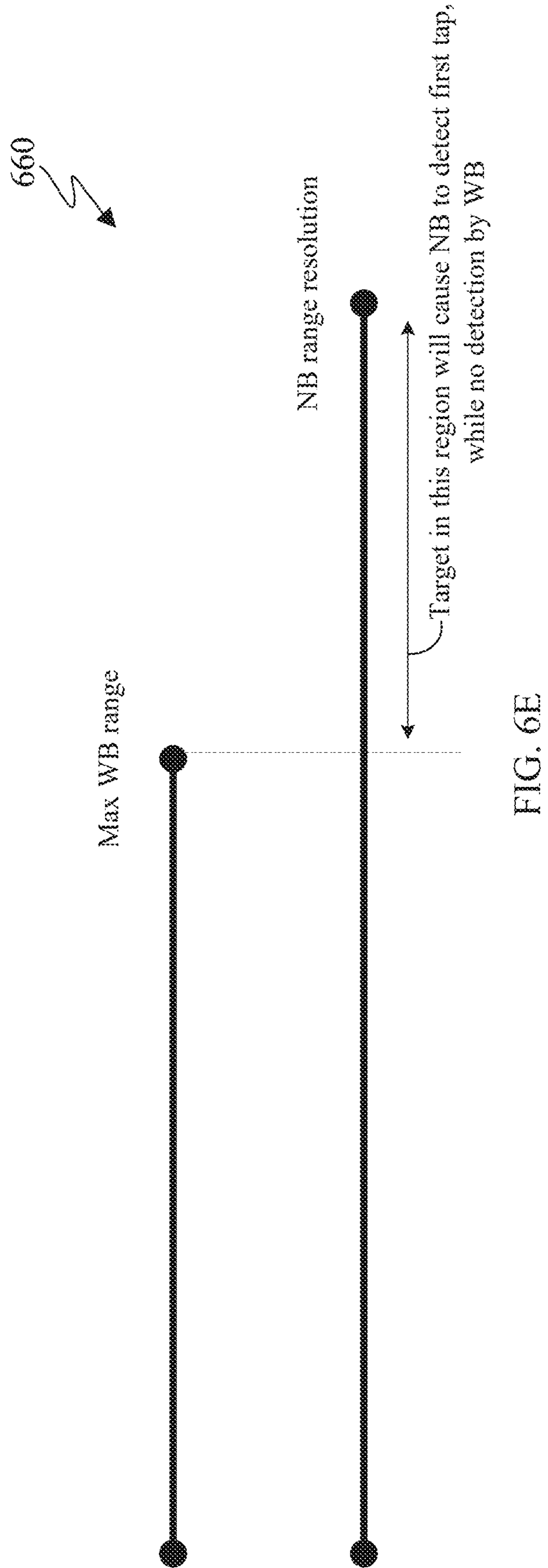
FIG. 6E illustrates an example diagram when NB radar range resolution is larger than the maximum range of the WB radar according to embodiments of this disclosure.

FIGS. 5-6D describe MPE management using radar (step 420 of FIG. 4A and the signal processing diagram 420*a* of FIG. 4B) where the radar could be (i) WB radar, (ii) NB radar, or (iii) both WB radar and NB radar. In particular, FIGS. 5-6D, describe how these three types of radar signals generate respective radar detection results and how the MPE engine 426 (of FIG. 4B) uses these respective radar detection results to estimate exposure and thus estimate the TX margin.

In certain embodiments, the MPE engine 426 (of FIG. 4B) uses only WB radar signals. WB radars can provide the highest information contents. Since the range resolution is high, the range information could be provided to the MPE engine 426, which could be used by the MPE engine 426 to estimate the exposure level. If the radar has multiple antennas, the estimated angle of the target may be estimated and used by the MPE engine 426. Angle information may also be useful when directional beams are used by the communication system.

In certain embodiments, the MPE engine 426 (of FIG. 4B) uses only NB radar. NB radar is more limited in its range resolution (as compared to WB radar). For example, with meter-level range resolution, the range information is not useful for estimating the exposure level. This is because the transmit power density dissipates quickly following the inverse square law, and from the exposure estimation perspective, the most important range is within close distances from the device (e.g., a few cm to 10 cm). Due to this limitation, operating MPE management with a NB radar may make more sense to just use the detection status rather than the range itself. This is described in method 500 as illustrated in FIG. 5.

In step 510, an electronic device (such as the electronic device 200) performs object detection using NB radar. In step 520, the electronic device determines whether an object is detected in the first range tap. When detecting there is a target in the first range tap (i.e., that there is a target within the first range resolution, and there is substantial uncertainty in the actual range of the target from the device), the electronic device (using the MPE engine 426) in step 540 treats the case like when there is a target with the worst case exposure within the FoV of the radar. When no target is detected in the first range tap, the electronic device in step 530 can continue to transmit the communication signals as if there is no target within the radar FOV.

It is noted that radar may detect reliably only within its FoV, which could be defined by the antenna patterns of the radar. To estimate the exposure, the target location and the communication beam patterns need to be known. Those patterns can be measured at time of manufacture and thus it is assumed that this information is available and stored in the memory of the electronic device. To avoid overexposure, it may be desirable to assume always worst-case exposure outside the FoV of the radar, since radar cannot detect reliably outsides its FoV. As such, the worst-case exposure situation (e.g., human body part is positioned on the surface of the electronic device the whole time) is assumed at locations outside the radar FoV. The worse between the exposure within the radar FoV and outside the radar FoV is then used by the MPE engine 426 as the exposure estimate for the MPE management purpose.

In certain embodiments, if the radar hardware of the electronic device is capable of supporting both WB and NB radar detection, then the two could be combined to take full advantage of radar detection while minimizing the cost of operating radar. Embodiments of the present disclosure take into consideration that fine range resolution (as provided by WB radar) is only desirable when an object is detected at close range. At far range, either WB or NB radar can detect adequately for MPE management. That is, the MPE engine 426 (of FIG. 4B) uses both NB radar and WB radar. Using both NB and WB radar is described in FIGS. 6A-6D.

Generally, FIGS. 6A-6D describe scenarios where the lower cost NB radar is operated for monitoring the environment around the electronic device when there is no target in the close range (e.g., when detecting a target in the first range tap of NB radar); WB radar is operated for monitoring the environment around the electronic device when an object is detected at a close range. Accordingly, the FIGS. 6A-6D describe example methods of an electronic device switching between WB radar and NB radar.

The method 600, as illustrated in FIG. 6A describes a high-level operation of using both NB radar and WB radar for object detection for MPE management. In step 602, the electronic device operates WB radar in order to obtain more detailed radar detection results for better assessment of the current situation.

After obtaining a radar detection result from WB radar, the electronic device in step 604 determines whether a condition is met. If the electronic device determines (in step 604) that the condition is not met, then the electronic device returns to step 602 and continues to operate WB radar (step 602). Alternatively, if the electronic device determines (in step 604) that the condition is met, then the electronic device in step 606 switch to a NB mode (further details provided in subsequent embodiments).

After obtaining a radar detection result from NB radar (step 606), the electronic device in step 608 determines whether another condition is met. For example, the electronic device in step 608 determines whether a target is detected in the first range tap of the NB radar (i.e., when there is a target detected within the NB radar resolution from the device, which may include close range such as a few cm from the device). If the electronic device determines that there is an object within the first tap (as determined in step 608), then the electronic device switches in step 602 from NB radar to WB radar for object detection in order to obtain a more accurate radar range estimate, which results in a better estimation of the exposure level. Alternatively, if the electronic device determines that there is no object within the first tap (as determined in step 608), then the electronic device continues to operate NB radar (step 606).

Embodiments of the present disclosure take into consideration that depending on the choice of radar processing, some non-negligible transition time between WB and NB radar mode could be required. There could be at least two options for radar detection here. Since the region of interest for radar detection is at close ranges, there may be a need to cancel the direct transmission between radar TX and radar RX (referred to as leakage). One way to cancel the leakage is based on some premeasured leakage reference signals. During the radar processing, this premeasured leakage reference signal is used to cancel the leakage from the current measurement by some subtraction methods, which could be a simple subtraction or some minimum mean square error (MMSE) based subtraction. With this first approach, the mode switch can happen instantaneously. Another method to cancel the leakage is to leverage the property that the leakage does not change with time (or changes very slowly with time). As such Doppler domain cancellation can be used to exploit this situation by nulling out the 0-Doppler (or more generally, some low Doppler frequency signals). With this second approach, a transition duration of at least the length of the Doppler processing window is needed.

FIGS. 6B-6D describe various examples for the condition of step 604 (when to switch from WB radar to NB radar). It can be assumed that a leakage reference based cancellation method is used, such as one described above. The condition of step 604 may depend on the range resolution of the NB radar and the maximum detection range of the WB radar.

FIG. 6B describes the method 610*a* for switching from WB to NB based on a leakage reference based cancelation and range resolution of NB radar that is smaller than a maximum detection range of WB radar. For example, if the range resolution of the NB radar is smaller than the maximum detection range of the WB radar, the switching condition could be as shown in FIG. 6B.

It is noted that certain steps of the method 610*a* are similar to the steps of the method 610 of FIG. 6A. As described above, in step 602, the electronic device operates WB radar in order to obtain more detailed radar detection results for better assessment of the current situation. The condition of step 604 of FIG. 6A can be whether no targets are detected by WB radar for T seconds (step 604*a*). For example, when there is no detection of an object by the WB radar, it also indicates that there should be no target detected at the first range tap of the NB radar. In this case, the switching can happen instantaneously and can create an oscillation between the two modes. To avoid oscillating between the two modes, the condition could be modified to check if the WB radar detects no target for at least T seconds, where T is a predefined threshold of time.

In certain embodiments, T should be chosen to reflect the duration that the usage behavior of the electronic device may become uncorrelated. For example, if a user is actively interacting with the device (e.g., holding the device and using the touch screen), it can be expected that no change will occur with the next one second. As such this threshold T could be selected in the order of several to tens of seconds. Alternatively, a fraction of time can be used within a duration T that a close-range target was detected, which is a softer condition. For example, the condition for switching to NB could be set to when no target detected by the WB radar for 95% of the time within a time window of duration T.

If the electronic device determines (in step 604*a*) that an object was detected by the WB radar within the T seconds window, then the electronic device returns to step 602 and continues to operate WB radar (step 602). Alternatively, if the electronic device determines (in step 604*a*) that no object was detected by the WB radar for T seconds, then the electronic device in step 606 switches to the NB mode.

After obtaining a radar detection result from NB radar (step 606), the electronic device in step 608 determines whether a target is detected in the first range tap of the NB radar. If the electronic device determines that there is an object within the first tap (as determined in step 608), then the electronic device switches from NB radar to WB radar (step 602) for object detection. Alternatively, if the electronic device determines that there is no object within the first tap (as determined in step 608), then the electronic device continues to operate NB radar (step 606).

FIG. 6C describes the method 610*b* for switching from WB radar to NB radar based on a leakage reference based cancelation and range resolution of NB radar that is larger than a maximum detection range of WB radar. The method 610*b* describes selecting between NB and WB radar mode based on detection results when the range resolution of the NB radar is larger than the maximum range of the WB radar. Here, the leakage reference based cancellation is assumed and thus each pulse individually could be used to detect targets. To resolve the ambiguity that even if WB radar does not detect any target, the NB radar could still detect a target in its first tap, an overlapping duration where both NB and WB radars operate is introduced.

The method 610*b* describes an embodiment when the range resolution of the NB radar is larger than the maximum detection range of the WB radar. In this case, even if no target is detected by the WB radar, it may still be possible that there is a target detected at the first range tap of the NB radar. To avoid having the MPE engine 426 assuming a worst case exposure with the switching attempt (which may result in a large fluctuation in the allowable maximum TX power for the communication module), the method 610*b* introduces a transition time that could accommodate at least one radar pulse of the NB radar and one radar pulse of the WB radar. It is noted that both WB and NB radar do not need to transmit at the same time. They may transmit in a time-division manner during this transition time that should be long enough to accommodate the at least two radars' pulses. In this case, the condition to make the transition is that there is no target detected by the WB radar for some duration, and that there is no target detected in the first range tap of the NB radar.

It is noted that certain steps of FIG. 6C are similar to the steps of FIGS. 6A and 6B. As described above, in step 602 (of FIGS. 6A and 6B), the electronic device operates WB radar in order to obtain more detailed radar detection results for better assessment of the current situation. The condition of step 604 of FIG. 6A is represented by block 604*b* of FIG.

6C. In step 604*a*, the electronic device determines whether no targets are detected by WB radar for T seconds (similar to FIG. 6B). As described above T should be chosen to reflect the usage behavior of the user of the device.

If the electronic device determines (in step 604*a*) that an object was detected by the WB radar for T seconds, then the electronic device returns to step 602 and continues to operate WB radar (step 602). Alternatively, if the electronic device determines (in step 604*a*) that no object was detected by the WB radar for T seconds, then the electronic device in step 622 operates both WB and NB radar for at least one pulse.

In step 624, the electronic device determines whether there are no targets detected by the WB radar and that there are no targets detected in the first range tap of the NB radar. If the electronic device determines (in step 624) that an object was detected by the WB radar or an object was detected by the NB radar in the first range tap, then the electronic device returns to step 602 and continues to operate WB radar (step 602). Alternatively, if the electronic device determines (in step 624) that no objects were detected by the WB radar and that no objects were detected by the NB radar in the first range tap, then the electronic device, in step 606, switches from WB radar to NB radar.

After obtaining a radar detection result from NB radar (step 606), the electronic device in step 608 determines whether a target is detected in the first range tap of the NB radar. If the electronic device determines that there is an object within the first tap (as determined in step 608), then the electronic device switches from NB radar to WB radar (step 602) for object detection. Alternatively, if the electronic device determines that there is no object within the first tap (as determined in step 608), then the electronic device continues to operate NB radar (step 606).

FIG. 6D describes the method 610*c* for switching between WB radar and NB radar based on detection results. The method 610*c* also describes the process of using Doppler processing for leakage cancellation, regardless of range resolution of the NB radar relative to the maximum detection range of the WB radar. Using Doppler processing for leakage cancellation means that the transition time between the radar mode requires at least one Doppler processing window duration.

It is noted that when Doppler processing is used for leakage cancellation, regardless of whether the range resolution of the NB radar is larger or smaller than the maximum detection range of the WB radar, a transition time of at least one Doppler processing window duration is needed, where this Doppler processing window duration may be the same as a radar update duration as described in FIG. 4C. This is because the NB radar based on Doppler processing needs to accumulate at least one radar Doppler processing window duration before it can start performing target detection.

One of the main differences between the method 610*c*, of FIG. 6D, and the method 610*a*, of FIG. 6B, is the non-negligible transition duration. For example, in the method 610*c*, the NB radar will need to accumulate measurements for at least one Doppler processing window duration of the NB radar before the switch can happen. During this transition time, both NB and WB radar are operating, thus it could be possible that the switch to the NB radar could be aborted if the WB radar detects some target during this transition time. In the same manner, when transitioning from NB mode to WB mode, there is a need to accumulate one WB radar Doppler processing duration before the switch can happen. During this transition time, the procedure is to keep checking the NB radar detection status. If the NB radar no longer detects a target at the first range tap, the attempt to switch to the WB radar is aborted. To mitigate the potential oscillation between the two modes, the method 610*c* of FIG. 6D uses two time based thresholds, denoted as $T_1$ and $T_2$, to control the two directions of the mode switch. In certain embodiments, the choices of $T_1$ and $T_2$ can be tailored to the scenario (such as whether saving power should be prioritized or not).

For example, if $T_1>T_2$, then this embodiment allows an easier switching condition from NB mode to WB mode. Since the WB mode consumes more power but could allow higher communication TX power (due to the more accurate MPE management), this choice is suitable when performance of the communication module is prioritized (such as when running applications that demand high data rate and the battery power is not low).

For another example, if $T_2>T_1$, then this selection makes it easier to switch from WB to NB than the reverse. Thus, it prefers the operation in the NB-mode, which can be expected to consume less power but might miss some opportunities for transmitting at high transmit power for the communication module. Therefore, this choice is appropriate when conserving power is of higher priority than high data rate.

For yet another example, if $T_1=T_2=T$, then this selection makes the ease of switching the mode the same for both directions. Setting T to a higher value means mode switch will be less likely. The potential reason to avoid mode switch is to reduce the potential of communication TX power fluctuation.

It is noted that certain steps of FIG. 6D are similar to the steps of FIGS. 6A, 6B, and 6C. As described above, in step 602 (of FIGS. 6A, 6B, and 6C), the electronic device operates WB radar in order to obtain more detailed radar detection results for better assessment of the current situation. The condition of step 604 of FIG. 6A is represented by block 604*c* of FIG. 6D.

Step 630 of FIG. 6D is similar to the step 604*a* of FIG. 6B. In step 630, the electronic device determines whether no targets are detected by WB radar for $T_1$ seconds. If the electronic device determines (in step 630) that an object was detected by the WB radar for $T_1$ seconds, then the electronic device returns to step 602 and continues to operate WB radar (step 602). Alternatively, if the electronic device determines (in step 630) that no object was detected by the WB radar for $T_1$ seconds, then the electronic device in step 632 starts NB radar. In step 634, the electronic device obtains NB radar pulse.

In step 636, the electronic device determines whether no targets are detected by WB radar. If the electronic device determines (in step 636) that an object was detected by the WB radar, then the electronic device returns to step 602 and continues to operate WB radar (step 602). Alternatively, if the electronic device determines (in step 636) that no object was detected by the WB radar, then the electronic device in step 638 determines whether one NB radar Doppler processing window is complete.

If the electronic device determines (in step 638) that one NB radar Doppler processing window is not complete, then the electronic device returns to step 634 and continues to operate NB radar. Alternatively, if the electronic device determines (in step 638) that one NB radar Doppler processing window is complete, then the electronic device in step 606 performs NB radar detection.

In step 640, the electronic device determines whether a target is detected in the first range tap for $T_2$ seconds using NB radar. If the electronic device determines (in step 640)

that no object was detected in the first range tap for $T_2$ seconds, the electronic device, in step 642, stops the WB radar (if it was still on) and returns to step 606. Alternatively, if the electronic device determines (in step 640) that an object was detected in the first range tap for $T_2$ seconds, then the electronic device, in step 644, starts the WB radar (if it is off)

In step 646, the electronic device obtains WB radar pulse measurements. In step 648, the electronic device determines whether one WB radar Doppler processing window is complete. If the electronic device determines (in step 648) whether one WB radar Doppler processing window is not complete, then the electronic device returns to step 606. Alternatively, if the electronic device determines (in step 648) that one WB radar Doppler processing window is complete, then the electronic device in step 650 stops the NB radar. After the NB radar is stopped (in step 650) the process returns to step 602.

Figure 6F:
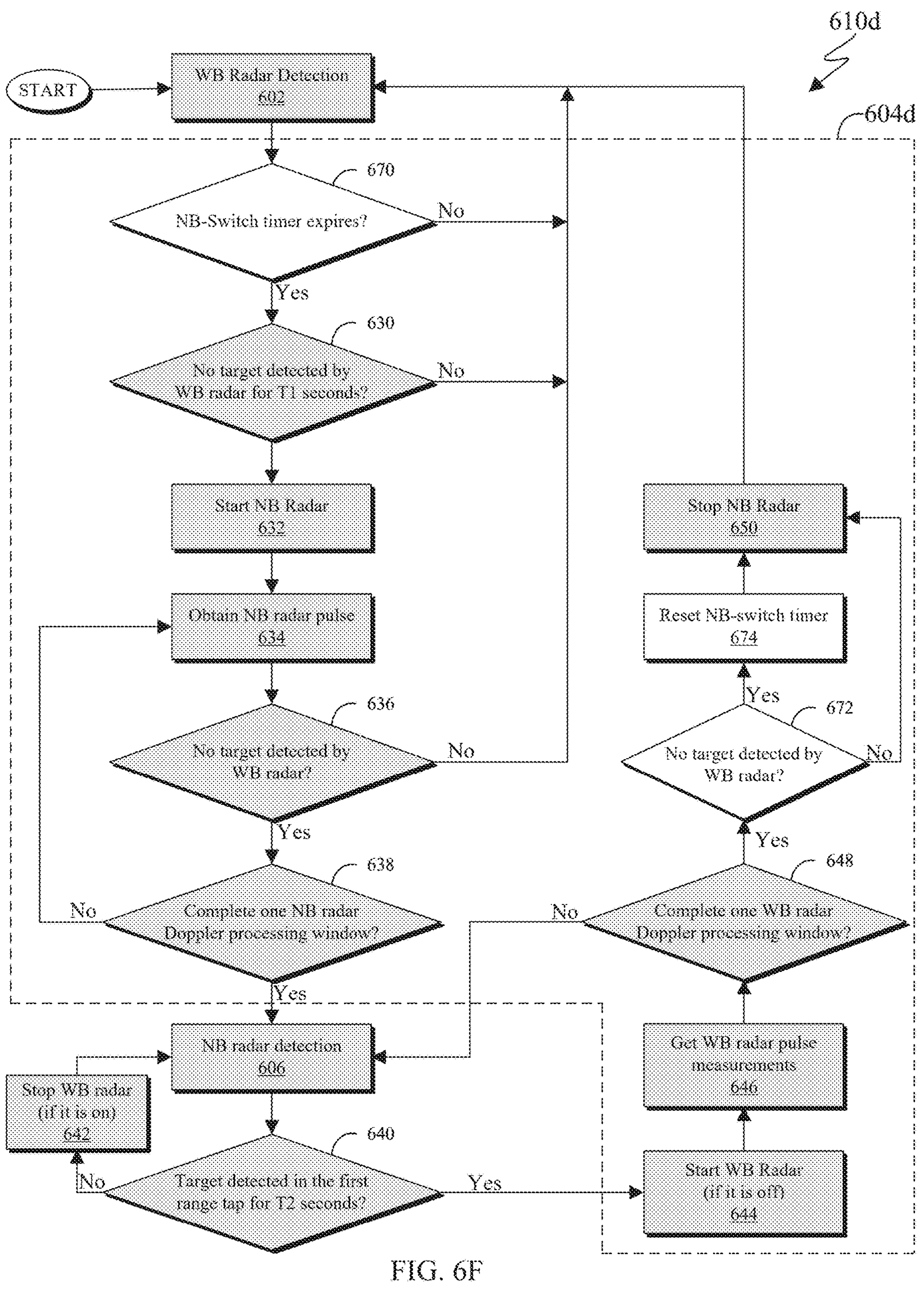
FIG. 6F illustrates an example method for MPE management using NB and WB radar according to embodiments of this disclosure.

It is noted that the method 610*c* of FIG. 6D can apply both the case when the range resolution of the NB radar is smaller or larger than the maximum detection range of the WB radar. However, for the case when the range resolution of the NB radar is larger than the maximum detection range of the WB radar, the switching conditions still leave uncertainty that could make it more likely to oscillate between the two modes. The situation of interest is when there is a target at a range that is larger than the maximum range of the WB radar but less than the range resolution of the NB radar, the NB radar would detect a target in its first range tap, but the WB radar would not detect any target (see FIG. 6E). In this scenario, it is desirable for the communication performance to still operate the WB mode. What it means is that the attempt to switch to NB mode can be considered wasteful (the cost of starting the NB mode is wasteful). As a way to reduce the likelihood of this fruitless switching attempt, a timer could be introduced to the method 610*c* of FIG. 6D, as shown in FIG. 6F. When this situation is detected, the timer is reset, and it would prevent another attempt to switch to the NB mode until the timer expires.

The diagram 660 as illustrated in FIG. 6E describes the problematic range interval when the NB radar range resolution is larger than the maximum range of the WB radar. When a target is in this problematic range, the WB radar would not detect a target but the NB radar may still detect a target in its first range tap.

FIG. 6F describes the method 610*d* for switching between WB radar and NB radar based on detection results. The method 610*d* also describes the process of using Doppler processing for leakage cancellation, indicating that the transition time between the radar mode requires at least one Doppler processing window duration. This embodiment aims at the case when the NB radar range resolution is larger than the maximum WB radar detection range, where there could be oscillation between the two radar modes if there is a target in the problematic range interval as illustrated in FIG. 6E. A timer is introduced to mitigate this problem. As such, one of the main differences between the method 610*c*, of FIG. 6D, and the method 610*d*, of FIG. 6F, is the inclusion of the timer. Accordingly, certain steps of FIG. 6F are similar to the steps of FIG. 6D.

In step 670, the electronic device determines whether a timer expires. In response to determining that the timer does not expire, the electronic device returns to step 602 and continues to operate WB radar (step 602). Alternatively, in response to determining that the timer did expire, the electronic device proceeds to step 630 (and follows a similar procedure as described in FIG. 6D such as steps 630 through 648).

In step 648, the electronic device, determines whether one WB radar Doppler processing window is complete. After determining that one WB radar Doppler processing window is complete, the electronic device in step 672 determines whether a target is detected by the WB radar. When no target is detected by the WB radar (as determined in step 672), the electronic device in step 674 resets the NB-switch timer. After resetting the NB-switch timer (step 674) or after determining that a target is detected by the WB radar, the electronic device in step 650 stops the NB radar. After the NB radar is stopped (in step 650) the process returns to step 602.

Although FIGS. 5-6F illustrates examples for managing MPE using radar, various changes may be made to FIGS. 5-6F. For example, while shown as a series of steps, various steps in FIGS. 5-6F could overlap, occur in parallel, or occur any number of times.

FIGS. 7A-11 describe the step 410 (of FIG. 4A) in greater detail. For example, these figures describe various methods for determining whether to use the second mode (MPE without radar, step 415) or first mode (MPE with radar, step 420). In particular, FIGS. 7A-8B describe using radar sensing information to determine (in step 410 of FIG. 4A), which MPE mode is selected, while FIGS. 9A-10D describe examples of the using non-radar sensing information to determine (in step 410 of FIG. 4A), which MPE mode is selected. Additionally, FIG. 11 describes an example of the using both radar sensing information and non-radar sensing information to determine (in step 410 of FIG. 4A), which MPE mode is selected.

The methods of FIGS. 7A-11 are described as implemented by any one of the client devices 106-114 of FIG. 1, the server 104 of FIG. 1, the electronic device 300 of FIGS. 3A and 3B and can include internal components similar to that of electronic device 200 of FIG. 2. For ease of explanation, methods of FIGS. 7A-11 are described as being performed by the electronic device 200 of FIG. 2. The embodiments of the methods of FIGS. 7A-11 are for illustration only. Other embodiments can be used without departing from the scope of the present disclosure.

FIGS. 7A-8B describe leveraging the radar sensing capability to assess the 'busy-ness' of the environment to decide if it is beneficial to operate radar for MPE management. A busy environment refers to the case when there is a target of exposure (e.g., human body part) present in the FoV of the radar for a large fraction of the time.

In certain embodiments, the detection rate of a target within some range threshold could be used as a measure for the environment busy-ness. The detection could be defined differently for NB and WB radar.

For NB radars, detection rate is defined as how often there is a target detected in the first range tap or not. The NB detection rate, is described in Equation (12), below, for a given time duration (e.g., 30 sec or 1 min or even longer).

$$NB\text{ radar detection rate} = \frac{\#\text{ times target detected in 1st range tap}}{\text{total number of radar detection results}} \quad (12)$$

For WB radars, detection rate is defined as how often there is a target detected within some range threshold, where this range threshold could be set to be large enough that the exposure beyond this range is insignificant. The definition of the significance here could be by the amount of decrease in the exposure, such as when the exposure has dropped by 10 dB compared to the worst-case exposure at the device surface. Exposure levels could be estimated within and outside the FoV of the radar and would depend on the specific device. Since the radar cannot detect reliably outside its FoV, the worst-case exposure for outside the FoV of the radar can be assumed for estimating the exposure. Because of this, the exposure level for outside the FoV of the radar does not depend on the radar detection. Thus, beyond a certain target range, the exposure estimate for outside the FoV of the radar would become larger than exposure estimate within the FoV of the radar. The exposure level to a target decreases with the distance, but the specific function could depend on the actual implementation of the device. However, in most cases, this distance, denoted as $d_{th}$, would be within a few cm from the device. The WB detection rate is described in Equation (13) below.

$$WB \text{ radar detection rate} = \frac{\text{\# times target detected at range d} < d_{th}}{\text{total number of radar detection results}} \quad (13)$$

Figure 7A:
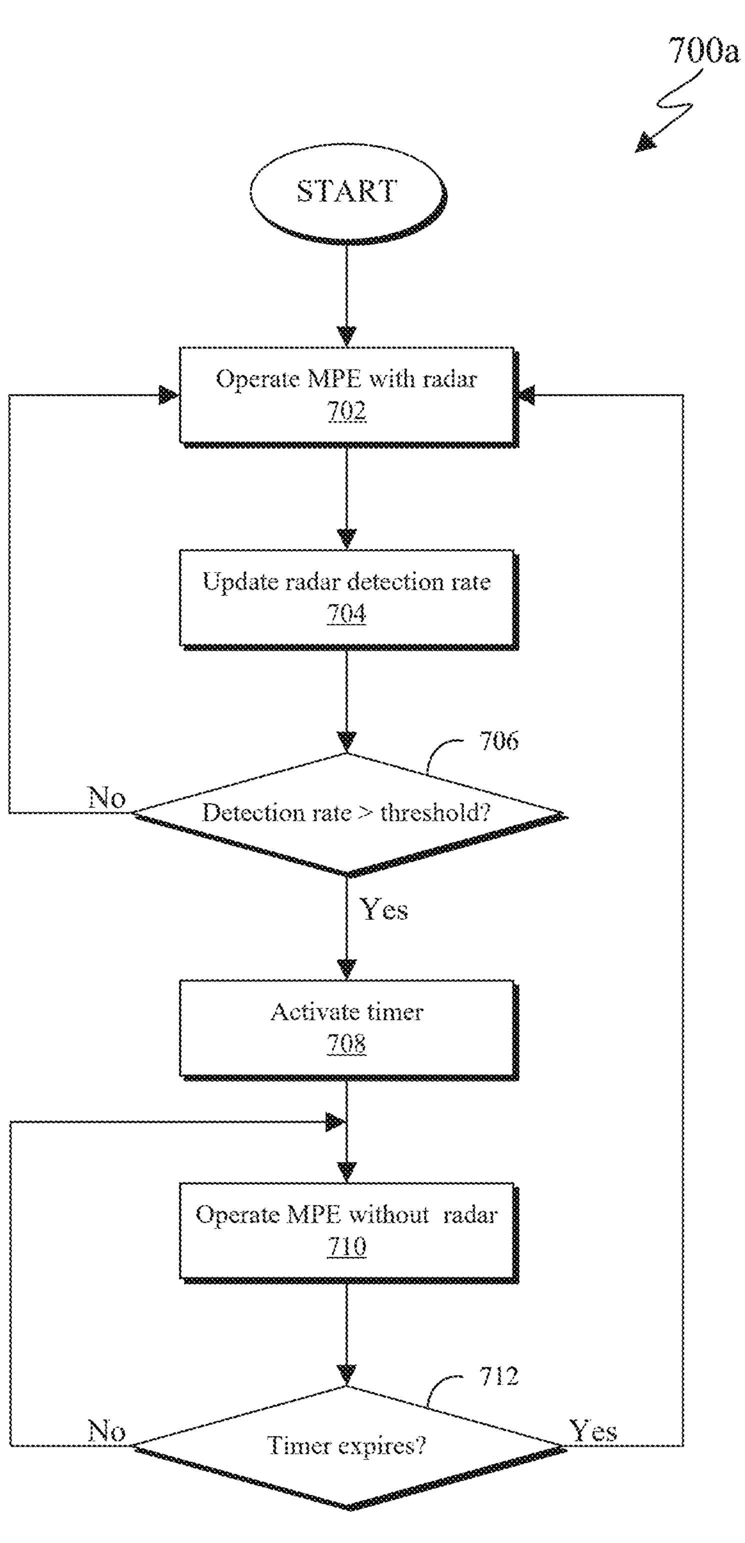
FIGS. 7A and 7B illustrate example methods for determining whether to use radar for MPE management based on radar detection rate and a timer according to embodiments of this disclosure.

In certain embodiments, as an alternative to averaging within a fixed duration is to use a moving average (e.g., an exponentially-weighted moving average, where most-recent results have higher weights) to update the detection after each radar detection. Using the radar detection rate and a timer for controlling the duration of turning off the radar, an example procedure to decide whether to run radar for MPE management is shown in FIG. 7A. The detection rate could be estimated according to the radar type (i.e., whether it is a NB or WB radar) as described earlier.

Figure 7B:
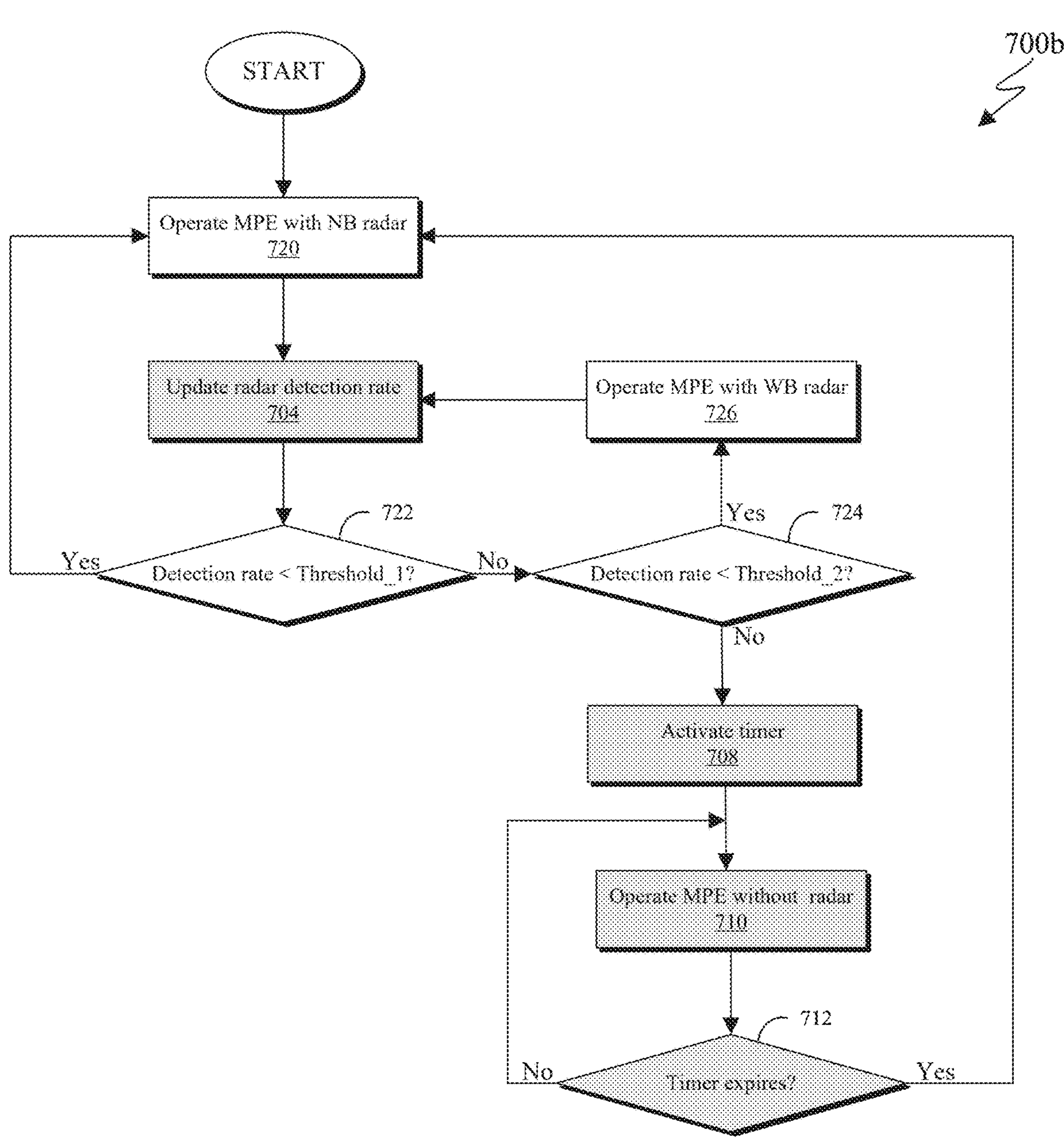

FIGS. 7A and 7B illustrate example methods 700*a* and 700*b*, respectively, for determining whether to use radar for MPE management based on radar sending results according to embodiments of this disclosure. In particular, the method 700*a*, as illustrated in FIG. 7A describes a procedure for deciding whether to operate radar for MPE management based on a radar detection rate and a timer for controlling when to turn the radar back on after switching to MPE management without radar. The method 700*b*, as illustrated in FIG. 7B, describes a procedure for using the radar detection rate to determine whether to operate MPE management with radar, and when radar is used, the method 700*b* describes a determination of whether to use NB or WB radar. It is noted that this is similar to the signal processing diagram 400 of FIG. 4A determining in step 410 of whether to perform step 415 or step 420 based on the radar sensing information 406.

It is noted that FIG. 7A aims at not using the radar unnecessarily. The cost of operating the radar includes the power consumption of the radar and the potential interference in the wireless medium (e.g., when the radar operates in active mode and does not piggyback on existing communication signal transmission). Whether this cost is justifiable or not may depend on the need of a user. For example, when the user application requires high data rate, the cost of operating radar could be justifiable in order to not miss an opportunity to transmit at high TX power. On the contrary, when the battery power is low, it could be more preferable to not operate radar. The method 700*a*, as illustrated in FIG. 7A describes that this kind of control can be done by adjusting the threshold for the detection rate. That is, instead of using a fixed threshold, a lookup table could be set to define a threshold as a function of the needs of a user. For example, the threshold (of step 706) could be defined as a function of the data rate demand and the current battery power.

As illustrated in FIG. 7A, an electronic device, in step 702, operates MPE with radar (such as the first mode, MPE with radar, step 420 of FIG. 4A). In step 704, the electronic device updates the radar detection rate. The radar detection rate can be based on Equation (12) or Equation (13). In step 706, the electronic device compares the detection rate to a threshold. The threshold can be predefined or selected based on the data rate demand, the current battery power, or the like. If the electronic device determines that the detection rate is less than or equal to the threshold (as determined in step 706), the electronic device returns to step 702 and continues to operate MPE with radar. Alternatively, if the electronic device determines that the detection rate is greater than the threshold (as determined in step 706), the electronic device activates a timer (step 708). In step 710, the electronic device operates MPE without radar, such as the second mode denoted as MPE without radar (step 415 of FIG. 4A). In step 712, the electronic device determines whether the timer (which was activated in step 708) expires. Upon determining that the time did not expire (as determined in step 712), the electronic device continues to operate MPE without radar (step 710). Alternatively, if the electronic device determines that the time expired (as determined in step 712), the electronic device returns to step 702 and operates MPE with radar. That is, the decision of step 410 of FIG. 4A can be based on the detection rate of the radar sensing information and a timer.

In certain embodiments, where the radar hardware could operate both the NB and WB radar mode, two thresholds could be introduced to decide which radar mode to operate. The potential benefit of using both radar modes is the extra flexibility that could be used to optimize the gain of the communication performance while minimizing the resource usage by the radar. For example, in a very busy environment (e.g., when detection rate is more than 90%), it can expect that the benefit of the radar will be limited and thus the electronic device may determine to operate MPE management without radar as it is not justifiable to carry the cost of operating radar. On another extreme where there is hardly any target within the FoV of the radar (i.e., target detection rate is very low), using the low-cost NB radar might already be enough in getting most if not all the benefit of running MPE management with radar. In the mid-range detection rate, NB radar might miss a certain amount of possible gain due to the limited range resolution of the NB radar. In this situation, operating WB radar would be best in trying to get the most benefit from operating radar. This is described in FIG. 7B.

As illustrated in FIG. 7B, the method 700*b* includes two thresholds, denoted as threshold_1 and threshold_2. It is noted that threshold_1 is less than threshold_2. Here, the base operation uses the NB radar (i.e., the mode at the start or after the timer expires). If the gain in the communication is of higher priority, the electronic device may choose the to use WB radar instead. It is noted that the detection rate used in FIG. 7B uses the two definitions for the NB and WB radar described earlier in Equation (12) and Equation (13), respectively. Both events (i) target detected in first range tap by NB radar and (ii) target detected at range $d<d_{th}$) by WB radar, could be treated equally as a target detection event.

As illustrated in FIG. 7B, an electronic device, in step 720, operates MPE with radar (such as the first mode, MPE with radar, step 420 of FIG. 4A). The radar that is used in step 720 is NB radar. In step 704, the electronic device updates the radar detection rate. In step 722, the electronic device compares the detection rate to a first threshold (also denoted as threshold_1). The threshold_1 can be predefined or selected based on the data rate demand, the current battery power, or the like. If the electronic device determines that the detection rate is less than the threshold_1 (as determined in step 722), the electronic device returns to step 720 and continues to operate MPE with NB radar. Alternatively, if the electronic device determines that the detection rate is not less than the threshold_1 (as determined in step 722), the electronic device in step 724 compares the detection rate to a second threshold (also denoted as threshold_2). The threshold_2 can be predefined or selected based on the data rate demand, the current battery power, or the like. As indicated above, threshold_1 is less than threshold_2.

If the electronic device determines that the detection rate is less than the threshold_2 (as determined in step 724), the electronic device in step 726 operates MPE with WB radar, and then updates the radar detection rate based on the WB radar (step 704). Alternatively, if the electronic device determines that the detection rate is not less than (greater than or equal to) the threshold_2 (as determined in step 724), the electronic device in step 724 activates a timer (step 708). In step 710, the electronic device operates MPE without radar, such as the second mode denoted as MPE without radar (step 415 of FIG. 4A). In step 712, the electronic device determines whether the timer (which was activated in step 708) expires. Upon determining that the timer did not expire (as determined in step 712), the electronic device continues to operate MPE without radar (step 710). Alternatively, if the electronic device determines that the timer expired (as determined in step 712), the electronic device returns to step 720 and operates MPE with NB radar.

Figure 7C:
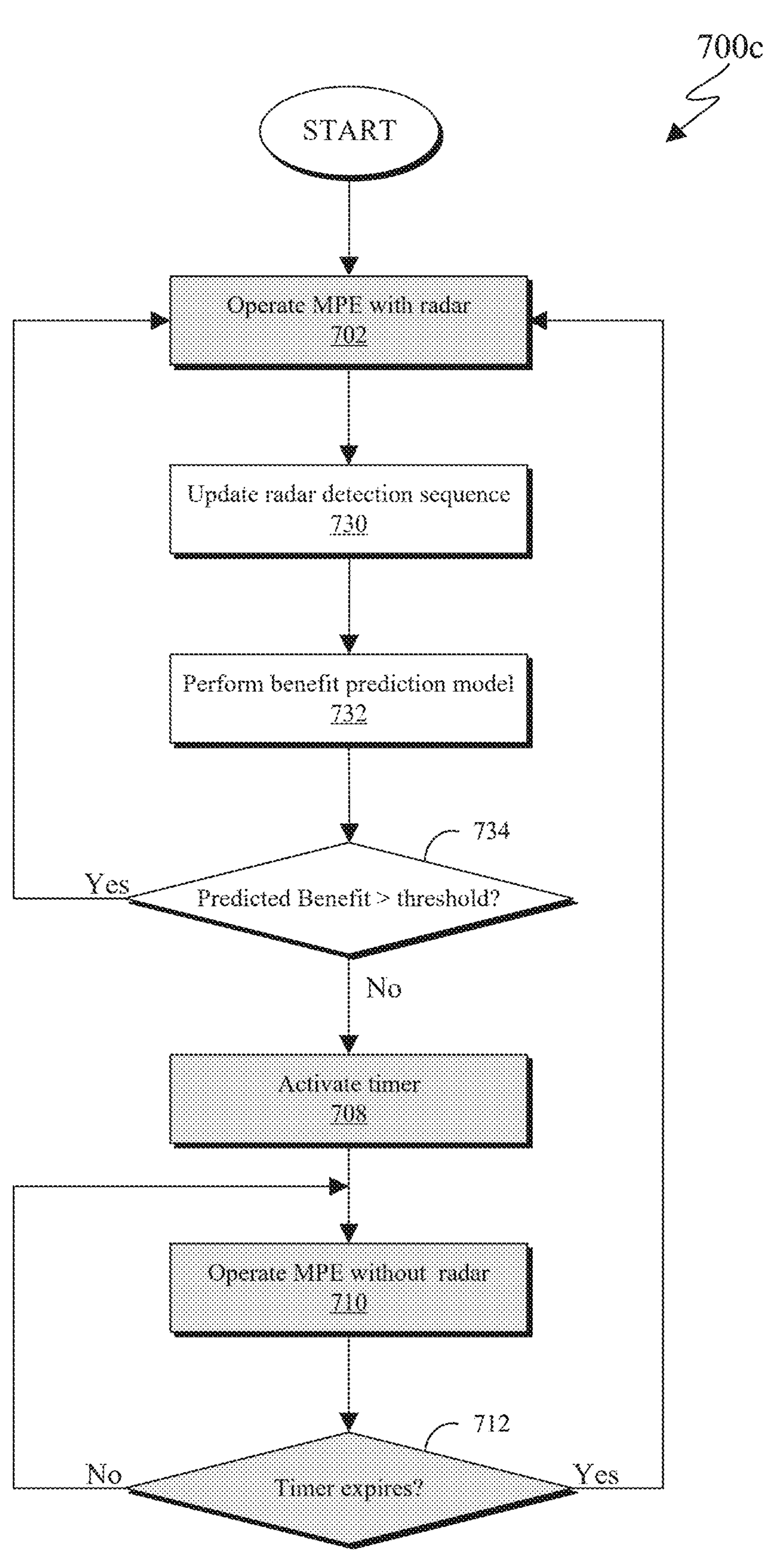
FIGS. 7C and 7D illustrate example methods for determining whether to use radar for MPE management based on machine learning according to embodiments of this disclosure.
Figure 7D:
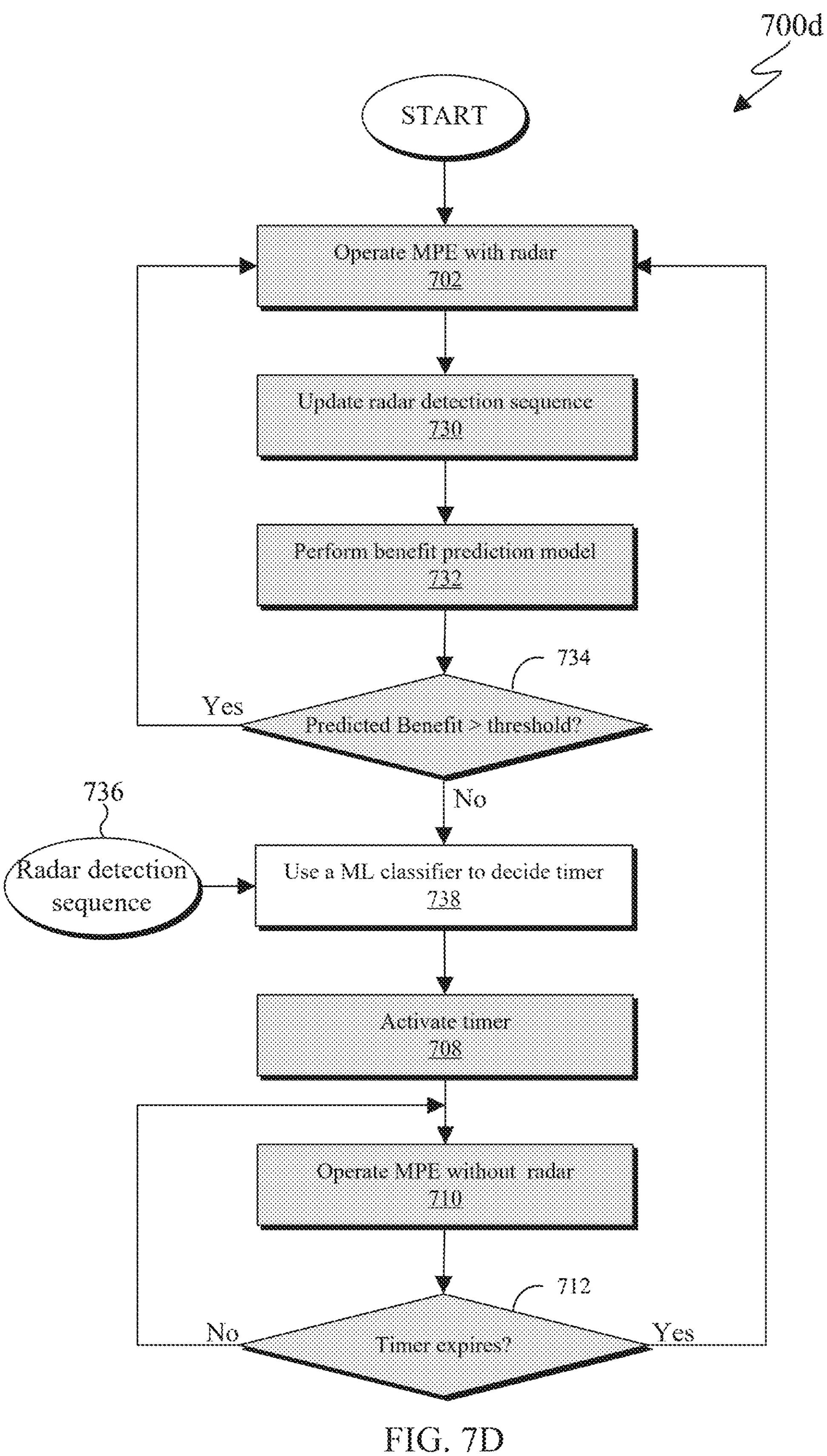

FIGS. 7C and 7D illustrate example methods 700*c* and 700*d*, respectively, for determining whether to use radar for MPE management based on machine learning (ML) according to embodiments of this disclosure. Here, ML can be a benefit prediction model. The method 700*c*, as illustrated in FIG. 7C describes an example process for determining whether to run MPE with radar using a trained ML regression model that predicts the benefit from using MPE with radar. Here, the input feature of the ML benefit predictor is a sequence of radar detection. The method 700*d*, as illustrated in FIG. 7D describes an example process for determining whether to run MPE with radar using a trained ML regression model that predicts the benefit from using radar for MPE. The timer of the method 700*d* for operating the MPE without radar is not fixed and selected by a trained classifier.

The determination of the busy-ness of the environment, as described above, is rather coarse since only one statistical metric is used to quantify it. One way to generalize this is to instead use the sequence of radar detection as the basis (or feature vector) to determine the environment busy-ness. In this embodiment, to define 'busy-ness' of the environment is to use a ML based regression model that predicts the expected benefit for running radar. In this case, a large benefit can be interpreted to mean the environment is not busy, while a small or no benefit indicates that the environment is busy (i.e., there is no available opportunity to allow communication module to use high TX power).

There are two stages of operations: (i) a training data collection stage and (i) a deployment stage. The ML model takes the radar detection sequence as the input feature and uses the difference in the TX power allowed by MPE management with and without radar as the quantification of the benefit of having radar. It is noted that for the sequence of the radar detection, the closest target is most important and so the input feature could be modified to the sequence of closest detected target ranges.

During the data collection stage, the radar is always on and MPE with radar (step 420) is operating. In the background it can also run MPE without radar (step 415 of FIG. 4A) to determine the maximum allowable TX power. It is also noted that in this case the TX power selected by the MPE engine 426 with radar is the one that is actually used and the TX power selected by the MPE engine 426 without radar is for data collection purpose only. Equation (14) describes identifying a label, which is a function of selected TX power by the two MPE methods.

$$\text{label} = (TX \text{ power by } MPE \text{ with radar in } dBm) - (TX \text{ power by } MPE \text{ without radar in } dBm) \quad (14)$$

After running this data collection stage for some time, enough number of training samples can be obtained and in order to train and then deploy the model. FIG. 7C describes the method of using the trained model.

The trained model is used to predict the expected benefit from operating radar given the sequence of radar detection results. If the predicted benefit (i.e., the label calculated as above) is larger than the threshold, indicates that operating MPE with radar (step 420) is beneficial and it would continue in that mode. If the predicted benefit is smaller than the threshold, indicates that radar is not beneficial and the electronic device will operation without radar (MPE without radar, step 420) for a period of time, which is controlled by a timer. Similarly, to the previous embodiment (of FIGS. 7A and 7B), the benefit threshold could be defined as a function of the current device state (which could be in the form of a look-up table, or in the form of some curve-fitted function), which may include the required data rate and battery power. For example, if battery power is low, then the threshold could be set to a high value. If the data rate demand is high and the device is not in a low battery power state, it may be beneficial to not miss even small benefit and the benefit threshold could be set to a small value. As a general trend, the benefit threshold should decrease as the demand for the data rate increases, and it should increase as the battery power decreases.

As illustrated in FIG. 7C, an electronic device, in step 702, operates MPE with radar (such as the first mode denoted as MPE with radar, step 420 of FIG. 4A). In step 730, the electronic device updates the radar detection sequence. In step 732, the electronic device performs the benefit prediction model to generate a predicted benefit. In step 734, the electronic device determines whether the predicted benefit (as identified from the benefit prediction model of step 732) is greater than a threshold. If the electronic device determines that the predicted benefit is greater than a threshold (as determined in step 734), then the electronic device returns to step 702 and continues to operate MPE with radar. Alternatively, if the electronic device determines that the predicted benefit is not greater than a threshold (as determined in step 734), then the electronic device activates a timer (step 708). In step 710, the electronic device operates MPE without radar, such as the second mode denoted as MPE without radar (step 415 of FIG. 4A). In step 712, the electronic device determines whether the timer (which was activated in step 708) expires. Upon determining that the timer did not expire (as determined in step 712), the electronic device continues to operate MPE without radar (step 710). Alternatively, if the electronic device determines that the timer expired (as determined in step 712), the electronic device returns to step 702 and operates MPE with radar.

It is noted that the timer of FIG. 7C is a fixed duration time. In certain embodiments, the duration of the timer can be extracted (learned) from the data. Using data to adjust the timer is described in FIG. 7D. That is, FIG. 7D is similar to the FIG. 7C but includes the addition of a ML classifier to decide the timer. Here, several choices of the timer duration could be defined and used as classes for an ML classifier.

In this case, the input feature may be the same as the input feature to the benefit prediction model, but the label will be different. The label is the time duration after which running MPE with radar provides benefit larger than the benefit threshold (that is informally, this is the time that running radar becomes worthwhile again). Equation (15) provides an example equation for determining the label.

$$\text{label} = \text{minimizer } T > 0 \text{ such that } B_{rad}(t_0) < B_{th} \text{ and } B_{rad}(t_0 + T) > B_{th} \quad (15)$$

Here, $B_{rad}(t)$ denote the benefit of running MPE management with radar at time t, and $B_{th}$ denotes the benefit threshold.

The label, as described in Equation (15), can be given by this expression as continuous, and it can be quantized accordingly should it be desirable to group then into classes. As described by the method 700*d*, when the predicted benefit falls below the desired threshold, the latest radar detection sequence is input into this new ML model that would select a timer value. The selected timer is used as the time duration to operate MPE management without radar before turning back on the radar.

As illustrated in FIG. 7D, an electronic device, in step 702, operates MPE with radar (such as the first mode denoted as MPE with radar, step 420 of FIG. 4A). In step 730, the electronic device updates the radar detection sequence. In step 732, the electronic device performs the benefit prediction model. In step 734, the electronic device determines whether the predicted benefit (as identified from the benefit prediction model of step 732) is greater than a threshold. If the electronic device determines that the predicted benefit is greater than a threshold (as determined in step 734), then the electronic device returns to step 702 and continues to operate MPE with radar. Alternatively, if the electronic device determines that the predicted benefit is not greater than a threshold (as determined in step 734), then the electronic device in step 738 uses a ML classifier to decide a timer duration based on radar detection sequence 736. The electronic device then activates a timer (step 708) based on the determined duration from step 738. In step 710, the electronic device operates MPE without radar, such as the second mode denoted as MPE without radar (step 415 of FIG. 4A). In step 712, the electronic device determines whether the timer (which was activated in step 708) expires. Upon determining that the timer did not expire (as determined in step 712), the electronic device continues to operate MPE without radar (step 710). Alternatively, if the electronic device determines that the timer expired (as determined in step 712), the electronic device returns to step 702 and operates MPE with radar.

Figure 8A:
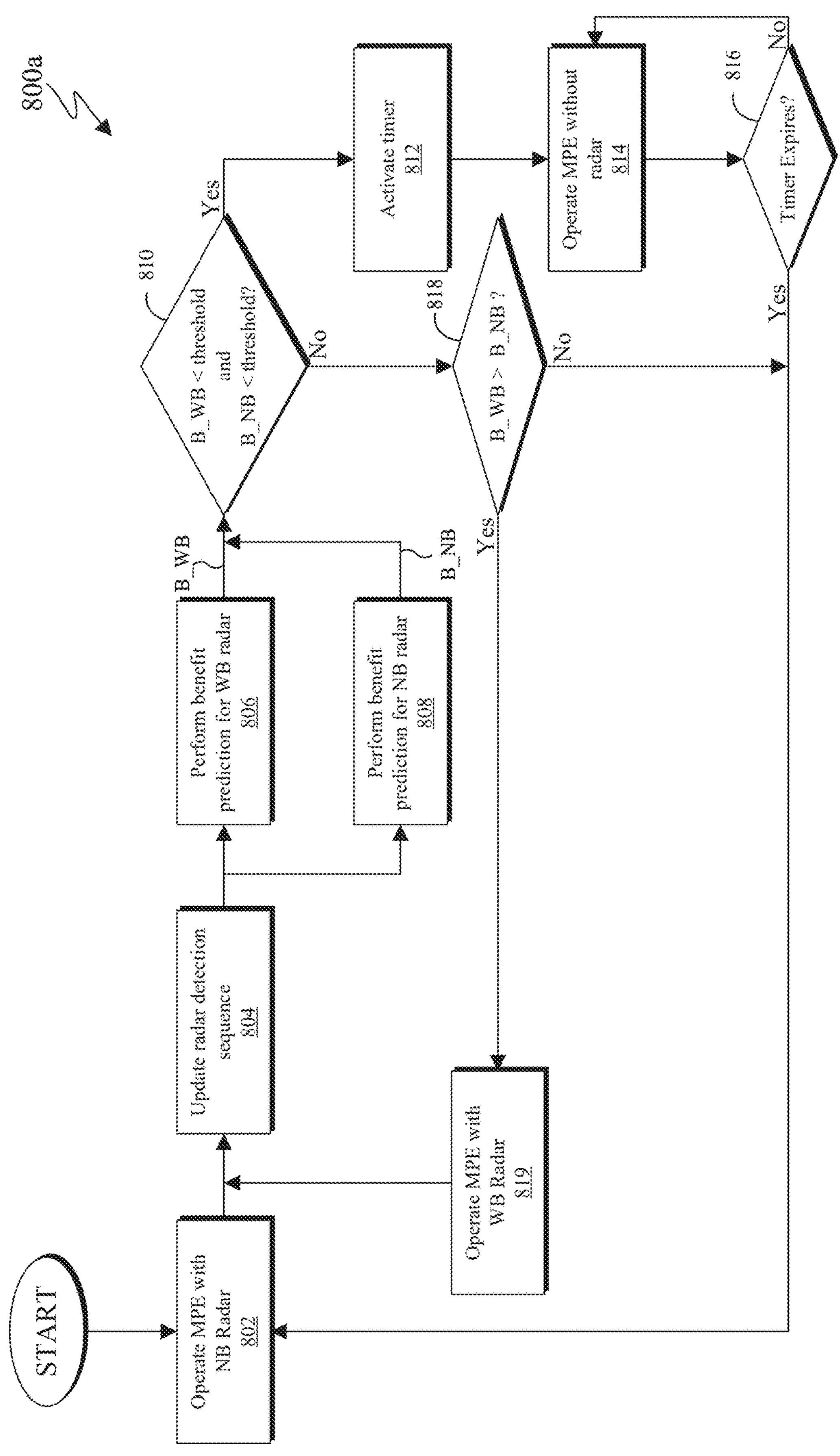
FIGS. 8A and 8B illustrate example methods for determining whether to perform MPE management with radar and whether to use NB radar or WB radar according to embodiments of this disclosure.
Figure 8B:
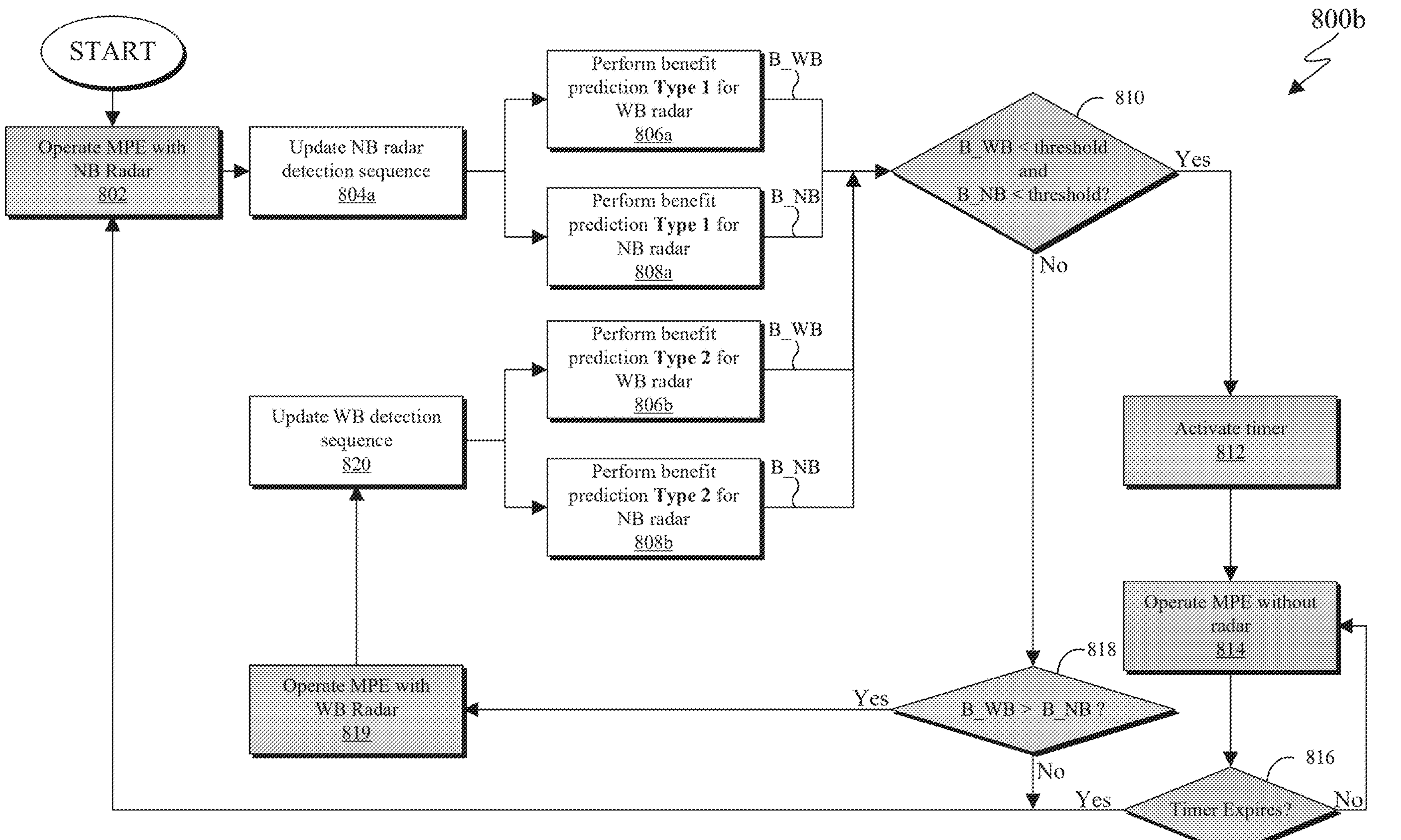

FIGS. 8A and 8B illustrate example methods 800*a* and 800*b*, respectively, for determining whether to perform MPE management with radar (step 410 of FIG. 4A) and when MPE with radar is determined (step 420) whether to use NB radar or WB radar according to embodiments of this disclosure. In particular, the method 800*a*, as illustrated in FIG. 8A describes a procedure for deciding whether to run MPE management with radar, and which radar mode to use (a combination of steps 410 and 420 of FIG. 4A). The method 800*a* uses two benefit predictors for the two radar modes (NB radar and WB radar) to make the decision. The method 800*b*, as illustrated in FIG. 8B, describes a procedure for deciding whether to run MPE management with radar, and which radar mode to use (a combination of steps 410 and 420 or FIG. 4A). The method 800*b* uses four benefit predictors for the two radar modes (NB radar and WB radar) to make the decision.

As described above, the hardware of an electronic device (such as the radar transceiver 270 of FIG. 2) may be capable of operating both NB and WB radar. Additionally, the benefit predictors could be trained accordingly to decide not only whether to run radar for MPE management (i.e., step 410 of FIG. 4A) but also to select which radar mode to use in step 420.

In certain embodiments, there are at least two design choices in training the benefit predictors because of the two radar modes. In a first choice, only one type of benefit predictors is trained. In this case, the input feature is consistent regardless of whether WB or NB radar is running. One way to do this is to use the radar detection status sequence rather than the detailed detection results. For example, the value of 'one' can be selected when the NB radar detects a target in its first range tap or when WB radar detects a target within some distance threshold $d_{th}$ as described earlier. As such, an input feature would be the sequence of zeros and ones.

In a second choice, two predictors could be trained. For example, one of the predictors predicts the benefit when running MPE management with NB radar and the other predictor predicts the benefit when running MPE management with WB radar. With all these components, an example embodiment is shown in FIG. 8A. It is noted that FIG. 8A is similar to the method 700*b* of FIG. 7B, however in the method 800*a* as illustrated in FIG. 8A, NB radar is selected as the base operation, but if communication performance is prioritized, then WB radar may be operated as the base instead. To decide whether to operate radar for MPE management, the predicted benefits of both radar modes are compared against a selected threshold. If either one or both of the radar modes is predicted to provide benefit larger than the threshold, MPE with radar (step 420 of FIG. 4A) is selected (in step 410 of FIG. 4A). To choose between WB or NB radar, the predicted benefits of the two radar modes are compared and the mode with the larger benefit is selected.

It is noted that to have a fair comparison between the two radar modes, the benefits should be normalized to account for the cost of operating the radar (higher for WB radar than for NB radar). One example of normalization is to divide the benefit by the power consumption of the radar mode. The power consumption of the radar modes could be pre-calculated from their respective radar configurations. In FIG. 8A, for simplicity of illustration, it is assumed that the outputs from the benefit predictors (namely, B_WB and B_NB) are already normalized by the cost of the radar mode operation.

As illustrated in FIG. 8A, an electronic device (such as the electronic device 200), in step 802, operates MPE with radar (such as the first mode, MPE with radar, step 420 of FIG.

4A). The radar that is used in step 802 is NB radar. In step 804, the electronic device updates the radar detection sequence. The sequence is made up of ones and zeros corresponding to whether an object is detected. In step 806, the electronic device performs the benefit prediction for WB radar, to generate B_WB from the radar detection sequence. Similarly, in step 808, the electronic device performs the benefit prediction for NB radar, to generate B_NB from the radar detection sequence.

In step 810, the electronic device determines whether the WB radar benefit (as identified in step 806) is less than a threshold. In step 810, the electronic device also determines whether the NB radar benefit (as identified in step 808) is less than a threshold.

In response to a determination that both the WB radar benefit and the NB radar benefit are less than a threshold (as determined in step 810), the electronic device activates a timer (step 812). In step 814, the electronic device operates MPE without radar, such as the second mode denoted as MPE without radar (step 415 of FIG. 4A). In step 816, the electronic device determines whether the timer (which was activated in step 812) expires. Upon determining that the timer did not expire (as determined in step 816), the electronic device continues to operate MPE without radar (step 814). Alternatively, if the electronic device determines that the timer expired (as determined in step 816), the electronic device returns to step 802 and operates MPE with NB radar.

In response to a determination that the WB radar benefit and/or and the NB radar benefit are greater than or equal to the threshold (as determined in step 810), the electronic device, in step 818 compares the WB radar benefit and the NB radar benefit (step 818). In response to a determination that the WB radar benefit is not greater than the NB radar benefit (as determined in step 818), the electronic device returns to step 802 and operates MPE with NB radar. In response to a determination that the WB radar benefit is greater than the NB radar benefit (as determined in step 818), the electronic device in step 819 operates MPE with WB radar and then updates the radar detection sequence (step 804).

In certain embodiments, 2 types of benefit predictors can be trained. A first type, denoted as Type 1 takes NB radar detection sequence as the input feature and the second type, denoted as Type 2, takes WB radar detection sequence as the input feature. One cost of this design choice is the need to train four benefit predictors, but the advantage is the more accurate prediction since Type 2 predictors can leverage richer features provided by the higher resolution WB radar. This embodiment is illustrated in FIG. 8B. Besides this difference in how to operate the benefit predictors, all other steps are the same as in the embodiment in FIG. 8A.

As illustrated in FIG. 8B, an electronic device, in step 802, operates MPE with radar (such as the first mode, MPE with radar, step 420 of FIG. 4A). The radar that is used in step 802 is NB radar.

In step 804*a*, the electronic device updates the NB radar detection sequence. The sequence is made up of ones and zeros corresponding to whether an object is detected. In step 806*a*, the electronic device performs the benefit prediction type 1 for WB radar, to generate B_WB from the radar detection sequence. Similarly, in step 808*a*, the electronic device performs the benefit prediction type 1 for NB radar, to generate B_NB from the radar detection sequence.

In step 810, the electronic device determines whether the WB radar benefit (as identified in step 806*a*) is less than a threshold. In step 810, the electronic device also determines whether the NB radar benefit (as identified in step 808*a*) is less than a threshold.

In response to a determination that both the WB radar benefit and the NB radar benefit are less than a threshold (as determined in step 810), the electronic device activates a timer (step 812). In step 814, the electronic device operates MPE without radar, such as the second mode denoted as MPE without radar (step 415 of FIG. 4A). In step 816, the electronic device determines whether the timer (which was activated in step 812) expires. Upon determining that the timer did not expire (as determined in step 816), the electronic device continues to operate MPE without radar (step 814). Alternatively, if the electronic device determines that the timer expired (as determined in step 816), the electronic device returns to step 802 and operates MPE with NB radar.

In response to a determination that the WB radar benefit and/or and the NB radar benefit are greater than or equal to the threshold (as determined in step 810), the electronic device, in step 818 compares the WB radar benefit and the NB radar benefit (step 818). In response to a determination that the WB radar benefit is not greater than the NB radar benefit (as determined in step 818), the electronic device returns to step 802 and operates MPE with NB radar. In response to a determination that the WB radar benefit is greater than the NB radar benefit (as determined in step 818), the electronic device in step 819 operates MPE with WB radar.

After operating the MPE with WB radar, the electronic device in step 820 updates a WB radar detection sequence. The updated WB radar detection sequence can be similar to the updated NB sequence of step 804*a* but based on WB radar rather than NB radar. In step 806*b*, the electronic device performs the benefit prediction type 2 for WB radar, to generate B_WB from the radar detection sequence. Similarly, in step 808*b*, the electronic device performs the benefit prediction type 2 for NB radar, to generate B_NB from the radar detection sequence. After identifying the benefit for WB radar and the benefit for NB radar, the process continues at step 810 to determine whether the WB radar benefit (as identified in step 806*b*) is less than a threshold. In step 810, the electronic device also determines whether the NB radar benefit (as identified in step 808*b*) is less than a threshold In certain embodiments, an electronic device can determine when to operate radar for MPE management based on information other than (or in addition to) radar sensing information. For example, FIGS. 9A-10D describe examples of the using non-radar sensing information to determine (in step 410 of FIG. 4A), which MPE mode is selected.

Figure 9A:
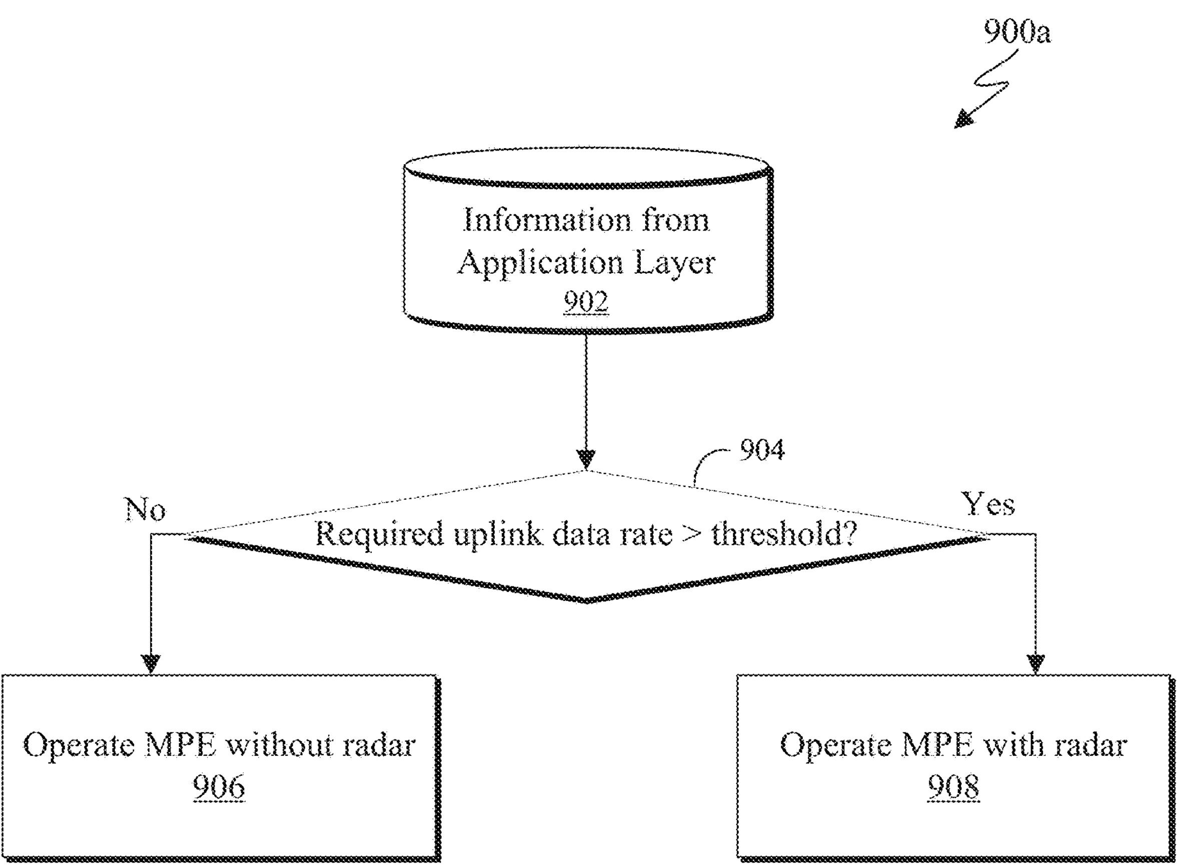
FIGS. 9A-9D illustrate example methods for determining whether to use radar for MPE management based on information from higher layers according to embodiments of this disclosure.
Figure 9B:
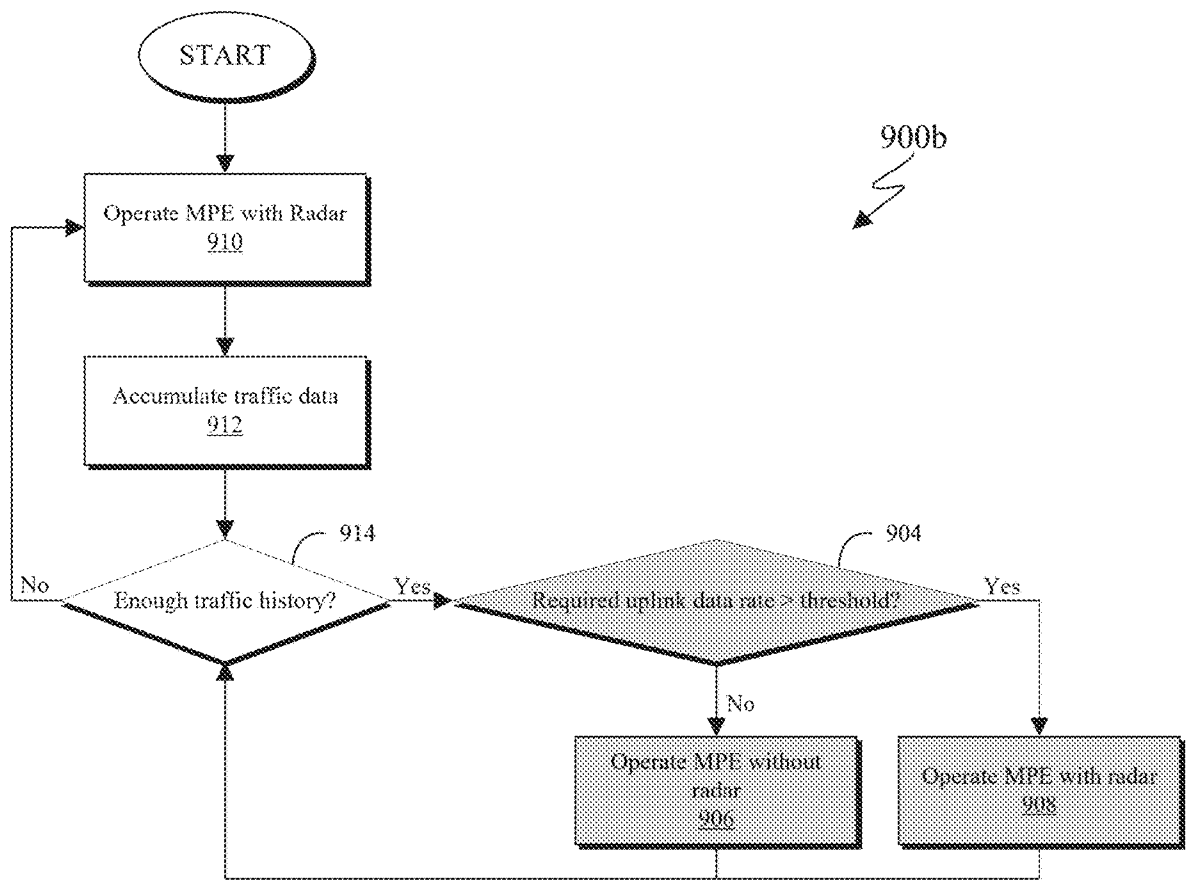
Figure 9C:
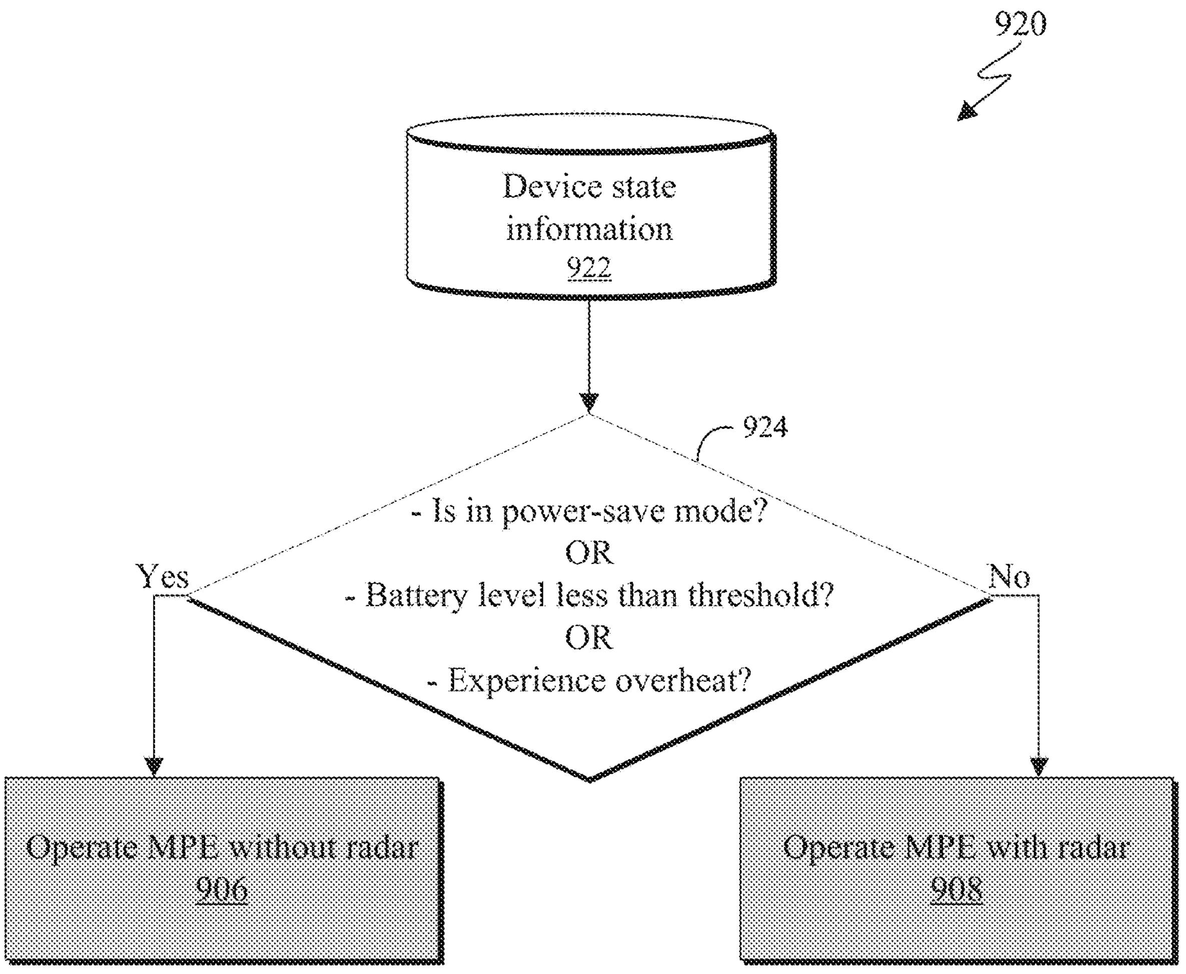
Figure 9D:
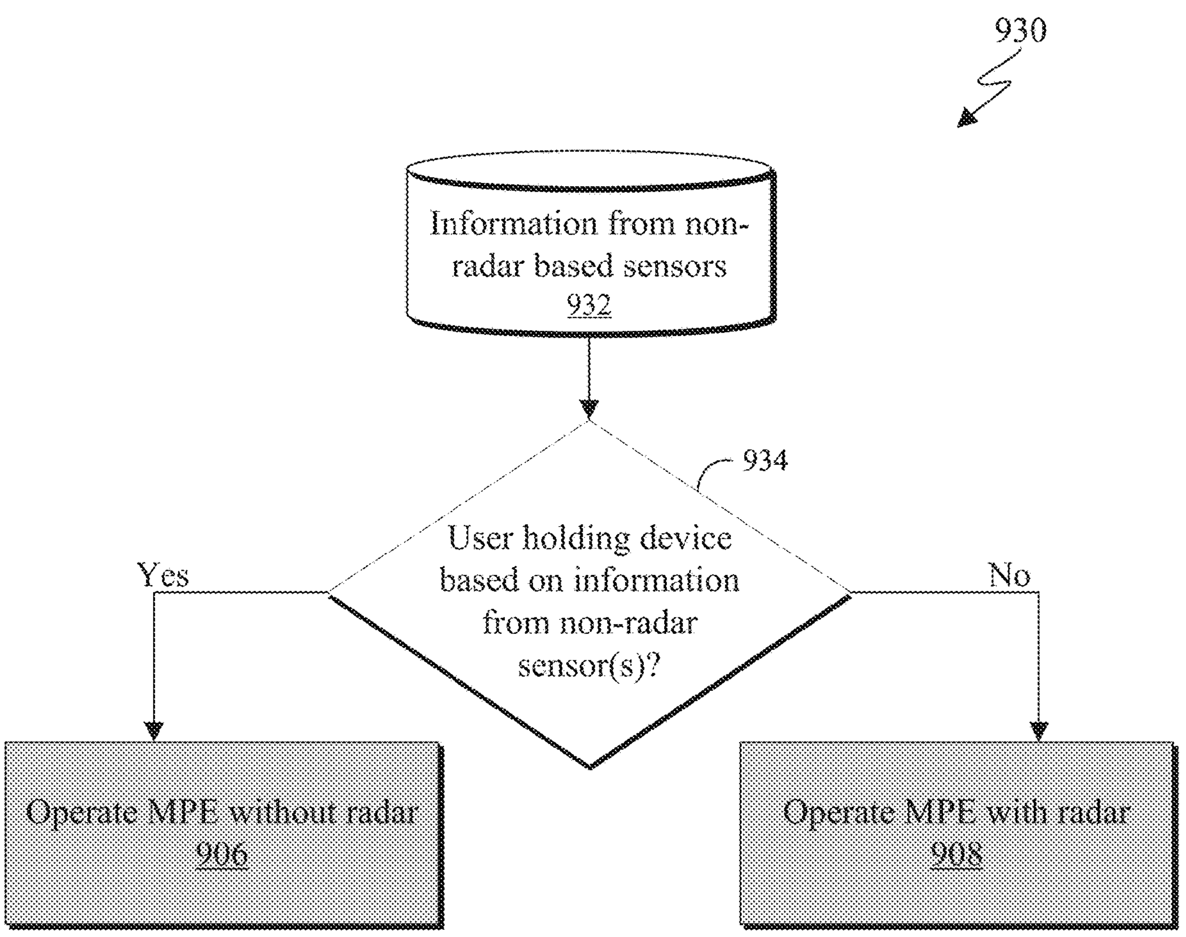

FIGS. 9A-9D illustrate example methods for determining whether to use radar for MPE management based on information from higher layers (such as a layer above the physical (PHY) layer), such as the application layer or some other device states according to embodiments of this disclosure. In particular, FIG. 9A illustrates an example method 900*a* for determining whether to operate MPE with (or without) radar based on required uplink data rate obtained from a high layer. FIG. 9B illustrates an example method 900*b* for predicting the required uplink data rate based on traffic history. FIG. 9C illustrates an example method 920 for determining whether to use MPE with (or without) radar based on an identified state of the electronic device. FIG. 9D illustrates an example method 930 for determining whether to use MPE with (or without) radar based on information from non-radar based sensors. It is noted that the method 900*a*, 900*b*, 920, and 930 of FIGS. 9A-9D, respectively, describe as using the information 402 from higher layers of FIG. 4A for the step 410 of FIG. 4A.

In certain embodiments, higher layer information is used to determine if high data rate in the uplink is required. If high data rate is required by an application, the electronic device in step 410 of FIG. 4A, could determine that there is a benefit for MPE with radar—step 420 of FIG. 4A. Alternatively, if there is not much data traffic in the uplink, it likely is not necessary (or beneficial) to use high transmission power for communication, and thus there is no need to run radar for MPE management. This is illustrated the method 900*a* of FIG. 9A.

In certain embodiments, the application layer information 902 may include the application name, the application category (e.g., whether it is a real-time interactive application or some non-real time application such as web browsing), or even just data traffic history. With the application name and/or category, a look-up table could be created that provides the required uplink data rate for each entry. In certain embodiments, the application layer information 902 may be included in the information from higher layers 402 of FIG. 4A.

In step 904, the electronic device compares the required uplink data rate from the application layer information 902 to a threshold. Step 904 can be similar to the step 410 of FIG. 4A. It is noted that an uplink data rate threshold, such as the threshold of step 904 in FIG. 9A could be a function of the channel quality. For example, a high threshold value could be used when the device has good wireless channel condition (e.g., when a device is in the cell-center), and a small threshold value may be used when the wireless channel condition is not preferable (e.g., the cell-edge condition).

When the required uplink data rate is greater than the threshold (as determined in step 904), the electronic device can determine to operate MPE with radar (step 908). It is noted that step 908 can be similar to the step 420 of FIG. 4A. Alternatively, when the required uplink data rate is less than or equal to the threshold (as determined in step 904), the electronic device can determine to operate MPE without radar (step 906). It is noted that step 906 can be similar to the step 415 of FIG. 4A.

In certain embodiments when using the history of the traffic (e.g., IP traffic history) to make the determination, MPE with radar (step 420 of FIG. 4A) could be initially used at the start while collecting the data traffic history as described in FIG. 9B. Once enough traffic history is obtained, it could be input into a machine learning model that estimates the required uplink data traffic. In certain embodiments, channel quality can be included into the feature for the ML model and a binary output may be defined (such as whether MPE with or without radar should be used).

As illustrated in FIG. 9B, the electronic device, in step 910, operates MPE with radar (such as in step 420 of FIG. 4A). In step 912, the electronic device accumulates traffic data. In step 914, the electronic device determines whether enough traffic history is accumulated. The determination of whether enough traffic history is accumulated can be based on a predefined amount of traffic history. In response to a determination that not enough traffic history is accumulated, the electronic device returns to step 910. Alternatively, in response to a determination that enough traffic history is accumulated, the electronic device estimates the required uplink data rate and in step 904 compares the required uplink data rate to a threshold (this is similar to the required uplink data rate from the application layer information 902 as described in FIG. 9A). When the required uplink data rate is greater than the threshold (as determined in step 904), the electronic device can determine to operate MPE with radar (step 908). It is noted that step 908 can be similar to the step 420 of FIG. 4A. Alternatively, when the required uplink data rate is less than or equal to the threshold (as determined in step 904), the electronic device can determine to operate MPE without radar (step 906). It is noted that step 906 can be similar to the step 415 of FIG. 4A.

In certain embodiments, determining whether to use MPE with (or without) radar is based on whether it is affordable (in the sense of power or temperature budget) for the device to operate radar or not. This is described by the method 920 of FIG. 9C.

As illustrated in FIG. 9C, the electronic device obtains device state information 922. The device state information 922 can be similar to information 402 from higher layers from FIG. 4A.

In certain embodiments, the device state information 922 includes an indication of whether the electronic device is in a power-save mode. In certain embodiments, the device state information 922 includes an indication of the current battery level of the electronic device. In certain embodiments, the device state information 922 includes an indication of the temperature of the electronic device. The temperature can be the temperature of the battery, the temperature of the processor, or ambient temperature.

In step 924, the electronic device can determine if the power-save mode is on. When the power save mode is on, it can indicate that power saving is of a higher priority, and thus running radar for MPE could be turned off. If the electronic device determines that the power-save mode is on (as determined in step 924) the electronic device in step 906 operates MPE without radar. Alternatively, if the electronic device determines that the power-save mode is off (as determined in step 924) the electronic device in step 908 operates MPE with radar.

Additionally, or alternatively, in step 924, the electronic device can compare the batter level to a threshold. The threshold could be predetermined. For example, the threshold could be 15% of the fully charged level. When the battery level is below the threshold could indicate that conserving power is of top priority and MPE management without radar is preferred. For example, if the electronic device determines that the battery level is below the threshold (as determined in step 924) the electronic device in step 906 operates MPE without radar. Alternatively, if the electronic device determines that the battery level is above the threshold (as determined in step 924) the electronic device in step 908 operates MPE with radar.

Additionally, or alternatively, in step 924, the electronic device is in an overheated state, based on the temperature. For example, if the device is in an overheat state can indicate that the communication unit is to use a lower transmit power if it wants to keep transmitting. For example, if the electronic device determines that it is in an overheated state (as determined in step 924) the electronic device in step 906 operates MPE without radar. Alternatively, if the electronic device determines that it is not in an overheated state (as determined in step 924) the electronic device in step 908 operates MPE with radar.

In certain embodiments, determining whether to use MPE with (or without) radar is based on non-radar-based sensors. As illustrated in FIG. 9D, the electronic device obtains information 932 from non-radar-based sensors. Information 932 from non-radar-based sensors could also be provided by the application layer (such as the information 402 from higher layers of FIG. 4A). For example, the electronic device can include a handgrip sensor, which provides information 932 of whether the electronic device is being held. For another example, the electronic device can include a touch screen, which provides information 932 of whether the user is actively interacting with the touch screen. The information of whether the user is actively interacting with the touch screen could be used to inferred that the user is holding the device. This information 932 (such as the information from handgrip sensor or an indication that the user is interacting with the touch screen) could be used to indicate a high exposure situation, since the user is likely holding the electronic device. As such, radar might not provide much benefit for MPE management when the user is holding the device.

In step 934, the electronic device can determine whether a user is holding the electronic device based on the information 932. Upon a determination that the user is holding the electronic device (as determined in step 934) the electronic device in step 906 operates MPE without radar. Alternatively, upon a determination that the user is not holding the electronic device (as determined in step 934) the electronic device in step 908 operates MPE with radar.

Figure 10A:
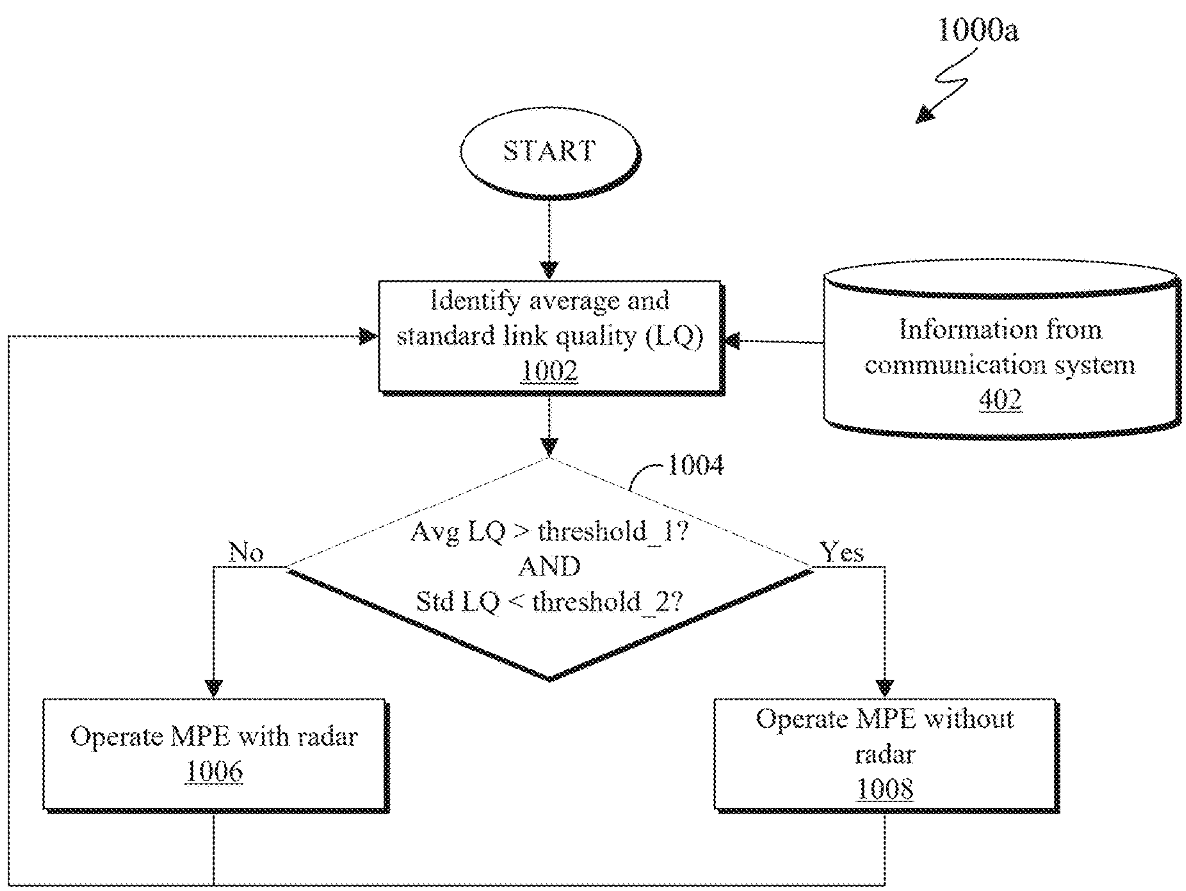
FIGS. 10A-10D illustrate example methods for determining whether to use radar for MPE management based on communication-based information according to embodiments of this disclosure.
Figure 10B:
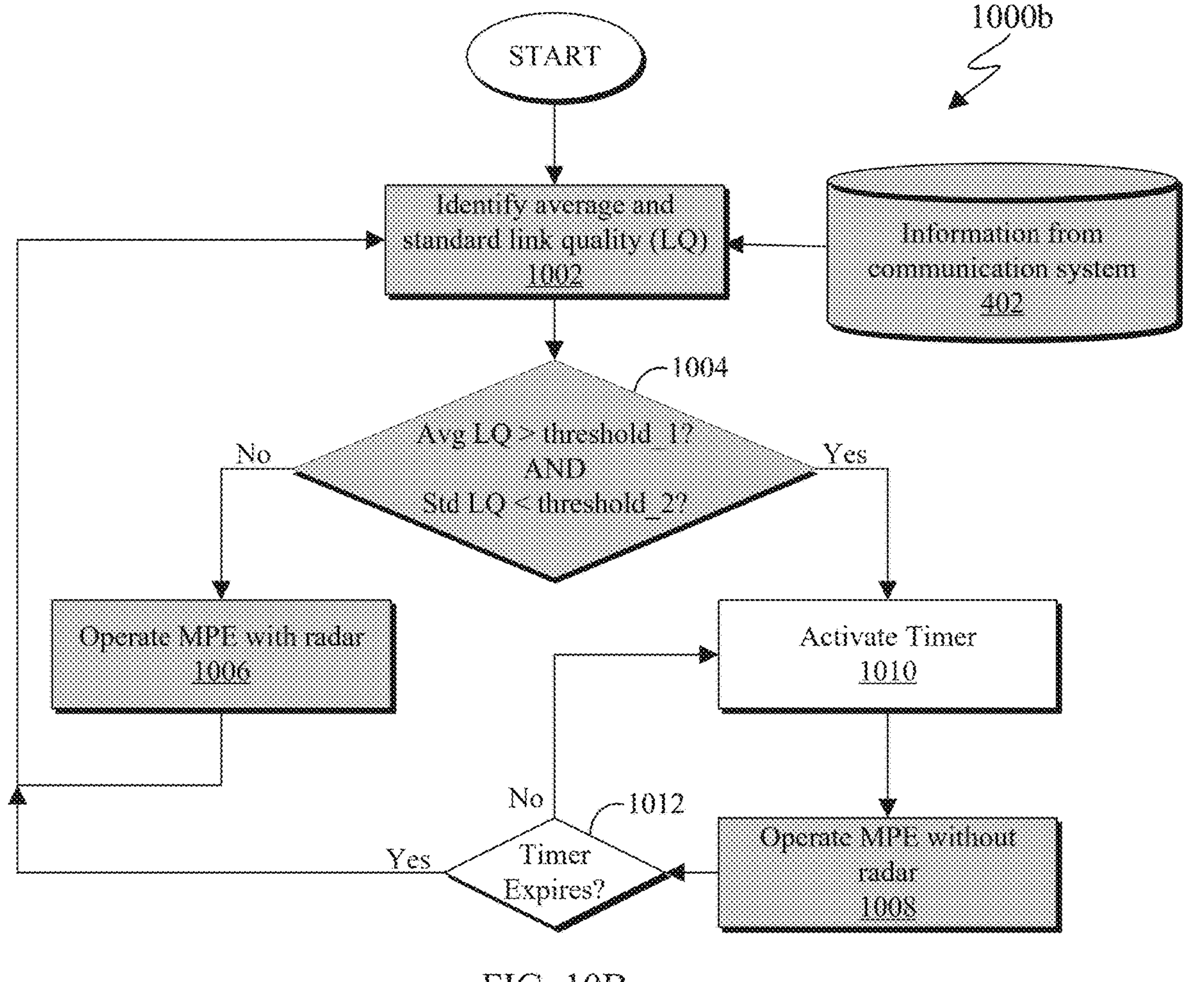
Figure 10C:
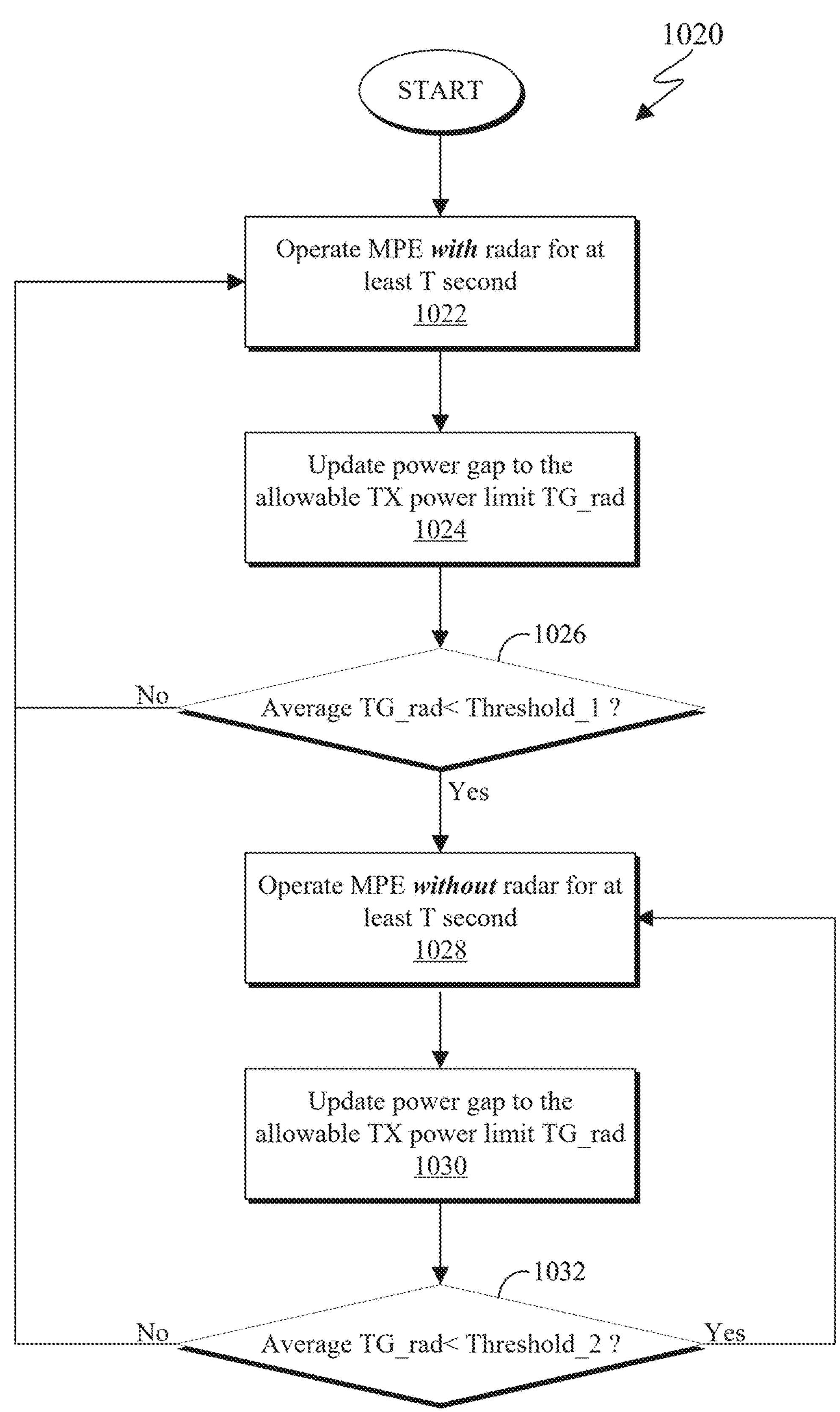
Figure 10D:
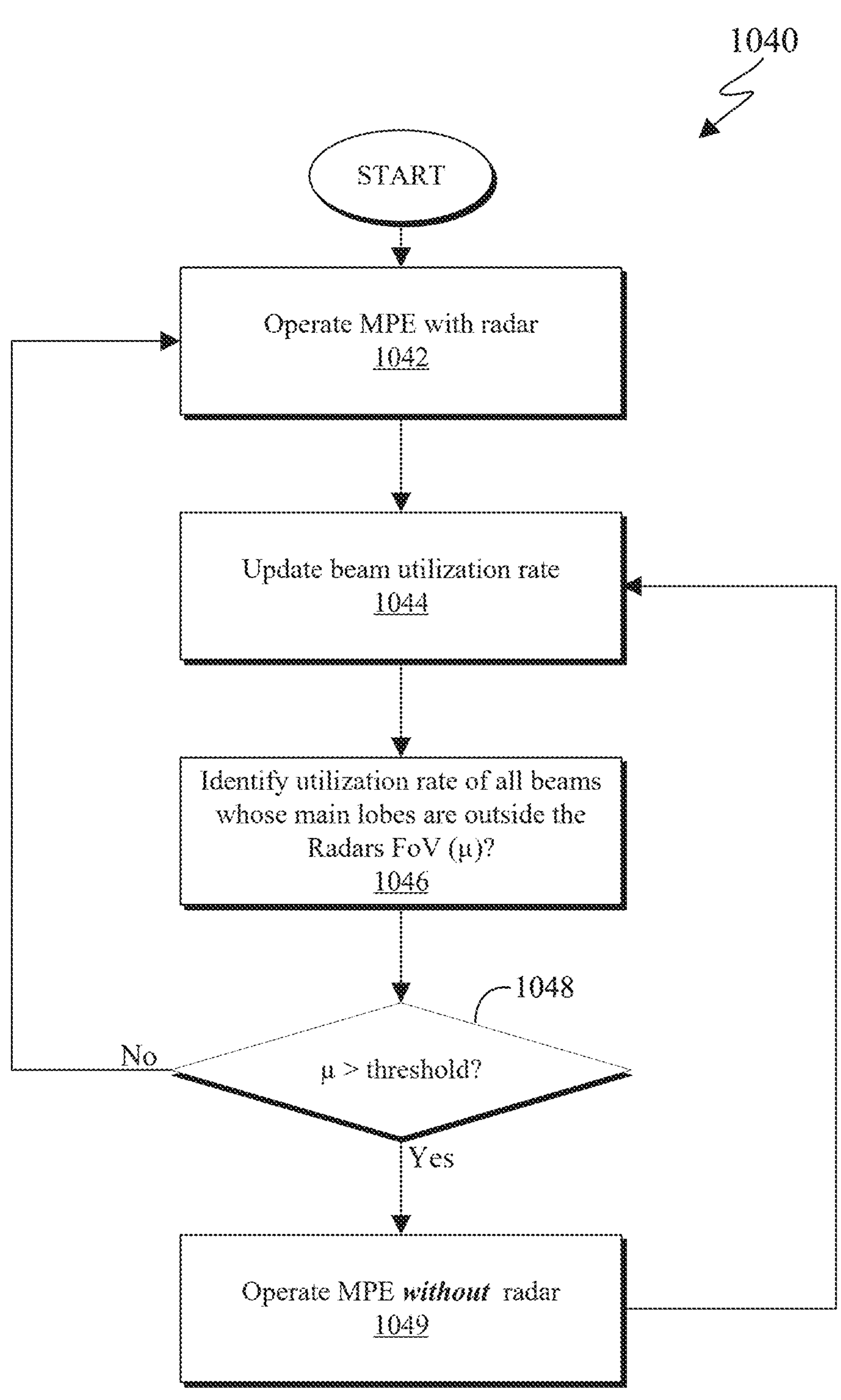

FIGS. 10A-10D illustrate example methods for determining whether to use radar for MPE management based on communication-based information according to embodiments of this disclosure. In particular, FIG. 10A illustrates an example method 1000*a* for determining whether to operate MPE with (or without) radar based on link quality information obtained from the communication module (also denoted as the communication unit). FIG. 10B illustrates an example method 1000*b*, which is similar to the method 1000*a* of FIG. 10A. In particular the method 1000*b* as illustrated in FIG. 10B, is similar to the method 1000*a* of FIG. 10A but includes a timer for reducing a potential switching back and forth between MPE with radar and MPE without radar. FIG. 10C illustrates an example method 1020 for determining whether to operate MPE with (or without) radar, based on the uplink transmit power history. FIG. 10D illustrates an example method 1040 for determining whether to operate MPE with (or without) radar, based on the utilization rates of beams outside the FoV of the radar. It is noted that the method 1000*a*, 1000*b*, 1020, and 1040 of FIGS. 10A-10D, respectively, describe as using the information 404 from the communication system of FIG. 4A for the step 410 of FIG. 4A.

In certain embodiments, information obtained from the communication system (module) can be used to determine whether it is justifiable to run radar for MPE management purpose. The electronic device can use link quality for determining (in step 410 of FIG. 4A) whether to use radar for MPE.

For example, if the electronic device already has a good link condition, it might already be able to support a high modulation and coding scheme (MCS). As such, improving signal quality by increasing the TX power might provide negligible or even no gain in the throughput. Also, increasing the power can be more beneficial in the low SNR regime (i.e., more power efficient), but not in the high SNR regime (as indicated in the Shannon capacity formula). As such, the benefit of the operating MPE with radar (which can allow higher communication TX power) will diminish as the channel quality increases.

Since wireless channel can change very quickly, embodiments of the present disclosure considers the average link quality as well as the fluctuation of the link quality. The fluctuations of the link quality can be expressed as the standard deviation of the link quality. The average and the standard of deviation could be identified in a sliding window manner. The link quality can be defined using metrics such as the MCS level, the reference signal received power (RSRP), the throughput, the retransmission rate, and the like.

To determine whether to operate MPE management with radar, the link quality is ensured to have average larger than some threshold (denoted as threshold_1) and its standard deviation lower than some threshold (denoted as threshold_2). If this condition is met, then MPE without radar is operated. This is described in FIG. 10A. It is noted that FIG. 10A can be modified to include a timer, such as described in FIG. 10B. The timer (as illustrated in FIG. 10B provides a mechanism to prevent the MPE operation from switching back and forth between using and not using radar. Such oscillation in the operation modes could result in undesirable behavior such as large fluctuation in the allowable communication TX power. The timer can force it to stay in the MPE without radar mode for at least the timer duration before it can switch back to the MPE with radar mode.

As illustrated in FIG. 10A, an electronic device identifies an average link quality and a standard deviation of the link quality from information 404 from the communication system. In step 1004, the electronic device determines whether the average link quality is greater than a first threshold. In step 1004, the electronic device also determines whether the standard deviation of the link quality is less than a second threshold.

When the average link quality is greater than the first threshold and the standard deviation of the link quality is less than the second threshold (as determined in step 1004) the electronic device operates MPE without radar (step 1008). It is noted that step 1008 can be similar to the step 415 of FIG. 4A. When (i) the average link quality is not greater than the first threshold, (ii) the standard deviation of the link quality is not less than the second threshold, and (iii) both the average link quality is not greater than the first threshold and the standard deviation of the link quality is not less than the second threshold (as detrained in step 1004), the electronic device operates MPE with radar (step 1006). It is noted that step 1006 can be similar to the step 420 of FIG. 4A.

After the electronic device operates the MPE with radar (step 1006) or operates MPE without radar (step 1008), the sliding window shifts to include the next time instance and the average link quality and the standard deviation of the link quality are identified (step 1002).

As illustrated in FIG. 10B, an electronic device identifies an average link quality and a standard deviation of the link quality from information 404 from the communication system. In step 1004, the electronic device determines whether the average link quality is greater than a first threshold. In step 1004, the electronic device also determines whether the standard deviation of the link quality is less than a second threshold.

When (i) the average link quality is not greater than the first threshold, (ii) the standard deviation of the link quality is not less than the second threshold, (iii) both the average link quality is not greater than the first threshold and the standard deviation of the link quality is not less than the second threshold (as determined in step 1004), the electronic device operates MPE with radar (step 1006). It is noted that step 1006 can be similar to the step 420 of FIG. 4A.

When the average link quality is greater than the first threshold and the standard deviation of the link quality is less than the second threshold (as determined in step 1004) the electronic device activates a timer (step 1010). In step 1008, the electronic device operates MPE without radar, such as the second mode denoted as MPE without radar (step 415 of FIG. 4A). In step 1012, the electronic device determines whether the timer (which was activated in step 1010) expires. Upon determining that the timer did not expire (as determined in step 1012), the electronic device continues to operate MPE without radar (step 1008).

After the electronic device operates the MPE with radar (step 1006) or determines that the timer expired (step 1012), the sliding window shifts to include the next time instance and the average link quality and the standard deviation of the link quality are identified (step 1002).

In certain embodiments, the electronic device uses uplink transmission power for determining whether to use radar for MPE. For example, the electronic device can identify and use the average power gap to the maximum allowable TX power of the respective for MPE management methods (i.e., with and without radar) when using uplink transmission power. This is described in FIG. 10C. That is, if transmission at high communication TX power is needed, the power gap to the maximum allowable TX power limit (determined by the MPE management with or without radar in their respective mode) should be small as most of the time the communication TX power used would be close to the maximum limit. If that is not the case, then high communication TX power is not needed and there is no benefit to using radar for MPE management. It is noted that the MPE with radar or MPE without radar should be operated for at least a certain duration before switching since the average power gap is used in determining which MPE mode is to be used. To ensure this, after each mode switch (or at the start), the selected mode is operated for at least T seconds. After this T sec, the average power gap can be updated in a sliding window manner. T can be a predefined value.

As illustrated in FIG. 10C, an electronic device (such as the electronic device 200), in step 1022, operates MPE with radar (such as the first mode, MPE with radar, step 420 of FIG. 4A) for at least a predefined period of time, T. In step 1024, the electronic device updates the power gap to the allowable TX power limit (i.e., the difference between the actually used TX power of the communication TX and the maximum allowable limit determined by the MPE manager with radar). In step 1026, the electronic device determines whether the average power gap is less than a threshold_1. If the electronic device determines that the average power gap is not less than the threshold_1 (as determined in step 1026), then the electronic device return to step 1022. Alternatively, if the electronic device determines that the average power gap is less than the threshold_1 (as determined in step 1026), then the electronic device operates MPE without radar for at least T seconds (step 1028).

In step 1030, the electronic device updates the power gap to the allowable TX power limit (i.e., the difference between the actually used TX power of the communication TX and the maximum allowable limit determined by the MPE manager without radar). In step 1032, the electronic device determines whether the average power gap is less than a threshold_2. If the electronic device determines that the average power gap is not less than the threshold_2 (as determined in step 1032), then the electronic device returns to step 1022. Alternatively, if the electronic device determines that the average power gap is less than the threshold_2 (as determined in step 1032), then the electronic device returns to step 1028.

In certain embodiments, the relative placement of the radar and communication systems can be used for determining whether to operate MPE with or without radar. For communication at high frequencies, to mitigate blockages of the module, often multiple communication modules are installed on the device. Embodiments of the present disclosure take into consideration that it would be ideal to have the FoV of each communication module fully overlaps with an FoV of a radar, the cost could prevent such an implementation. As such, the number of radar modules could be less than the number of communication modules. Additionally, there could be parts of the collective FoVs of the communication modules that are not covered by the FoV of the radar modules.

Depending on the placement of the communication module and the radar on the electronic device, certain communication module(s) or certain part(s) of the FoV of the communication modules might not be covered by the FoV of the radar. If the communication module uses beams belonging to a module that is not within the FoV of the radar or beams belonging to a part of FoV that is not covered by the FoV of the radar, then there could be limited benefit to using radar for MPE management if those beams are used most of the time. An example embodiment following this idea is shown in FIG. 10D. It is noted the utilization rate of the beams within the FoV of the radar is of more concern than each beam individually. The utilization rate of a set of beams could be defined as the sum of the utilization rate of each beam in the set. The utilization rate threshold could be set according to the situation. For example, if high data rate is prioritized over lower data rates, then a lower threshold could be used so that MPE management with radar is selected more often.

As illustrated in FIG. 10D, an electronic device, in step 1042, operates MPE with radar (such as the first mode, MPE with radar, step 420 of FIG. 4A). In step 1044, the electronic device updates the beam utilization rate. In step 1046, the electronic device identifies the utilization rate of all beams whose main lobes are outside the FoV of the radar. In step 1048, the electronic device compares the utilization rate of the beams whose main lobe is outside the FoV of the radar to a threshold. If the electronic device determines that the utilization rate of the beams whose main lobe is outside the FoV of the radar is not greater than the threshold (as determined in step 1048), then the electronic device returns to step 1042. Alternatively, if the electronic device determines that the utilization rate of the beams whose main lobe is outside the FoV of the radar is greater than the threshold (as determined in step 1048), then the electronic device in step 1049 operate MPE without radar (such as the second mode, MPE without radar, step 415 of FIG. 4A). After operating MPE without radar, the electronic device returns to step 1044 to updates the beam utilization rate.

Figure 11:
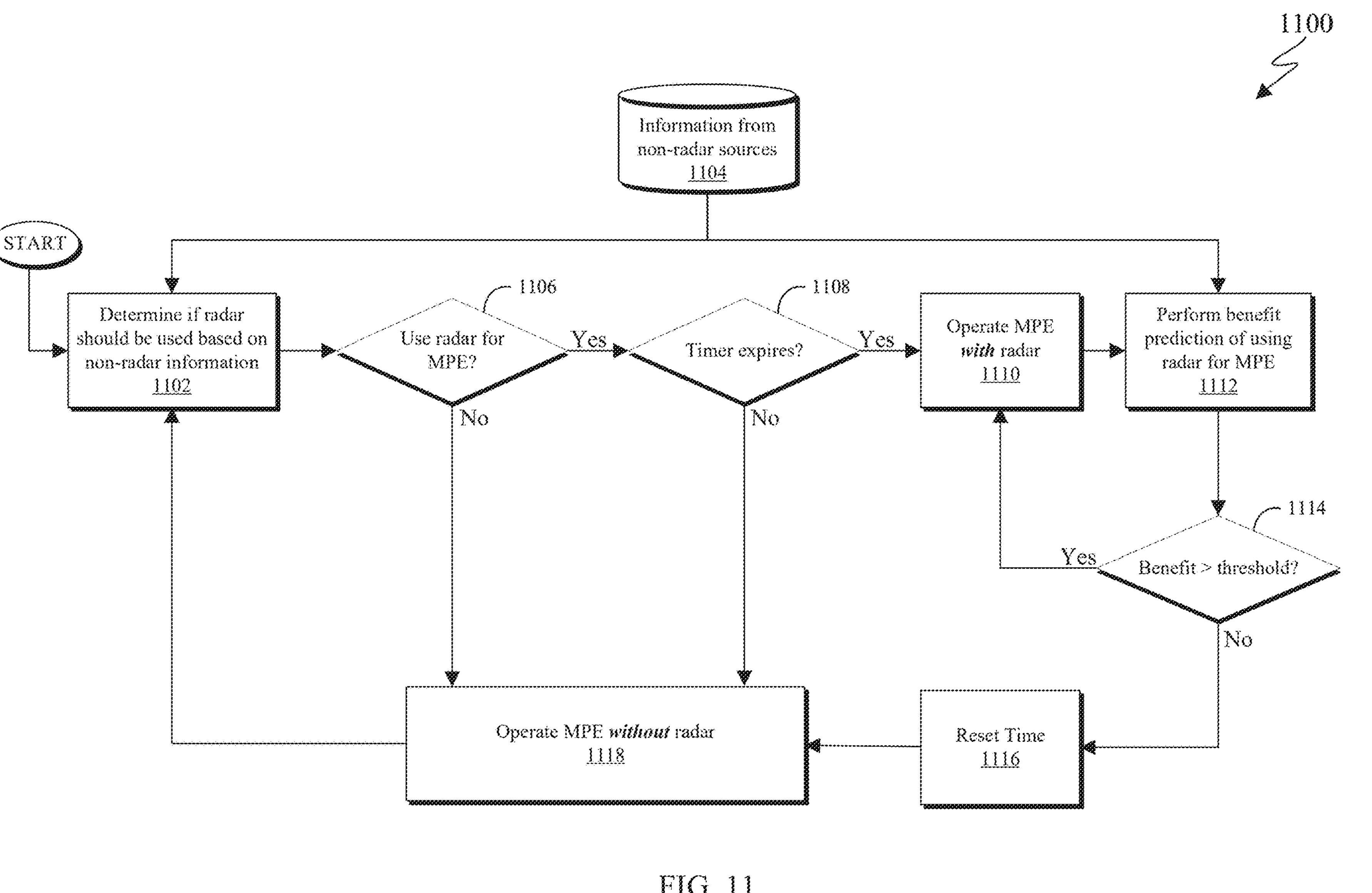
FIG. 11 illustrates an example method for determining whether to use radar for MPE management based on various information according to embodiments of this disclosure.

FIG. 11 illustrates an example method 1100 for determining whether to use radar for MPE management based on information from various sources according to embodiments of this disclosure. For example, the method 1100 describes using non radar information and radar information for determining whether to operate MPE with radar.

Embodiments of the present disclosure can be roughly divided into two categories: those that use radar detection results (e.g., those based on radar detection rate or benefit predictor) and those that use other information (e.g., higher-layer, device state, communication module, etc.). These two categories of embodiments can be combined together for utilizing all available information. This is illustrated in FIG. 11. Here, the determination of whether to use radar for MPE management using non-radar information could be one or a combination of embodiments described in FIGS. 9A-10D. The benefit predictor for using radar could be based on one of the embodiments described in FIGS. 7A-8B. As illustrated in the method 1100 of FIG. 11, first the non-radar information is used to determine if it could be beneficial to use radar for MPE management. For example, if there is a high uplink data rate demand and the link quality is not good enough, being able to use higher TX power for the communication module could be helpful. In that case, the solution would attempt to operate radar for MPE management. The benefit of operating radar does have dependence on the environment as described above in various embodiments that use radar detection rate or the benefit predictor. If based on radar detection history, it is determined that there is limited or no benefit to using radar (e.g., when the detection rate of target at close range is high), then operating radar could still be fruitless. In that situation, the best option is to wait for a period of time to elapse (i.e., for the environment to change) before attempting to use radar for MPE management again. This is done using a timer.

As illustrated in FIG. 11, in step 1102, the electronic device determines if radar should be used based on non-radar information such as the information 1104. The information 1104 can include the information 402 and 404 from FIG. 4A. For example, the information 1104 can include information from higher layers, information concerning the device state, information from the communication system, and the like.

In step 1106, the electronic device determines whether to use radar for MPE. In response to determining to not use radar for MPE (as determined in step 1106), the electronic device determines operates MPE without radar (step 1118). Alternatively, in response to determining to use radar for MPE (as determined in step 1106), the electronic device determines whether a time duration of the timer expired (step 1108).

In response to determining that the timer did not expire (as determined in step 1108), the electronic device determines operates MPE without radar (step 1118). Alternatively, in response to determining that the timer expired (as determined in step 1108), the electronic device operates MPE with radar (step 1110).

In step 1112, the electronic device performs a benefit prediction using the radar for MPE. The predictor can also be based on the information 1104. In step 1114, the electronic device determines whether the benefit of using radar is greater than a threshold. If the benefit is greater than the threshold (as determined in step 1114), then the electronic device returns to step 1110. Alternatively, if the benefit is not greater than the threshold (as determined in step 1114), then the electronic device resets the timer (step 1116). After the timer is reset, electronic device determines operates MPE without radar (step 1118). After operating the electronic device without radar (step 1118) the electronic device returns to step 1102.

Although FIGS. 7A-11 illustrates examples for determining whether to use radar for MPE management, various changes may be made to FIG. 7A-11. For example, while shown as a series of steps, various steps in FIG. 7A-11 could overlap, occur in parallel, or occur any number of times.

Figure 12:
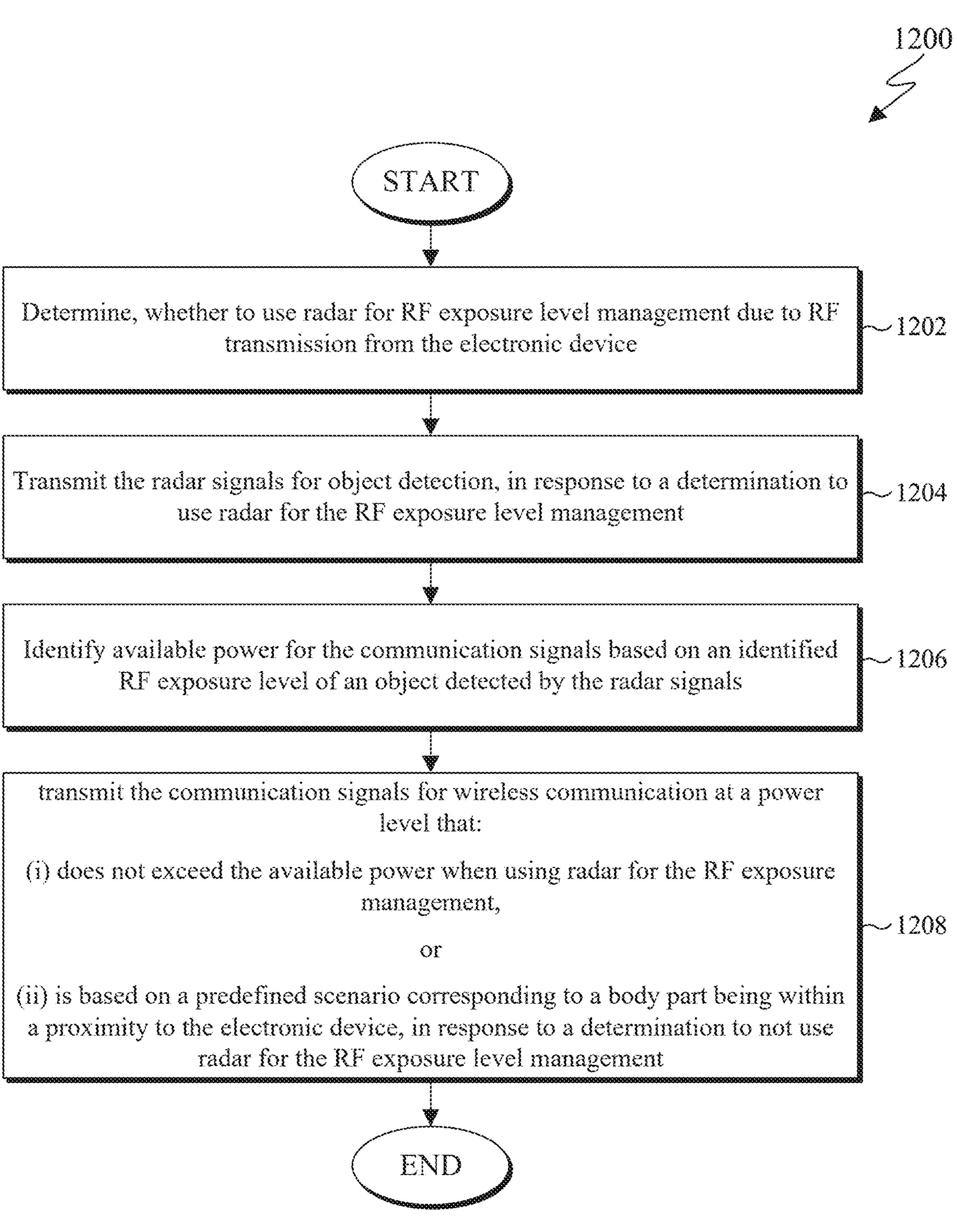
FIG. 12 illustrates an example method for exposure level management according to embodiments of this disclosure.

FIG. 12 illustrates an example method 1200 for exposure level management according to embodiments of this disclosure. The embodiments of the method 1200 of FIG. 12 are for illustration only. Other embodiments can be used without departing from the scope of the present disclosure.

The method 1200 is described as implemented by any one of the client devices 106-114 of FIG. 1, the server 104 of FIG. 1, the electronic device 300 of FIGS. 3A and 3B and can include internal components similar to that of electronic device 200 of FIG. 2. For ease of explanation, method 1200 is described as being performed by the electronic device 200 of FIG. 2.

In step 1202, an electronic device (such as the electronic device 200) determines whether to use radar for RFE level management due to RF transmissions from the electronic device. In certain embodiments, the determination can be based on a set of information.

The set of information can include radar sensing results (such as results from previous radar detections). For example, to determine whether to use radar for the RF exposure level management, the electronic device can transmit the radar signals to generate radar sensing results. The radar sensing results are included in the set of information. The electronic device can identify a detection sequence of the object based on the radar sensing results. The electronic device can identify a benefit value of using the radar signals for the RF exposure level based on the detection sequence. The electronic device can compare the benefit value to a threshold. Based on a result of the comparison, the electronic device can initiate a timer of a predetermined time. The electronic device can determine to not use radar for the RF exposure management until the predetermined time of the timer expires.

The set of information can also include information from higher layers (such as from an application). For example, to determine whether to use radar for the RF exposure level management, the electronic device can obtain state information of the electronic device, the state information including at least one of an operational mode, a battery level, and a temperature level. The electronic device can determine to not use radar for the RF exposure level management, when (i) state information can indicate that the operational mode of the electronic device is a power save mode, (ii) the battery level is less than a first threshold, or (iii) the temperature level is above a second threshold. Alternatively, the electronic device can determine to use radar for the RF exposure level management, when (i) the state information indicates that the operational mode of the electronic device is not the power save mode (ii) the battery level is above a first threshold, or (iii) the temperature level is below the second threshold.

Additionally, the set of information can include information regarding the wireless communication, (such as an indication of a link quality). For example, to determine whether to use radar for the RF exposure level management, the electronic device can identify an uplink data rate used for the wireless communication. The electronic device can compare the uplink data rate to a threshold. Based on a first result of the comparison, the electronic device can determine to use radar for the RF exposure level management. Based on a second result of the comparison, the electronic device can determine to not use radar for the RF exposure level management.

For another example, to determine whether to use radar for the RF exposure level management, the electronic device can identify an average and a standard deviation of a link quality of the wireless communication. The electronic device can compare the average link quality to a first threshold and the standard deviation of the link quality to a second threshold to generate a first result and a second result, respectively. Based on the first and second results, the electronic device can determine to use radar for the RF exposure level management. Based on the first and second results, the electronic device can determine to not use radar for the RF exposure level management.

In step 1204, the electronic device 200 transmits radar signals for object detection. The electronic device 200 can transmit the radar signals (via a radar transceiver, such as the radar transceiver 270 of FIG. 2) in response to the determination (of step 1202) to use radar for RF exposure management. The electronic device 200 can also receive the transmitted radar signals that reflected off of an object (via the radar transceiver, such as the radar transceiver 270 of FIG. 2).

In certain embodiments, an electronic device (such as the electronic device 200) can use the radar signals using different bandwidths. For Example, the electronic device can transmit the radar signals using a NB radar and a WB radar. The bandwidth of WB radar is larger than the bandwidth of NB radar. The WB radar can have a higher range resolution (such as 3 cm) compared to the NB radar signals (which can have 1.5 m resolution). The electronic device can transmit radar signals using the WB radar for object detection. The electronic device can then determine whether to switch from the WB radar to NB radar for object detection. In response to a determination to switch from the WB radar to NB radar, the electronic device can then transmit the radar signals using the NB radar for object detection. The electronic device can identify the RF exposure level of a detected target (e.g., a body part) due to the communication signals based on the NB radar signals or the WB radar signals.

In order to determine whether to switch from the WB to the NB radar signals the electronic device can determine whether an object is detected for a predetermined period of time using the radar signals corresponding to the WB radar. In response to a determination that no object is detected for the predetermined period of time, the electronic device can transmit the radar signals corresponding to the NB for object detection. The electronic device can determine whether an object is detected in a first range tap based on the radar signals using the NB radar. In response to a determination that the object is detected in the first range tap, transmit the radar signals using the WB radar for object detection. The electronic device then identifies the RF exposure level of the object due to the communication signals based on the radar signals using at least one of the NB or WB radar signals.

In certain embodiments, to determine whether to use radar for RF exposure, an electronic device (such as the UE 116) transmits radar signals to generate radar sensing results. The radar sensing results can be included in the set of information. The electronic device can identify a detection rate from the radar sensing results. The detection rate can be represented as a ratio that the object is within a predefined distance from the electronic device. The electronic device compares the detection rate to a threshold. The electronic device can initiate a timer of a predetermined time when the comparison indicates that the object is within the predefined distance from the electronic device more often than the object is outside the predefined distance from the electronic device. The electronic device can determine to not use radar for the RF exposure management until the predetermined time of the timer expires. It is noted that the radar signals can be transmitted at different bandwidths including a NB radar and a WB radar. When the radar signals are transmitted using the NB radar, the detection rate is based on the ratio of a number of times that the object is detected in a first range tap to a total number of radar detection results. Alternatively, when the radar signals are transmitted using WB radar, the detection rate is based on the ratio of a number of times that the object is detected within a threshold range to a total number of radar detection results.

In step 1206, the electronic device 200 identifies available power for the communication signals based on an identified RF exposure level of an object detected by the radar signals. For example, in response to detecting an object the electronic device can identify a current RF exposure level of that object. The available power can be based on a difference between the current RF exposure level of that object and a MPE level.

In step 1208, the electronic device transmits the communication signals for wireless communication. The electronic device 200 can transmit the signals for communication at a power that does not exceed the available power (identified in step 1206) when radar is used for RF exposure management. Alternatively, if the electronic device 200 determined to not use radar for RF exposure management (as determined in step 1202) then the electronic device transmits the signals for communication at a power based on a predefined scenario. For example, the predefined scenario can correspond to a body part being within proximity to the electronic device. This can also be denoted as a worst-case scenario for RF exposure.

Although FIG. 12 illustrates examples for exposure management, various changes may be made to FIG. 12. For example, while shown as a series of steps, various steps in FIG. 12 could overlap, occur in parallel, or occur any number of times.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system. None of the description in this application should be read as implying that any particular element, step, or function is an essential element that must be included in the claims scope.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device, comprising:

a transceiver configured to transmit and receive radar signals and communication signals; and a processor operability connected to the transceiver, wherein the processor is configured to perform radio frequency (RF) exposure level management due to RF transmission from the electronic device, where in performance of the RF exposure level management, the processor is further configured to:

select, based at least in part on a set of information that includes non-radar sensing information from a non-radar information source, a maximum permissible exposure (MPE) mode corresponding to a determination whether to operate a radar to generate a current radar-sensing result for object detection for the RF exposure level management, wherein:

the selected MPE mode is selected from among a first MPE mode and a second MPE mode, and the selected MPE mode controls an ON or OFF state of the radar based on the determination whether to operate the radar for RF exposure level management, a selection of the first MPE mode corresponds to a determination to operate and use the radar for the RF exposure level management, and a selection of the second MPE mode corresponds to a determination to not operate and not use the radar for the RF exposure level management;

in response to selection of the second MPE mode, control the radar to be in the OFF state;

in response to, selection of the first MPE mode:

control the radar to be in the ON state;

transmit, via the transceiver, the radar signals and generate the current radar-sensing result for object detection; and identify available power for the communication signals based on an identified RF exposure level of an object detected by the radar signals and the current radar-sensing result; and transmit the communication signals for wireless communication at a power level that:

(i) does not exceed the available power when the first MPE mode is selected or (ii) is based on a predefined scenario corresponding to a body part being within a proximity to the electronic device, in response to the selection of the second MPE mode which corresponds to the determination to not operate the radar for the RF exposure level management.

2. The electronic device of claim 1, wherein:

the radar signals are transmitted at different bandwidths including a first bandwidth and a second bandwidth that is larger than the first bandwidth; and the processor is further configured to:

transmit the radar signals using the second bandwidth for object detection, determine whether to switch from the second bandwidth to the first bandwidth for object detection, in response to a determination to switch from the second bandwidth to the first bandwidth, transmit the radar signals using the first bandwidth for object detection, and identify the RF exposure level of the object due to the communication signals based on the radar signals of the first bandwidth or the radar signals of the second bandwidth.

3. The electronic device of claim 2, wherein to determine whether to switch from the second bandwidth to the first bandwidth, the processor is configured to:

determine whether the object is detected for a predetermined period of time using the radar signals of the second bandwidth;

in response to a determination that no object is detected for the predetermined period of time, transmit the radar signals using the first bandwidth for object detection;

determine whether the object is detected in a first range tap based on the radar signals using the first bandwidth;

in response to a determination that the object is detected in the first range tap, transmit the radar signals using the second bandwidth for object detection; and identify the RF exposure level of the object due to the communication signals based on the radar signals using at least one of the first bandwidth and the second bandwidth.

4. The electronic device of claim 1, wherein to select the MPE mode corresponding to the determination whether to operate the radar for the RF exposure level management, the processor is configured to:

transmit the radar signals to generate radar sensing results, wherein the radar sensing results are included in the set of information;

identify a detection rate from the radar sensing results, the detection rate indicating a ratio that the object is within a predefined distance from the electronic device;

compare the detection rate to a threshold;

initiate a timer of a predetermined time when the comparison indicates that the detection rate is greater than the threshold; and select the second MPE mode corresponding to the determination to not operate the radar for the RF exposure management until the predetermined time of the timer expires.

5. The electronic device of claim 4, wherein:

the radar signals are transmitted at different bandwidths including first bandwidth and a second bandwidth that is larger than the first bandwidth, when the radar signals are transmitted using the first bandwidth, the detection rate is based on the ratio of a number of times that the object is detected in a first range tap to a total number of radar detection results, and when the radar signals are transmitted using the second bandwidth, the detection rate is based on the ratio of a number of times that the object is detected within a threshold range to a total number of radar detection results.

6. The electronic device of claim 1, wherein to select the MPE mode corresponding to the determination whether to operate the radar for the RF exposure level management, the processor is configured to:

transmit the radar signals to generate radar sensing results, wherein the radar sensing results are included in the set of information;

identify a detection sequence of the object based on the radar sensing results;

identify a benefit value of using the radar signals for the RF exposure level based on the detection sequence;

compare the benefit value to a threshold;

based on a result of the comparison, initiate a timer of a predetermined time; and select the second MPE mode corresponding to the determination to not operate the radar for the RF exposure management until the predetermined time of the timer expires.

7. The electronic device of claim 1, wherein to select the MPE mode corresponding to the determination whether to operate the radar for the RF exposure level management, the processor is further configured to:

identify an uplink data rate used for the wireless communication;

compare the uplink data rate to a threshold;

based on a first result of the comparison, determine to operate the radar for the RF exposure level management; and based on a second result of the comparison, determine to not operate the radar for the RF exposure level management.

8. The electronic device of claim 1, wherein to select the MPE mode corresponding to the determination whether to operate the radar for the RF exposure level management, the processor is further configured to:

obtain state information of the electronic device, the state information including at least one of an operational mode, a battery level, and a temperature level;

select the second MPE mode which corresponds to the determination to not operate the radar for the RF exposure level management, when the state information indicates that the operational mode of the electronic device is a power save mode;

select the first MPE mode which corresponds to the determination to operate the radar for the RF exposure level management, when the state information indicates that the operational mode of the electronic device is not the power save mode;

select the second MPE mode which corresponds to the determination to not operate the radar for the RF exposure level management, when the battery level is less than a first threshold;

select the first MPE mode which corresponds to the determination to operate the radar for the RF exposure level management, when the battery level is above the first threshold;

select the second MPE mode which corresponds to the determination to not operate the radar for the RF exposure level management, when the temperature level is above a second threshold; and select the first MPE mode which corresponds to the determination to operate the radar for the RF exposure level management, when the temperature level is below the second threshold.

9. The electronic device of claim 1, wherein to select the MPE mode corresponding to the determination whether to operate the radar for the RF exposure level management, the processor is further configured to:

identify an average and a standard deviation of a link quality of the wireless communication;

compare the average to a first threshold and the standard deviation to a second threshold to generate a first result and a second result, respectively;

based on the first and second results, select the first MPE mode corresponding to the determination to operate the radar for the RF exposure level management; and based on the first and second results, select the second MPE mode which corresponds to the determination to not operate the radar for the RF exposure level management.

10. The electronic device of claim 1, wherein the set of information includes at least one of:

radar sensing results;

information from higher layers; and information regarding the wireless communication.

11. A method for radio frequency (RF) exposure management, the method comprising:

selecting, based at least in part on a set of information that includes non-radar sensing information from a non-radar information source, a maximum permissible exposure (MPE) mode corresponding to a determination whether to operate a radar to generate a current radar-sensing result for object detection for the RF exposure level management, wherein the selected MPE mode is selected from among a first MPE mode and a second MPE mode, and the selected MPE mode controls an ON or OFF state of the radar based on the determination whether to operate the radar for RF exposure level management, wherein a selection of the first MPE mode corresponds to a determination to operate and use the radar for the RF exposure level management;

when the first MPE mode is selected:

controlling the radar to be in the ON state;

transmitting radar signals and generating a current radar-sensing result for object detection based on the transmitted radar signals;

identifying available power for communication signals based on an identified RF exposure level of an object detected by the radar signals and the current radar-sensing result; and transmitting the communication signals for wireless communication at a power level that does not exceed the available power when the first MPE mode is selected; and when the second MPE mode is selected, controlling the radar to be in the OFF state and transmitting the communication signals for wireless communication at a power level that is based on a predefined scenario corresponding to a body part being within a proximity to an electronic device.

12. The method of claim 11, wherein:

the radar signals are transmitted at different bandwidths including a first bandwidth and a second bandwidth that is larger than the first bandwidth; and the method further comprises:

transmitting the radar signals using the second bandwidth for object detection, determining whether to switch from the second bandwidth to the first bandwidth for object detection, based on determining to switch from the second bandwidth to the first bandwidth, transmitting the radar signals using the first bandwidth for object detection, and identifying the RF exposure level of the object due to the communication signals based on the radar signals of the first bandwidth or the radar signals of the second bandwidth.

13. The method of claim 12, wherein determining whether to switch from the second bandwidth to the first bandwidth comprises:

determining whether the object is detected for a predetermined period of time using the radar signals of the second bandwidth;

based on determining that no object is detected for the predetermined period of time, transmitting the radar signals using the first bandwidth for object detection;

determining whether the object is detected in a first range tap based on the radar signals using the first bandwidth;

based on determining that the object is detected in the first range tap, transmitting the radar signals using the second bandwidth for object detection; and identifying the RF exposure level of the object due to the communication signals based on the radar signals using at least one of the first bandwidth and the second bandwidth.

14. The method of claim 11, wherein selecting the MPE mode comprises:

transmitting the radar signals to generate radar sensing results, wherein the radar sensing results are included in the set of information;

identifying a detection rate from the radar sensing results, the detection rate indicating a ratio that the object is within a predefined distance from the electronic device;

comparing the detection rate to a threshold;

initiating a timer of a predetermined time when the comparison indicates that the detection rate is greater than the threshold; and selecting the second MPE mode corresponding to the determination to not operate the radar until the predetermined time of the timer expires.

15. The method of claim 11, wherein determining whether to use radar for the RF exposure level management comprises:

transmitting the radar signals to generate radar sensing results, wherein the radar sensing results are included in the set of information;

identifying a detection sequence of the object based on the radar sensing results;

identifying a benefit value of using the radar signals for the RF exposure level based on the detection sequence;

comparing the benefit value to a threshold;

based on a result of the comparison, initiating a timer of a predetermined time; and selecting the second MPE mode corresponding to the determination to not operate radar for the RF exposure management until the predetermined time of the timer expires.

16. The method of claim 11, wherein selecting the MPE mode comprises:

identifying an uplink data rate used for the wireless communication;

comparing the uplink data rate to a threshold;

based on a first result of the comparison, selecting the first MPE mode corresponding to the determination to operate the radar; and based on a second result of the comparison, selecting the second MPE mode corresponding to the determination to not operate the radar.

17. The method of claim 11, wherein selecting the MPE mode corresponding to the determination whether to operate the radar for the RF exposure level management comprises:

obtaining state information of the electronic device, the state information including at least one of an operational mode, a battery level, and a temperature level;

selecting the second MPE mode corresponding to the determination to not operate the radar, when the state information indicates that the operational mode of the electronic device is a power save mode;

selecting the first MPE mode corresponding to the determination to operate the radar, when the state information indicates that the operational mode of the electronic device is not the power save mode;

selecting the second MPE mode corresponding to the determination to not operate the radar, when the battery level is less than a first threshold;

selecting the first MPE mode corresponding to the determination to operate the radar, when the battery level is above the first threshold;

selecting the second MPE mode corresponding to the determination to not operate the radar, when the temperature level is above a second threshold; and selecting the first MPE mode corresponding to the determination to operate the radar, when the temperature level is below the second threshold.

18. The method of claim 11, wherein selecting the MPE mode comprises:

identifying an average and a standard deviation of a link quality of the wireless communication;

comparing the average to a first threshold and the standard deviation to a second threshold to generate a first result and a second result, respectively;

based on the first and second results, selecting the first MPE mode corresponding to the determination to operate the radar; and based on the first and second results, selecting the second MPE mode corresponding to the determination to not operate the radar.

19. The method of claim 11, wherein the set of information includes at least one of:

radar sensing results;

information from higher layers; and information regarding the wireless communication.

20. A non-transitory computer readable medium embodying a computer program, the computer program comprising computer readable program code that, when executed by a processor of an electronic device, causes the processor to:

perform radio frequency (RF) exposure level management due to RF transmission from the electronic device, wherein to perform the RF exposure level management further the computer program comprises code that causes the processor to:

select, based at least in part on a set of information that includes non-radar sensing information from a non-radar information source, a maximum permissible exposure (MPE) mode corresponding to a determination whether to operate a radar to generate a current radar-sensing result for object detection for the RF exposure level management, wherein an ON or OFF state of the radar is controlled based on the determination whether to use radar for RF exposure level management, wherein:

the selected MPE mode is selected from among a first MPE mode and a second MPE mode, and the selected MPE mode controls an ON or OFF state of the radar based on the determination whether to operate the radar for RF exposure level management, a selection of the first MPE mode corresponds to a determination to operate and use the radar for the RF exposure level management, and a selection of the second MPE mode corresponds to a determination to not operate and not use the radar for the RF exposure level management;

when the second MPE mode is selected, control the radar to be in the OFF state;

when the first MPE mode is selected:

control the radar to be in the ON state:

transmit radar signals for object detection and generate the current-radar sensing result based on the transmitted radar signals; and identify available power for communication signals based on an identified RF exposure level of an object detected by the radar signals; and transmit the communication signals for wireless communication at a power level that:

(i) does not exceed the available power when the first MPE mode is selected or (ii) is based on a predefined scenario corresponding to a body part being within a proximity to the electronic device, in response to the selection of the second MPE mode which corresponds to the determination to not operate the radar for the RF exposure level management.

* * * * *